(12) United States Patent
Tremel et al.

(10) Patent No.: US 12,389,496 B2
(45) Date of Patent: Aug. 12, 2025

(54) MOVEABLE GRIPPER FOR GRIPPING A CONTAINER AND HEATING CONTENTS OF THE CONTAINER THROUGH DYNAMICALLY CONTROLLED THERMAL CONTACT AND HEAT SETTINGS

(71) Applicant: DuPont Electronics, Inc., Wilmington, DE (US)

(72) Inventors: James Daniel Tremel, Hockessin, DE (US); Matthew James Manelis, Raleigh, NC (US); Chun Keung Wong, Talleyville, DE (US); Wei Wu, Hockessin, DE (US); Todd Mahlon Strubhar, Newark, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 856 days.

(21) Appl. No.: 17/313,177

(22) Filed: May 6, 2021

(65) Prior Publication Data

US 2022/0361291 A1     Nov. 10, 2022

(51) Int. Cl.
*H05B 1/02* (2006.01)
*B25J 13/08* (2006.01)
(Continued)

(52) U.S. Cl.
CPC ............. *H05B 1/023* (2013.01); *B25J 13/08* (2013.01); *B25J 15/0038* (2013.01);
(Continued)

(58) Field of Classification Search
CPC .... H05B 1/023; H05B 3/06; H05B 2203/005; H05B 3/34; G06N 20/00; B25J 13/08; B25J 15/0038; B25J 15/00; B25J 15/02
See application file for complete search history.

(56) References Cited

U.S. PATENT DOCUMENTS 5,883,364 A    3/1999  Frei et al.
6,870,135 B2   3/2005  Hamm et al.
(Continued)

FOREIGN PATENT DOCUMENTS

CN       112060111 A  * 12/2020

OTHER PUBLICATIONS

Boon. "ORB Bottle Warmer Instructions." TOMY. https://c2.tomy.com/sites/default/files/instructions/B10054-02-NA-004_OrbInstructions.pdf (retrieved Mar. 7, 2022), 14 pages.
(Continued)

*Primary Examiner* — John J Norton
*Assistant Examiner* — Theodore J Evangelista
(74) *Attorney, Agent, or Firm* — CANTOR COLBURN LLP

(57) ABSTRACT

Embodiments of the invention are directed to an apparatus that includes a moveable gripper element including a flexible inner sleeve. A mechanical energy source mechanism is communicatively coupled to the moveable gripper element, and a sensor network is communicatively coupled to the moveable gripper. A controller is communicatively coupled to the mechanical energy source mechanism and the sensor network. The flexible inner sleeve defines an adjustable opening. The controller controls the mechanical energy source mechanism to transfer to the moveable gripper element a gripping force configured to move the moveable outer sleeve, reduce a size of the adjustable opening, and bring the flexible inner sleeve into an initial level of thermal contact with a container positioned within the adjustable opening. The controller is configured to, subsequent to establishing the initial level of thermal contact, control the mechanical energy source mechanism to make adjustments to the gripping force.

20 Claims, 27 Drawing Sheets

(51) Int. Cl.
  *B25J 15/00* (2006.01)
  *G06N 20/00* (2019.01)
  *H05B 3/06* (2006.01)
(52) U.S. Cl.
  CPC .............. *G06N 20/00* (2019.01); *H05B 3/06* (2013.01); *H05B 2203/005* (2013.01)

(56) References Cited

U.S. PATENT DOCUMENTS

| | | | |
|---|---|---|---|
| 7,015,425 | B2 | 3/2006 | Neal et al. |
| 7,932,480 | B2 | 4/2011 | Gu et al. |
| 9,516,973 | B2 | 12/2016 | Young |
| 9,648,970 | B2 | 5/2017 | Lee |
| 9,967,924 | B2 | 5/2018 | Heczko |
| 10,265,862 | B1 * | 4/2019 | Alqasemi ............. B25J 15/0033 |
| 2004/0139860 | A1 * | 7/2004 | Hamm ................ A47J 36/2433 99/275 |
| 2008/0308563 | A1 | 12/2008 | Overgaard |
| 2015/0150761 | A1 | 6/2015 | Lanternari et al. |
| 2016/0341419 | A1 * | 11/2016 | Fluhrer .................... H05B 3/03 |
| 2017/0013678 | A1 * | 1/2017 | Kiernan .................. H05B 3/58 |
| 2017/0055557 | A1 | 3/2017 | Roberts et al. |
| 2017/0325608 | A1 * | 11/2017 | Alexander ......... A47G 19/2288 |
| 2018/0042258 | A1 | 2/2018 | Roberts et al. |
| 2019/0333312 | A1 | 10/2019 | Jain et al. |
| 2020/0053839 | A1 * | 2/2020 | Clark ..................... H05B 6/065 |
| 2020/0230607 | A1 * | 7/2020 | Kobari .................. H10N 10/13 |
| 2020/0400370 | A1 | 12/2020 | Godbole et al. |

OTHER PUBLICATIONS

BriskHeat. "Briskheat: Drum & Container Heater Options." https://www.briskheat.com/products/heaters/drum-container-heaters.html (retrieved Mar. 7, 2022), 2022, 3 pages.

Ke et al., "A novel flexible heating element using graphene polymeric composite ink on polyimide film." Microsystem Technologies 24.8 (2018): 3283-3289.

Wu et al. "Predicting interfacial thermal resistance by machine learning." npj Computational Materials 5.1 (2019): 1-8.

International Search Report and Written Opinion mailed Jul. 26, 2022 in PCT/US2022/027592; 13 pages.

* cited by examiner

| Gripping Force (GF) 414 | Interface-Parameter to be controlled, improved, and/or achieved | Interface-Parameter Proxy Measurement(s) and/or Estimate(s) | Interface-Parameter Proxy Measurement(s) and/or Estimate(s) Target Value/Range |
|---|---|---|---|
| GF1-A (502) | A Targeted Level of Thermal Contact (TLTC) at the interface 416 | Air gap percentage (AG%) at the interface 416 | About 0% to about 10%; Less than about 5% |
| GF1-B (504) | TLTC at the interface 416 | AG%-GF1-B; where AG%-GF1-B = AG% at the interface 416 under the influence of GF1-B | AG%-GF1-B < AG%-preGF1-B; where AG%-preGF1-B is AG% at the interface 406 prior to the application of GF1-B |
| GF1-C (506) | TLTC at the interface 416 | AG%-GF1-C; where AG%-GF1-C = AG% at the interface 416 under the influence of GF1-C | Minimize AG%-GF1-C; and/or bring AG%-GF1-C below a target AG%-GF1-C threshold |
| GF2-A (508) | TLTC at the interface 416 | ΔT-GF2 at the interface 416; where ΔT-GF2 = ΔT at the interface 416 under the influence of GF2 | ΔT-GF2 < ΔT-preGF2; where ΔT-preGF2 is ΔT at the interface 406 prior to application of GF2 |
| GF2-B (510) | TLTC at the interface 416 | ΔT-GF2 at the interface 416; where ΔT-GF2 = ΔT at the interface 416 under the influence of GF2 | Minimize ΔT-GF2; and/or bring ΔT-GF2 below a target ΔT-GF2 threshold |
| GF3-A (512) | TLTC at the interface 416 | Material A parameters, Material B parameters, and Interface parameters that can be used to calculate/estimate Interfacial Thermal Resistance (ITR) at the interface 416 under the influence of GF3-A (ITR-GF3-A) | ITR-GF3-A < ITR-preGF3-A; where ITR-preGF3-A is ITR at the interface 406 prior to application of GF3-A |
| GF3-B (514) | TLTC at the interface 416 | Material A parameters, Material B parameters, and/or Interface parameters that can be used to calculate/estimate ITR at the interface 416 | Minimize ITR-GF3-B; and/or bring ITR-GF3-B below a target ITR-GF3-B threshold |

FIG. 5

| Gripping Force (GF) 414 | Material A at the Interface 416 | Material B at the Interface 416 | Material B Topology at the Interface 416 | Interface-Parameter to be controlled, improved, and/or achieved |
|---|---|---|---|---|
| GF4 | Compressible | Rigid | No | TLTC at the Interface 416 (includes Intimate Thermal Contact (ITC)) |
| GF5 | Compressible | Conformable | No | TLTC at the Interface 416 (includes ITC) |
| GF6 | Compressible | Rigid | Yes | TLTC at the Interface 416 (includes ITC) |
| GF7 | Compressible | Conformable | Yes | TLTC at the Interface 416 (includes ITC) |
| GF8 | Conformable | Rigid | No | TLTC at the Interface 416 (includes ITC) |
| GF9 | Conformable | Conformable | No | TLTC at the Interface 416 (includes ITC) |
| GF10 | Conformable | Rigid | Yes | TLTC at the Interface 416 (can include ITC) |
| GF11 | Conformable | Conformable | Yes | TLTC at the Interface 416 (includes ITC) |
| GF12 | Flexible, but non-conformable | Rigid | No | TLTC at the Interface 416 (includes ITC) |
| GF13 | Flexible but non-conformable | Conformable | No | TLTC at the Interface 416 (includes ITC) |
| GF14 | Flexible but non-conformable | Rigid | Yes | TLTC at the Interface 416 |
| GF15 | Flexible but non-conformable | Conformable | Yes | TLTC at the Interface 416 (includes ITC) |

FIG. 7A

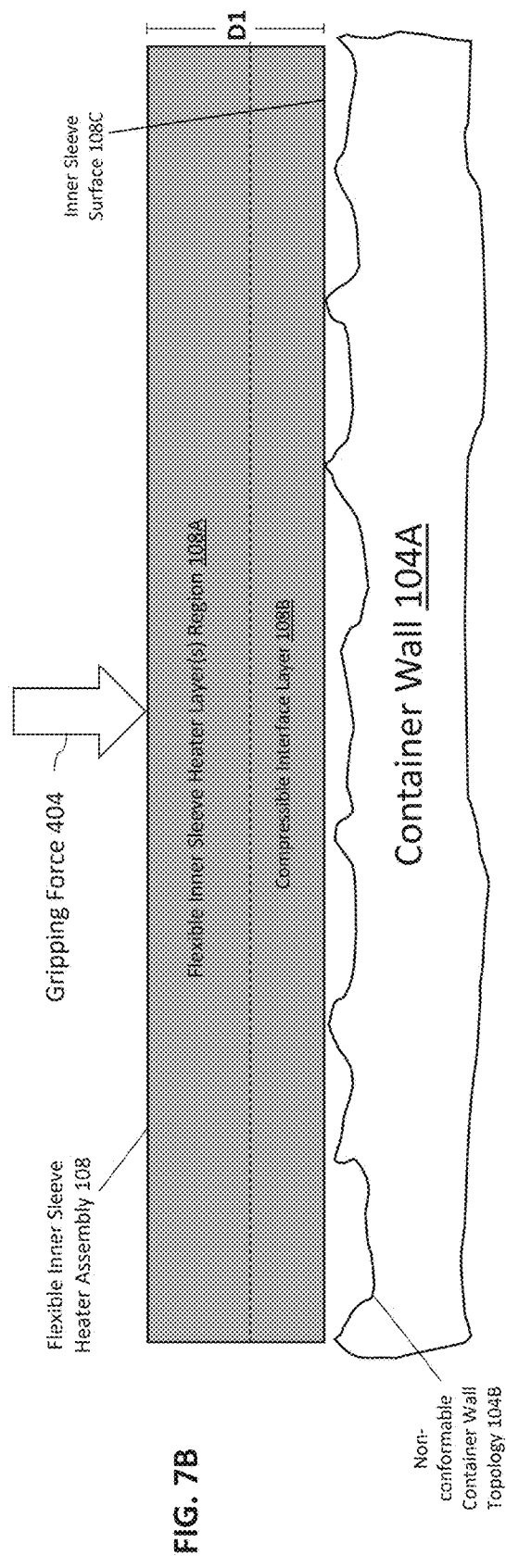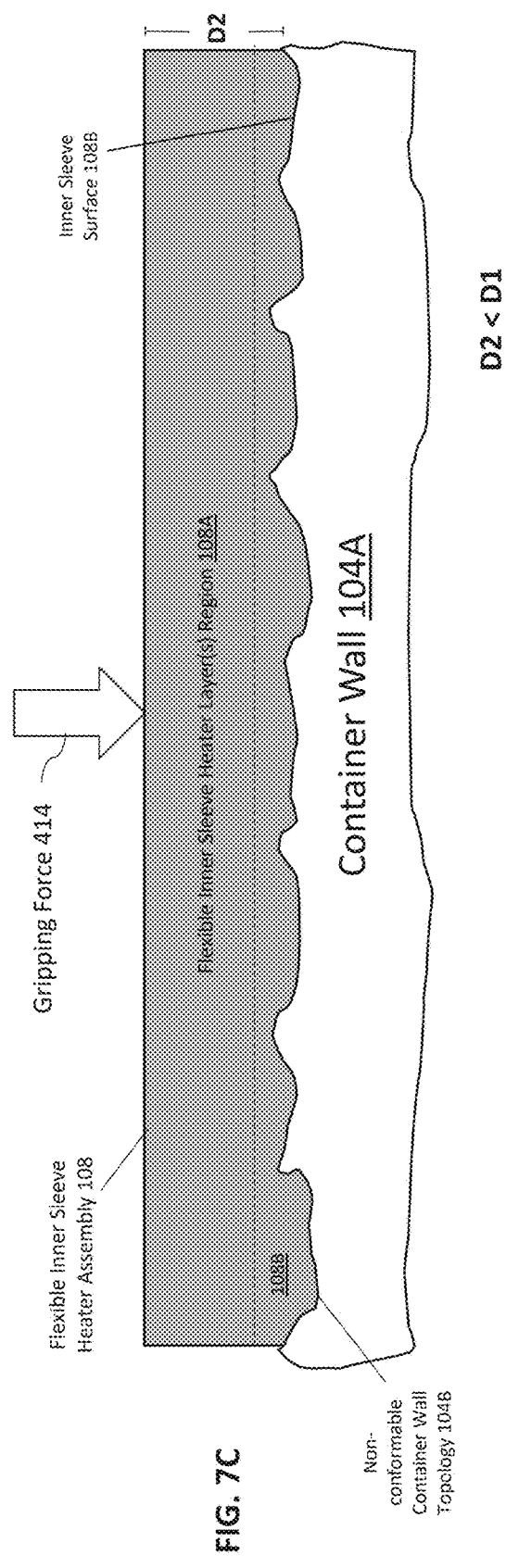

MOVEABLE GRIPPER FOR GRIPPING A CONTAINER AND HEATING CONTENTS OF THE CONTAINER THROUGH DYNAMICALLY CONTROLLED THERMAL CONTACT AND HEAT SETTINGS

BACKGROUND

The present invention relates in general to heating systems. More specifically, the present invention relates to a heating system having a moveable gripper configured to grip a container and deliver heat to the contents of the container by dynamically controlling thermal contact and heat settings at or near the interface between the moveable gripper and the container. In some aspects of the invention, a gripper subassembly is configured to agitate the moveable gripper while the moveable gripper dynamically grips and delivers heat to the contents of the container.

Heaters have been developed to heat the contents of a container. Examples include heaters that use either microwave heating technologies or induction heating technologies. Microwave heaters (commonly referred to as microwave ovens) can heat a container (typically made of plastic or other types of dielectric material) by exposing it to an external heat source in the form of electromagnetic radiation in the microwave frequency range. The electromagnetic radiation effectively penetrates through the container and is absorbed by the stored liquid, thereby heating the liquid. Microwave ovens require non-metallic or polymeric containers so that the microwave radiation is not shielded and can penetrate through to heat the absorbed liquid.

Induction heaters typically include an electromagnet and an electronic oscillator that passes a high-frequency alternating current (AC) through the electromagnet. The alternating magnetic field penetrates the conductive object, generating electric currents within the conductive object. These electric currents (referred to as "eddy currents") are generated within the conductive object itself and flow through the resistance of the conductive material to induce a Joule heating effect. Unlike microwave heaters, induction heaters generate heat inside the conductive container itself, thereby heating the liquid contained in the conductive object via conduction. Induction heaters require metallic or electrically conductive containers and will not work on polymeric or dielectric containers.

SUMMARY

Embodiments of the invention are directed to an apparatus that includes a moveable gripper element including a flexible inner sleeve. A mechanical energy source mechanism is communicatively coupled to the moveable gripper element, and a sensor network is communicatively coupled to the moveable gripper. A controller is communicatively coupled to the mechanical energy source mechanism and the sensor network. The flexible inner sleeve defines an adjustable opening. The controller controls the mechanical energy source mechanism to transfer to the moveable gripper element a gripping force configured to move the moveable outer sleeve, reduce a size of the adjustable opening, and bring the flexible inner sleeve into an initial level of thermal contact with a container positioned within the adjustable opening. The controller is configured to, subsequent to establishing the initial level of thermal contact, control the mechanical energy source mechanism to make adjustments to the gripping force, wherein the adjustments to the gripping force increase thermal contact points at an interface between the flexible inner sleeve and the container; and displace air from the interface between the flexible inner sleeve and the container.

Embodiments of the invention are directed to a method of making the above-described apparatus.

Additional features and advantages are realized through the techniques described herein. Other embodiments and aspects of the invention are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 5 depicts a table illustrating how various interface-parameters can be dynamically controlled, improved, and/or achieved in accordance with non-limiting embodiments of the invention;

FIG. 7A depicts a table illustrating how various interface-parameters can be dynamically controlled, improved, and/or achieved in accordance with non-limiting embodiments of the invention;

FIG. 7B depicts a block diagram showing a flexible inner sleeve in uncompressed contact with a container wall having an irregular surface topology in accordance with non-limiting embodiments of the invention;

FIG. 7C depicts a block diagram showing a flexible inner sleeve in compressed contact with a container wall having an irregular surface topology in accordance with non-limiting embodiments of the invention;

Figure 1:
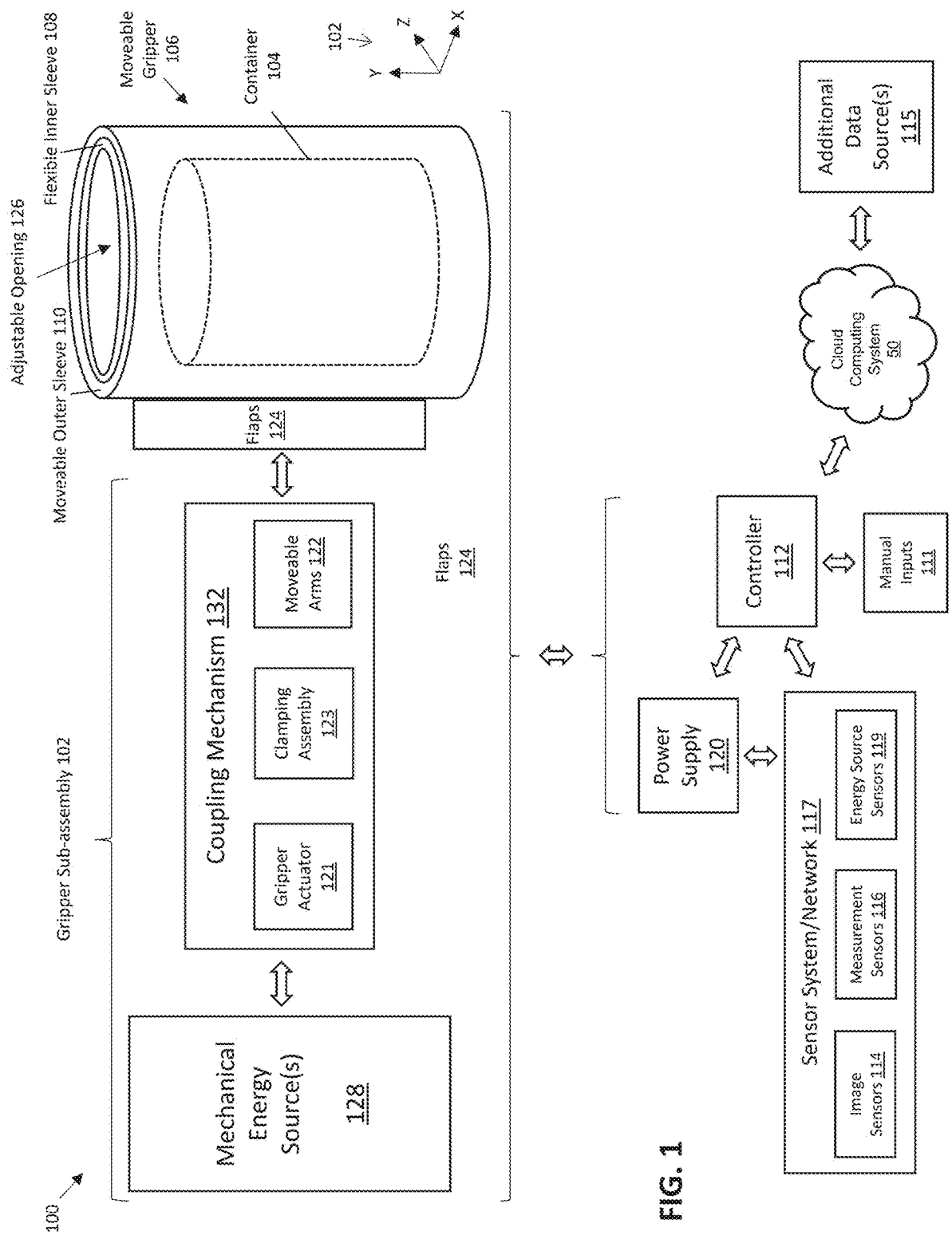
FIG. 1 depicts a block diagram of a heating apparatus according to non-limiting embodiments of the invention.

In the accompanying figures and following detailed description of the disclosed embodiments of the invention, the various elements illustrated in the figures are provided with two, three, or four digit reference numbers. In most instances, the leftmost digit(s) of each reference number corresponds to the figure in which its element is first illustrated.

DETAILED DESCRIPTION

For the sake of brevity, conventional techniques related to making and using aspects of the invention may or may not be described in detail herein. In particular, various aspects of the materials, structures, computing systems, and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the present invention, microwave heaters and induction heaters are known heaters capable of quickly heating a material such as a consumable food or beverage. These conventional technologies, however, suffer from limitations. For instance, induction heaters typically require specific heating equipment and further require that the material to be heated is in or on a container specifically made to operate with a particular induction heating system. Microwave heaters are incapable of heating materials supported in or on metal containers because the metal material reflects the microwave energy, which prohibits it from reaching the material and can cause arcing and damage. In addition, microwave heaters also lack the precision to target specific locations or "zones" of a material.

Turning now to an overview of aspects of the present invention, embodiments of the invention address the above-described shortcomings of known heating systems by providing a heating system having a gripper sub-assembly with a moveable gripper configured to grip containers having various sizes, shapes, flexibility levels, and surface topologies. The heating system is configured to grip and deliver heat to the container in a dynamically-controlled manner that efficiently transfers and evenly distributes heat through the container to the contents of the container. In some aspects of the invention, efficient heat transfer and even heat distribution are enhanced by configuring the moveable gripper to grip containers with a dynamically controlled gripping force that increases and/or maximizes thermal contact points between the movable gripper and the container; and that dynamically displaces air (i.e., reduces air-gaps) at the interface between the moveable gripper and the container to decrease and/or minimize air at the interface between the moveable gripper and the container.

In some embodiments of the invention, the moveable gripper includes a moveable outer sleeve heater assembly physically coupled to a flexible sleeve heater assembly such that the flexible inner sleeve defines an adjustable opening. When a container is positioned within the adjustable opening, the gripper sub-assembly can dynamically apply the above-described gripping force to the moveable outer sleeve, and the gripping force moves the moveable outer sleeve and the flexible inner sleeve in a manner that reduces the size of the adjustable opening and dynamically controls, improves, and/or achieves a predetermined level of thermal contact between the flexible inner sleeve and the container. In accordance with aspects of the invention, the predetermined level of thermal contact is controlled, improved, and/or achieved by dynamically controlling the gripping force to increase the thermal contact points between the flexible inner sleeve and the container; and by dynamically controlling the gripping force to displace air at the interface between the flexible inner sleeve and the container. In accordance with aspects of the invention, the predetermined level of thermal contact between the flexible inner sleeve and the container can be a maximum (or maximized) level of thermal contact between the flexible inner sleeve and the container. In aspects of the invention, the maximum level of thermal contact can be a thermal contact level at which additional increases in the above-described dynamically controlled gripping force no longer increases the level of thermal contact between the flexible inner sleeve and the container.

In accordance with embodiments of the invention, the terms "thermal contact" (TC) and derivatives thereof are used herein to describe contact at an interface between a first material and a second material that is sufficient to exchange heat between the first material and the second material. The terms "targeted level of thermal contact" (TLTC) and derivatives thereof are used herein to describe a level of thermal contact at an interface between a first material and a second material that achieves a predetermined level of heat exchange at the interface. In accordance with aspects of the invention, the "targeted level" of thermal contact can include a "maximum level" (or maximized level) of thermal contact between a first material and a second material (e.g., the above-described maximum (or maximized) level of thermal contact between the flexible inner sleeve and the container). In accordance with aspects of the invention, the predetermined level of heat exchange at the interface can be achieved by achieving target values and/or ranges for TLTC proxy measurements and/or estimates (measurements/estimates) that include but are not limited to a percentage of the first/second material interface area that is air-gaps between the first material and the second material; a temperature gradient at the first/second material interface; and/or and interfacial thermal resistance level at the first/second material interface. The terms "air-gap percentage" (AG %) are used herein to describe the percentage of the interface area at the interface between first and second materials that has air between the first material and the second material. The terms "interfacial thermal resistance" (ITR) are used herein to describe a measure of the resistance to thermal flow at an interface between a first material and a second material. Where an outer surface of the container is rigid or semi-rigid and includes a topology (e.g., a pattern of ridges, creases, and the like), in some aspects of the invention, the flexible inner sleeve has sufficient flexibility and thickness to enable the surface of the flexible inner sleeve that interfaces with the outer surface of the container to, in response to the gripping force, substantially conform to the topology of the outer surface of the container. Where an outer surface of the container is substantially flexible and includes a topology (e.g., a pattern of ridges, creases, and the like), in some aspects of the invention, the flexible inner sleeve includes an interface surface that is flexible but sufficiently rigid to enable the interface surface to, in response to the gripping force, substantially conform the topology of the substantially flexible container outer surface to the topology of the inner sleeve's interface surface. Accordingly, in embodiments of the invention, thermal contact can be dynamically controlled and/or improved at the interface between the flexible inner sleeve and the container even where the outer surface of the container includes a topology.

The terms "intimate thermal contact" (ITC) and derivatives thereof are used herein to describe a level of thermal contact at an interface between a first material and a second material that achieves an air-gap percentage at the interface that ranges from about zero (0) percent to about ten (10) percent, or that achieves an air-gap percentage at the interface that is less than about five (5) percent. In some embodiment of the invention, TLTC can include ITC. In some embodiments of the invention, ITC can be achieved between the flexible inner sleeve and the container even where the outer surface of the container includes a topology.

In some aspects of the invention, efficient heat delivery and even heat distribution are provided by configuring the flexible inner sleeve to include heating elements thermally coupled to a heat distribution element, wherein the heat distribution element evenly distributes heat generated by the heating element(s) to portions of the container that are in a TLTC with the flexible inner sleeve. The heat distribution element(s) also prevent excessive heating at particular locations referred to as "hot spots" that can damage the heating element(s) specifically, and/or damage the flexible inner sleeve in general. In some aspects of the invention, efficient heat delivery and even heat distribution are further provided by segmenting the heating element(s) into separate heating zones or regions, where each heating zone can be independently activated or not activated to, in effect, customize how much of the available surface area of flexible inner sleeve is actively delivering heat to the container. In embodiments of the invention, any number of controllable (or addressable) heating zones can be provided, thereby further improving efficient heat transfer and even heat distribution by enabling the size of the active (i.e., heat delivering) portion(s) of the flexible inner sleeve to be more closely matched to the size and shape of the container. In embodiments of the invention, activation/deactivation of the heating zones can be dynamically controlled In some aspects of the invention, efficient heat transfer and even heat distribution are further enhanced by providing a gripper sub-assembly configured to agitate the moveable gripper while the moveable gripper grips, heats, and makes a TLTC with the container. In aspects of the invention where the gripper sub-assembly and the moveable gripper agitate the container, the gripping force can be further dynamically controlled to ensure that the moveable gripper maintains its grip on the container while agitating the container. In aspects of the invention where the gripper sub-assembly and the moveable gripper agitate the container, the gripping force can be further dynamically controlled to ensure that, while the container is being agitated, the moveable gripper maintains its grip on the container without damaging the container.

In some embodiments of the invention, the gripper sub-assembly includes a controller configured to control various aspects of the heating system to dynamically control the TLTC at the interface between the flexible inner sleeve and the container. More specifically, the controller can be used to dynamically set and/or make adjustments to the gripping and/or heating (gripping/heating) settings of the heating system in order to achieve TLTC at the interface between the flexible inner sleeve and the container, as well as achieve substantially efficient transfer and even distribution of heat through the walls of the container to the contents of the container. In accordance with aspects of the invention, the gripping/heating (or gripper/heat) settings can include one or more of the various system settings involved in the gripping and/or heating operations performed by the heating system. In some aspects of the invention, the gripping/heating settings include, in any combination, the various gripping forces applied to the moveable gripper; the activation and/or deactivation pattern (i.e., heating pattern(s)) applied to the heating zones of the heating element; the power applied to the heating zones; whether the power applied to the heating zones is continuous or pulsed; the duty cycle (duration, pule width, and pulse magnitude) of the pulsed power applied to the heating zones; the initiation of the power applied to the heating zones; and/or whether the heating system agitates the moveable gripper while the moveable gripper is gripping and transferring heat through the container to the contents of the container.

In some embodiments of the invention, the above-described controller is configured to utilize various data types from various data sources to dynamically control, compute, look up, and/or simulate the gripping force that controls, improves, and/or achieves a TLTC between the flexible inner sleeve and the container, as well as achieve substantially efficient transfer and even distribution of heat through the walls of the container to the contents of the container. In some embodiments of the invention, the controller is configured to utilize various data types from various data sources to dynamically control, compute, look up, and/or simulate a maximum level of heat that the heating element generates, wherein the maximum heating element heat level is below a heat level that would damage the container. For example, the data type can be data about the maximum service temperature (Tmax) of the container material, where Tmax is the highest temperature at which a material can be used, for prolonged periods, without significant change in the material's properties, including but not limited to degradation, chemical changes, mechanical changes, and/or excessive creep. The controller can use this data, along with feedback from a network of temperature sensors, to maintain the maximum heat level generated by the heating element below the Tmax of the container material.

In some embodiments of the invention, the controller is configured to utilize the various data types from the various data sources to compute, look up, and/or simulate gripping force, heating element temperature, and other parameters using a variety of known computer analysis techniques, including but not limited to simulation algorithms, machine learning algorithms, relational databases, and the like. In some embodiments of the invention, the data types/sources can include data about the container gathered from sensors. In some embodiments of the invention, the data types/sources can include data about the container that has been downloaded to the controller from a remote processor over a network (e.g., a cloud computing system). In some embodiments of the invention, the data types/sources can include data about the container received through manual inputs to the controller.

In some embodiments of the invention, the controller is configured to independently activate or not activate the heating zones to, in effect, further improve heat transfer efficiency and evenly distribute heat by customizing how much of the available surface area of flexible inner sleeve is actively passing heat to the container, and by matching the heating zones to the size and shape of the container. In some embodiments of the invention, the controller is configured to evaluate potentially competing constraints on the gripping force to determine whether or not all of the potentially competing constraints can be satisfied. For example in some aspects of the invention, the gripping force needs to be sufficient to dynamically control, improve, and/or achieve a TLTC between the flexible inner sleeve and the container; sufficient to hold the container while the gripper sub-assembly agitates the container; and insufficient to damage the container.

Turning now to a more detailed description of aspects of the invention, FIG. 1 depicts a block diagram illustrating a heating apparatus 100 according to non-limiting embodiments of the invention. In accordance with aspects of the invention, the heating apparatus 100 includes a gripper sub-assembly 102, a moveable gripper 106, a power supply 120, a controller 112, and a sensor system/network 117, configured and arranged as shown. In embodiments of the invention, the sensor network 117 can include but is not limited to measurement sensor(s) 116, image sensor(s) 114, and/or mechanical energy source sensors 119. In embodiments of the invention, the gripper sub-assembly 102 includes mechanical energy source(s) 128 and a coupling mechanism 132, wherein the coupling mechanism 132, in some embodiments of the invention, can include a gripper actuator 121, a clamping assembly 123, and moveable arms 122. The use of a gripper actuator 121, a clamping assembly 123, and moveable arms 122 to implement the coupling mechanism 132 is one example, and embodiments of the invention can utilize other implementations of the coupling mechanism 132. In embodiments of the invention, the moveable gripper 106 includes flaps 124 physically coupled to a moveable outer sleeve heater element 110, which is physically and communicatively coupled to a flexible inner sleeve heater element 108. In embodiments of the invention, the flexible inner sleeve heater element 108 of the moveable gripper 106 defines an adjustable opening 126 that can hold a container 104. In embodiments of the invention, the container 104 can have a variety of sizes, shapes, flexibility levels, conformability levels, surface topologies, and container materials.

The controller 112 can be located anywhere within the heating apparatus 100. In some embodiments of the invention, the controller 112 can be located external to the heating apparatus 100. In embodiments of the invention, the controller 112 is in wired and/or wireless electronic communication with the sensor system/network 117 (including the image sensors 114, the mechanical energy source sensors 119, and/or the measurement sensors 116), a display (e.g., display 1408 shown in FIG. 14), the gripper sub-assembly 102, and/or the moveable gripper 106 in order to receive various data types from the sensor system/network 117, receive various manual inputs 111 from a user, and dynamically control various operations of the heating apparatus 100. The controller 112 can also be in wired or wireless communication with additional remote computing resources (not shown) and/or additional remote data sources 115 through a communication path 1425 (shown in FIG. 14) and/or a cloud computing system 50. In embodiments of the invention, the remote data sources 115 include remotely stored container data that provides a variety of details about a variety of container sizes, shapes, materials, and/or surface topologies that can be part of the container 104. In some embodiments of the invention, the remote data sources 115 are integrated with the remote computing resources. In embodiments of the invention, the controller 112 is configured to use the container data to customize for a particular container size, shape, material, and/or surface topology how the gripper sub-assembly 102 and the moveable gripper 106 grip and deliver heat to a container 104. In some embodiments of the invention, the controller 112 is remotely located and in wired and/or wireless communication with various components of the heating apparatus 100 through the communications path 1425 (shown in FIG. 14) and/or the cloud computing network 50.

In accordance with aspects of the invention, the gripper sub-assembly 102 and the moveable gripper 106 are configured to receive the container 104 through the adjustable opening 126; grip the container 104 in a manner that dynamically controls, improves, and/or achieves a TLTC between portions of the moveable gripper 106 and the container 104; and apply heat through the container 104 to the contents of the container 104. In embodiments of the invention, the contents of the container 104 can be a consumable liquid or beverage including but not limited to coffee, tea, soup, and the like. In embodiments of the invention, the heating apparatus 100 is configured to dynamically control the heat transferred through the container 104 such that the heat transferred into the container 104 is below a threshold heat level (e.g., Tmax) that would change the container material's properties, including but not limited to degradation, chemical changes, mechanical changes, and/or excessive creep or deformation. In embodiments of the invention, the container 104 can be any material that has sufficient thickness, thermal conductivity, and mechanical robustness to transfer a predetermined level of heat to contents of the container 104 without degrading the container 104. In some embodiments of the invention, the container 104 can be a closed or sealed metal container, examples of which include but are not limited to aluminum metal cans or tin plated steel cans. In some embodiments of the invention, the container 104 can be a closed or sealed semi-rigid plastic container. In some embodiments of the invention, the container 104 can be a closed or sealed substantially flexible and/or conformable plastic container. In some embodiments of the invention, the container 104 can be substantially cylindrical or irregular in shape.

In accordance with aspects of the invention, the movable gripper 106 can set the adjustable opening 126 to a size that is large enough to receive the container 104. After the container 104 is positioned within the adjustable opening 126, the movable gripper 106 can be moved in a manner that reduces the size of the adjustable opening 126 and brings portions of the moveable gripper 106 (i.e., the flexible inner sleeve heater assembly 108) into thermal contact with the container 104 in order to dynamically control, improve, and/or achieve a TLTC between the flexible inner sleeve heater assembly 108 and the container 104. Although not shown in FIG. 1, the heating apparatus 100 can include additional sub-assemblies such as a container loading sub-assembly and a dispensing tray sub-assembly that could optionally be heated to maintain the desired temperature after the gripper sub assembly 102 and the moveable gripper 106 have finished heating the container 104. The container loading sub-assembly can contain one or more containers 104, and can load (e.g., either automatically or manually) an instance of the container 104 into the adjustable opening 126 of the movable gripper 106. Subsequent to completion of the heating cycle, the heated container 104 can be dispensed (e.g., either automatically or manually) to the dispensing tray sub-assembly where it can be retrieved by a person or another automated sub-assembly.

In embodiments of the invention, the flexible inner sleeve heater assembly 108 is physically coupled to an inner wall of the movable outer sleeve heater assembly 110. In some embodiments of the invention, the moveable outer sleeve heater assembly 110 can be formed from (or formed to include) a substantially semi-rigid material. As used herein, the terms "semi-rigid material," "semi-rigid body," "semi-rigid structure," and equivalents thereof refer to a material that, when not being influenced by a force or some other source of pressure, generally maintains a predetermined shape but can be bent, flexed or otherwise deformed in response to an applied force or pressure without cracking, separating, or otherwise compromising the structural integrity of the material. In other words, for semi-rigid materials, the distance between any two given points in or on the material remains substantially constant in time unless and until a sufficient external force is exerted on the material. In some embodiments of the invention, suitable semi-rigid materials for forming the outer sleeve heater assembly 110 can include high-temperature flexible materials such as a high-temperature polymer, a high-temperature plastic material, or other high-temperature engineered plastics including, but not limited to, polyether ether ketone (PEEK) polyamide imide, polyimides, polyetherimide, poly phenylene sulfide, and/or composites thereof. As used herein, the terms "high temperature" when used to modify a material refers to the material having a Tmax greater about 100 degrees Celsius.

As previously noted herein, the flexible inner sleeve heater assembly 108 and the moveable outer sleeve heater assembly 110 are configured to receive the container 104; grip the container 104 in a manner that dynamically controls, improves, and/or achieves a TLTC between the flexible inner sleeve heater assembly 108 and the container 104; and apply heat through the container 104 to the contents thereof. In some embodiments of the invention, the flexible inner sleeve heater assembly 108 is formed from a flexible material that allows the flexible inner sleeve heater assembly 108 to flex when the moveable outer sleeve heater assembly 110 is moved. As used herein, the terms "flexible material," "flexible body," "flexible structure," and equivalents thereof refer to a material characterized by the ability to bend or compress easily many times without cracking or delaminating under the material's normal use conditions. In embodiments of the invention, the flexible inner sleeve heater assembly 108 is formed from a flexible material that, when affixed to an inner wall of the movable outer sleeve heater assembly 110, bends or compresses easily without cracking when the movable outer sleeve assembly 110 is moved. In some embodiments of the invention, the moveable outer sleeve heater assembly 110 can also be formed from, and/or formed to include, flexible materials. The flexibility of the inner sleeve heater assembly 108 and the movability of the moveable outer sleeve heater assembly 110 also allow the moveable gripper 106 to receive and establish a TLTC with containers having a wide variety of sizes, shapes, flexibility levels, conformability levels, and/or surface topologies (e.g., creases, ridges, and the like). In some embodiments of the invention, the flexible inner sleeve heater assembly 108 is configured to include both flexible and compressible material at the interface between the flexible inner sleeve heater assembly 108 and the container 104, thereby allowing the compressible material to substantially conform to a topology of the container 104 under the influence of the gripping force. Additional details of various component parts of a multi-layered implementation of the flexible inner sleeve heater assembly 108 in accordance with aspects of the invention are depicted in FIGS. 9A-10C and described subsequently herein.

In embodiments of the invention, the controller 112 can be implemented to include the features and functionality of the computing system 1400 (shown in FIG. 14), which enable the controller 112 to execute a variety of algorithms and computer-readable program instructions stored in various memory elements of the controller 112. In one or more non-limiting embodiments of the invention, the controller 112 is in signal communication with the sensor network 117 that includes but is not limited to one or more image sensors 114, the one or more mechanical energy source sensors 119, and/or the one or more measurement sensors 116. The measurement sensors 116 can include, but are not limited to, pressure sensors; grip pressure sensors configured to detect the gripping force (e.g., gripping forces 404, 414 shown in FIGS. 4A-4D) that is applied to the moveable gripper 106 and transferred through the moveable gripper 106 to press an inner surface of the flexible inner sleeve 108 against the container 104 and form an interface (e.g., interfaces 406, 416 shown in FIGS. 4A-4D); flexible inner sleeve temperature sensors positioned on the flexible inner sleeve 108 such that they measure temperature at locations on an inner wall of the flexible inner sleeve 108 that contact the container 104; container temperature sensors positioned on the flexible inner sleeve 108 such that they measure temperature at locations on an outer wall of the container 104 that contact the flexible inner sleeve 108; ambient/environment temperature sensors; vibration sensors; air-gap sensors configured to detect air at the interface between the flexible inner sleeve 108 and the container 104; position sensors configured to detect a position of the container 104 within the adjustable opening 126 and/or the with respect to the flexible inner sleeve 108; accelerometer(s); gyroscope(s); and thermistor(s). The image sensors 114 can include, but are not limited to, a photo diode; a barcode reader; a quick response (QR) code reader; and a visible or IR frequency camera. Image sensors 114 can scan a code included with the container 104, wherein the code includes a variety of information about characteristics of the container 104. Image sensors 114 can also capture an image of the container 104, wherein the image also includes a variety of information about characteristics of the container 104. The controller 112 can process and analyze the scanned code or captured image (e.g., perform image recognition) to determine various characteristics of the container 104 including, but not limited to, the source of the container 104, the material of the container 104, the flexibility of the material of the container 104, the shape/size/dimensions of the container 104, the sizes/dimensions/locations of any surface topology (e.g., ridges, creases, and the like) of the container 104, and/or the contents stored in the container 104 (e.g., soup, coffee, tea, vegetables, and the like).

In some embodiments of the invention, the controller 112 can be configured to calculate an estimate of the temperature(s) at locations on the outer wall of the container 104 based on temperature readings from the flexible inner sleeve temperature sensors; data about characteristics and/or parameters of the flexible inner sleeve 108; and/or data about characteristics and/or parameters of the container 104. In some embodiments of the invention, the controller 112 can be configured to calculate an estimate of the level of interface pressure or force applied at the interface (e.g., interfaces 406, 416 shown in FIGS. 4A-4D) between the flexible inner sleeve 108 and the container 104 based on gripping force readings from the gripping force sensors; data about characteristics and/or parameters of the moveable gripper 106; and data about characteristics and/or parameters of the container 104.

In embodiments of the invention, the mechanical energy source sensors 119 can include a mechanical energy source temperature sensor, a mechanical energy source vibration sensor, a mechanical energy source accelerometer, and/or a mechanical energy source gyroscope. In embodiments of the invention, the controller 112 is in signal communication with the mechanical energy source sensors 119, the power supply 120 and/or the mechanical energy source(s) 128. Accordingly, the controller 112 can dynamically control the power supply 120 and/or the mechanical energy source(s) 128 in response to data or measurements output from the mechanical energy source sensors 119. Additionally, the controller 112 can dynamically control the power supply 120 and/or the mechanical energy source(s) 128 in response to outputs from the image sensors 114, the measurement sensors 116 (including grip pressure sensors), the manual inputs 111, and/or the remote data sources 115. In one or more non-limiting embodiments of the invention, the measurement sensors 116 can include grip pressure sensors configured and arranged to sense a gripping pressure applied by coupling mechanism 132 to the flaps 124 of the moveable gripper 106. The controller 112 can dynamically control the coupling mechanism 132 to adjust the first and second moveable arms 122 based on the sensed gripping pressure. In some embodiments of the invention, for example, the controller 112 can dynamically control the coupling mechanism 132 to increase the gripping pressure applied to the moveable gripper 106 until the gripping pressure reaches or exceeds a gripping pressure threshold value that is sufficient to dynamically control, improve, and/or achieve a TLTC between the flexible inner heater assembly 108 and the container 104.

In embodiments of the invention, the controller 112 can receive various manual inputs 111 from an operator of the heating system 100. In embodiments of the invention, the manual inputs 111 can include inputs that are best sourced from the user/operator, including but not limited to a target temperature for the contents of the container 104. In embodiments of the invention, the manual inputs 111 can include the same types of inputs generated by the sensor network 117, including for example a container type (e.g., type of container material), a container size, and/or details about the contents of the container 104.

In embodiments of the invention, the controller 112 can access the remote data sources 115 over the communication path 1425 (shown in FIG. 14) and/or the cloud computing system 50 to download remotely stored container data that provides a variety of details about a variety of container types that can be utilized as the container 104. For example, the controller 112 can receive data from the sensor network 117 (e.g., 114, 116) and/or the manual inputs 111 identifying the container 104 that is currently within the adjustable opening 126 as a 12-ounce single serving can of chicken noodle soup sold by Company A. The controller 112 can query the data source 115 to determine whether the data source 115 has container data about a 12-ounce single serving cans of chicken noodle soup sold by Company A. In some aspects of the invention, the query sent by the controller 112 can include tradenames, label images, and other container identifying information/data that can be compared with the remotely stored container data to assist with identifying the specific remotely stored container data that matches the query. When the remote data source 115 has identified a match, the data source 115 transmits the matching container data over the communication path 1425 and/or the cloud computing system 50 to the controller 112. In the previously-described example query, the matching container data for the 12-ounce single serving can of chicken noodle soup sold by Company A can include the same types of inputs generated by the sensor network 117, including for example a container type (e.g., type of container material), a container size and shape, and/or details about the contents of the container 104. In some embodiments of the invention, the matching container data can include information about the container 104 that is not easily determined by the sensor network 117, including for example a variety of details about the robustness of the container material. Examples of details about the robustness of the container material include the container material's thickness, melting point, Tmax, flexibility, rigidity, conformability, softening point, glass transition temperature, burst pressure, and the like. In embodiments of the invention, the controller 112 is configured to use the downloaded matching container data to customize for that container (e.g., the 12-ounce single serving can of chicken noodle soup sold by Company A) how the gripper sub-assembly 102 carries out the various features and functionality of aspects of the invention, including but not limited to how the gripper sub-assembly 102 and the moveable gripper 106 grip and deliver heat to the container 104.

In embodiments of the invention, the controller 112 can also include a data interface (e.g., wireless interface—not shown separately from the controller 112) that facilitates data exchange with the communication path 1425 (shown in FIG. 14) and/or the cloud computing system 50. In this manner, the controller 112 can actively obtain various types of data in real-time including, but not limited to, local weather data, container data (e.g., container size, container shape, container material type, etc.), customer profile data, customer preferences, customer product purchase requests, etc. In some embodiments of the invention, the controller 112 can adjust the heating characteristics (e.g., power applied to the thermal film heater 208 shown in FIG. 8C; a target temperature to be achieved for the contents of the container; etc.) of the heating cycle based on the weather data, product data, customer profile data and/or customer product purchase requests.

In accordance with aspects of the invention, the controller 112 is configured to utilize the container data obtained from the measurement sensors 116, the image sensors 114, the manual inputs 111, and/or the remote data sources 115 to perform various functions and operations described herein, including, but not limited to, dynamically controlling operations (e.g., gripping force, heat delivery settings, agitation, etc.) of the gripper sub-assembly 102 and/or dynamically controlling operations of the moveable gripper 106. To execute these functions and operations, the controller 112 is configured to include computer hardware, algorithms, and computer-readable program instructions stored in various memory elements of the controller 112. For example, the controller 112 is configured to utilize various computer control techniques and features, including simulation algorithms, machine learning (ML) algorithms, look-up tables (e.g., relational databases), and other computational techniques to assist with dynamically controlling the gripper sub-assembly 102 and the moveable gripper 106 to generate and supply heat to the container 104 disposed in the adjustable opening 126 of the moveable gripper 106.

In some embodiments of the invention, the controller 112 is configured to base the above-described dynamically controlled operations and/or functions at least in part on received information (e.g., sensor data, downloaded data, manually input data, and the like) and/or estimates or calculations based on the received information. For example, in some embodiments of the invention, the information used (or needed) by the controller 112 to perform an operation or function can be difficult to measure directly using sensors, or the information used or needed by the controller 112 is not readily available for download or manual inputs. In such situations, the controller 112 can be configured to calculate an estimate of the necessary information. An example of such a calculation is depicted in FIG. 6E. In some aspects of the invention, the information used or needed by the controller 112 to perform the operations and/or function described herein can be estimated and/or calculated, regardless of whether or not the information is available from other sources. Accordingly, any of the embodiments of the invention described herein where the controller 112 is described as relying on a particular type of information source (e.g., sensor readings), it is understood that the particular type of information source can be substituted with other types of information sources (e.g., sensor readings, downloaded data, manual inputs, and/or estimates/calculations). Additional details of how the controller 112 utilizes various types of data sources and control techniques in accordance with aspects of the invention are described in greater detail subsequently herein.

In accordance with some embodiments of the invention, the gripper sub-assembly 102 includes a mechanical energy mechanism formed as the mechanical energy source(s) 128 attached to the coupling mechanism 132. The coupling mechanism 132 is configured to convert mechanical energy generated by the source 128 to a gripping force and apply it to the flaps 124 of the moveable gripper 106. In accordance with aspects of the invention, the gripping force is dynamically controlled such that it is sufficient to move the moveable gripper 106 and dynamically control, improve, and/or achieve a TLTC between the flexible inner sleeve heater assembly 108 and the container 104. In accordance with embodiments of the invention, the mechanical energy mechanism 128, 132 of the gripper sub-assembly 102 is further configured to, under certain circumstances, agitate the moveable gripper 106 while the moveable gripper 106 is gripping a container 104 and delivering heat to the contents of the container 104. A variety of coupling mechanisms 132 are suitable for performing the coupling mechanism operations described herein. In some embodiments of the invention, the coupling mechanism includes the gripper actuator 121, the clamping assembly 123, and the moveable arms 122. The mechanical energy sources 128 are operable in response to receiving power from a power supply 120.

The gripper actuator 121 includes a first end and an opposing second end, wherein the first end is moveably coupled to the mechanical energy source(s) 128, and wherein the opposing second end is coupled to the clamping assembly 123. The clamping assembly 123 is configured to apply the adjustable gripping force in response to operation of the gripper actuator 121. The clamping assembly 123 can include various gripping mechanism configurations capable of applying the adjustable gripping force. Suitable gripping mechanism configurations include, but are not limited to, the one or more moveable arms 122, one or more moveable cables, a biased hinge, a spring clamp, a lead screw clamp, a hose clamp, or combinations thereof. In some embodiments of the invention, the mechanical energy source(s) 128 can include electronic solenoids and/or pneumatic elements configured and arranged to generate the gripping force. In some embodiments of the invention, the mechanical energy source(s) 128 can include one or more electronically controlled motors configured and arranged to move and/or agitate the moveable gripper 106 in a variety of directions along the X/Y/Z axes 102. In some embodiments of the invention, any combination of the previously-described example iterations of the mechanical energy source(s) 128 can be used to generate the gripping force (e.g., gripping forces 404, 414 shown in FIGS. 4A-4D). In some embodiments of the invention, any combination of the previously-described example iterations of the mechanical energy source(s) 128 can be used to move and/or agitate the moveable gripper 106 in a variety of directions along the X/Y/Z axes 102.

In some embodiments of the invention, the moveable gripper 106 can be configured to include a ledge, an offset, and/or other support structure that supports the container 104 in the adjustable opening 126 prior to when the gripping force moves the moveable gripper 106 a sufficient distance to reduce the size of the adjustable opening 126 and bring the flexible inner sleeve heater assembly 108 into a TLTC with the container 104. After the container 104 is positioned within the adjustable opening 126, the controller 112 can then dynamically control the mechanical energy mechanism (e.g., the mechanical energy source(s) 128, the gripper actuator 121, the clamping assembly 123, and the movable arms 122) to apply a gripping force to the flaps 124 of the moveable outer sleeve heater assembly 110, wherein the applied gripping force reduces the size of the adjustable opening 126 and brings the flexible inner sleeve 108 into a TLTC with the container 104.

In embodiments of the invention, the gripper actuator 121 can include a pneumatic system configured to adjust the clamping assembly 123 and the moveable arms 122 in response to a varying air pressure delivered from an external source, such as an air compressor or replaceable supply tank (not shown). The gripper actuator 121 can also include other types of systems or configurations capable of moving or adjusting the clamping assembly 123. For example, the gripper actuator 121 can include, but is not limited to, a screw or scroll mechanism; a rod and gear arrangement driven by the mechanical energy source(s) 128 (e.g., an electric motor); and/or an electromagnetic solenoid clamping arrangement. A rod and gear assembly, for example, can be rotatably coupled through the clamping assembly 123 to the moveable arms 122 such that rotationally adjusting the rod (e.g., via the mechanical energy source(s) 128) adjusts the positions of the moveable arms 122.

In one or more non-limiting embodiments of the invention, the characteristics of the agitation operations (e.g., agitation frequency, agitation speed, range of rotation, and duration of agitation) performed by the system 100 are actively and dynamically controlled using, for example, the subsystem 610, which is shown in FIG. 6E and described in greater detail subsequently herein. In some embodiments of the invention, the characteristics of the agitation operations performed by the system are dynamically controlled based on feedback from temperature sensors that are included among the measurement sensors 116. In some embodiments of the invention, the temperature sensors that are included among the measurement sensors 116 are configured to generate various types of temperature gradient data. In some embodiments of the invention, the temperature gradient data represents a gradient (or difference) between a temperature measured at a first position on the container 104 and a temperature measured at a second position on the container 104, wherein distance between the first and second positions on the container 104 are sufficient to provide an indication of how well the heat transferred to the container 104 from the flexible inner sleeve heater assembly 108 is being evenly distributed along a height and/or width dimension of the container 104. In this instance, temperature gradient data above a threshold represents a level of uneven heat distribution when the flexible inner sleeve heating element 108 transfers heat to the container 104. In accordance with aspects of the invention, this type of temperature gradient data can be used by the controller 112 to determine that the level of heat distribution along a height and/or width dimension of the container 104 is sufficiently uneven to trigger the controller 112 to initiate an agitation operation during the heating cycle in order to more evenly distribute the heat that is being transferred from the flexible inner sleeve heater assembly 108 to the container 104 that is being gripped by the moveable gripper 106.

In embodiments of the invention, the characteristics of the agitation (e.g., agitation frequency, agitation speed, range of rotation, and duration of agitation) performed by the system 100 (e.g., using the subsystem 610 shown in FIG. 6E) are actively and dynamically controlled based on feedback from temperature sensors that are included among the measurement sensors 116, along with simulations and/or modeling operations performed by the controller 112 to estimate a temperature gradient from the container 104 to a midpoint of the contents of the container (e.g., other estimated parameters 613 of the subsystem 610 shown in FIG. 6E). In some embodiments of the invention, the estimated temperature gradient provides an indication of how well the heat transferred to the container 104 from the flexible inner sleeve heater assembly 108 is being evenly distributed to the contents of the container 104. In this instance, the estimated temperature gradient data above a threshold represents a level of uneven heat distribution when the flexible inner sleeve heating element 108 transfers heat to the container 104. In accordance with aspects of the invention, this type of estimated temperature gradient data can be used by the controller 112 to determine that the level of heat distribution among the contents of the container 104 is sufficiently uneven to trigger the controller 112 to initiate an agitation operation in order to more evenly distribute the heat that is being transferred from the flexible inner sleeve heater assembly 108 to the container 104 while the container 104 is being gripped by the moveable gripper 106. In accordance with aspects of the invention, the controller 112 is further configured to dynamically control the gripping force such that it is sufficient to enable the movable gripper 106 to also hold the container 104 with sufficient force to not drop the container 104 during the agitation operation.

Figure 2:
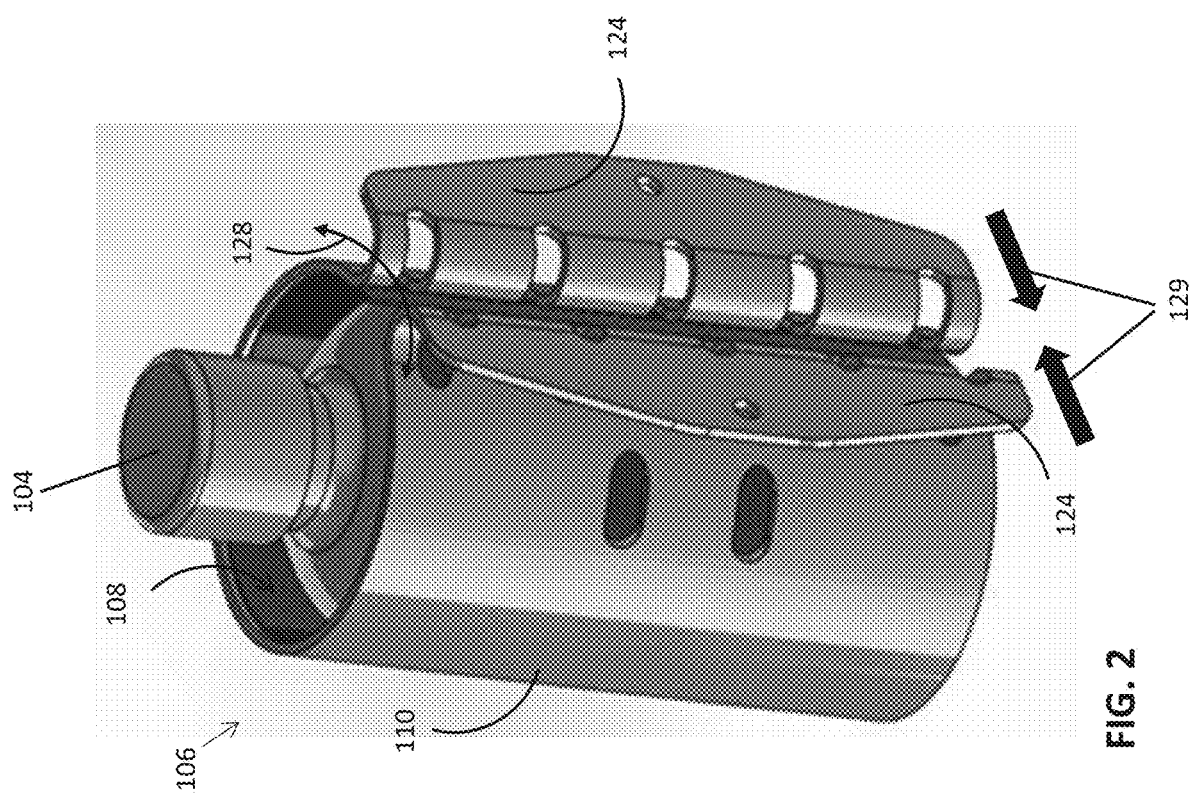
FIG. 2 depicts a perspective view of a moveable gripper according to non-limiting embodiments of the invention.
Figure 3:
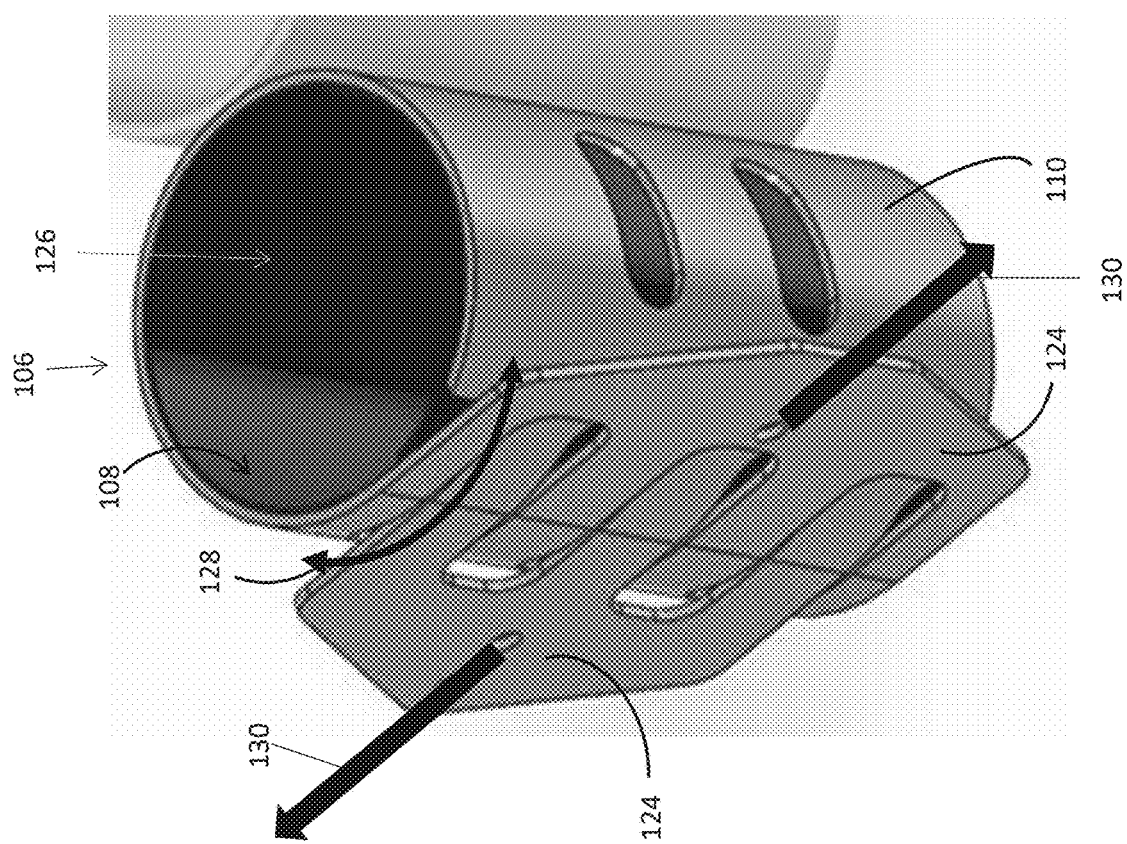
FIG. 3 depicts a perspective view of a moveable gripper according to non-limiting embodiments of the invention.

The moveable gripper 106 is illustrated in greater detail in FIGS. 2 and 3 in accordance with embodiments of the invention. More specifically, FIGS. 2 and 3 depict examples of how the gripping force can be applied to the movable outer sleeve heater assembly 110 of the moveable gripper 106 in accordance with aspects of the invention. In some embodiments of the invention, the moveable gripper 106 includes first and second opposing flaps 124 coupled to the moveable outer sleeve heater assembly 110. A first one of the flaps 124 is coupled to a first one of the moveable arms 122 and a second one of the flaps 124 is coupled to a second one of the moveable arms 122. Although first and second opposing flaps 124 and first and second moveable arms 122 are described, it should be appreciated that the other configurations for coupling the moveable gripper 106 to the clamping assembly 123 can be envisioned without departing from the scope of the invention. Accordingly, the moveable gripper 106, which in some embodiments of the invention is formed from semi-rigid material, is flexed into a cylindrical or substantially cylindrical shape corresponding to the shape of the adjustable opening 126. In one or more non-limiting embodiments of the invention, the moveable gripper 106 can have a vertical height ranging, for example, from about, 100 millimeter (mm) to about 180 mm. The adjustable opening 126 can define a varying diameter that can range, for example, from about 50 millimeters (mm) to about 85 mm.

As shown in FIG. 2, by adjusting the first and second moveable flaps 124 (e.g., laterally as indicated by directional arrows 129), the moveable gripper 106 can be compressed (as indicated by directional arrows 129) and the diameter or size of the adjustable opening 126 can be varied to accommodate a wide variety of sizes and shapes of the container 104. For example, in some embodiments of the invention, the diameter or size of the adjustable opening 126 can be varied between from about 50 millimeters (mm) to about 85 mm. In some embodiments of the invention, the diameter or size of the adjustable opening 126 can be varied between from about 90 mm to about 100 mm. In this manner, the moveable gripper 106 can receive containers having a wide variety of shapes and sizes. Although the moveable gripper 106 is described herein as having a cylindrical profile, the moveable gripper 106 can be constructed to have other shapes and profiles without departing from the scope of the invention.

As shown in FIG. 3, rather than applying a gripping force (e.g., a squeezing force) that compresses the flaps 124 together, the flaps 124 shown in FIG. 3 are configured such that the gripping force (e.g., a pulling force) applies a tensile force (indicated by the directional arrows 130) on the flaps 124. Accordingly, the moveable gripper 106 applies a tension on the container 104 (shown in FIGS. 1-3) inserted in the adjustable opening 126.

In embodiments of the invention, the mechanical energy source(s) 128 are part of the mechanical energy source mechanism that physically couples to the moveable outer sleeve heater assembly 110 and operates under the influence of the controller 112 to initiate and dynamically control an agitation operation that imparts agitation to the moveable gripper 106 and a container 104 being gripped by the moveable gripper 106. In some embodiments of the invention, the motor mechanism includes the mechanical energy source(s) 128 and the coupling mechanism 132 configured to convert mechanical energy generated by the mechanical energy source(s) 128 to movement by moveable gripper 106, wherein the movement includes movement in any direction along the X/Y/Z axes 102 that agitates the moveable gripper 106. In some embodiments of the invention, the coupling mechanism can be implemented as the gripper actuator 121, the clamping assembly 123, and the moveable arms 122. In response to receiving a command to enhance or improve how evenly (or uniformly) heat is being distributed to the contents of the container 104 disposed in the moveable gripper 106, or based on a determination that the heat is not being evenly (or uniformly) distributed to the contents of the container 104 disposed in the moveable gripper 106, the controller 112 can dynamically control the mechanical energy source(s) 128 to repeatedly or continuously agitate the moveable gripper 106. In some embodiments of the invention, the agitation can be performed during a selected portion of a heating process or cycle, while in some embodiments of the invention the agitation can be continuously performed over the full duration of a heating process or cycle.

In one or more embodiments of the invention, the controller 112 can dynamically control the agitation duration, agitation frequency, agitation speed, acceleration and/or range of rotation at which the mechanical energy source(s) 128 move the gripper actuator 121 in any direction along the X/Y/Z axes 102 based on feedback data (e.g., rotational frequency or speed) provided by the mechanical energy source sensors 119. In embodiments of the invention, the characteristics of the agitation (e.g., agitation frequency, agitation speed, range of rotation, and/or duration of agitation) can be actively determined by the controller 112 based on a manual input 111 and/or container data corresponding to the container 104 disposed in the moveable gripper 106. The container data includes, for example, the manufacturer (or source) of the container 104, the container contents, the material of the container 104, the shape of the container 104, the size/dimensions of the container 104, and the like. In one or more non-limiting embodiments of the invention, the characteristics of the agitation (e.g., agitation frequency, agitation speed, range of rotation, and duration of agitation) performed by the system 100 is actively and dynamically controlled based on feedback from temperature sensors that are included among the measurement sensors 116.

FIGS. 4A-6E depict graphs and block diagrams that illustrate how, in accordance with embodiments of the invention, efficient heat transfer between the flexible inner sleeve heater assembly 108 (e.g., Material A) and the walls of the container 104 (e.g., Material B) is provided by dynamically controlling the gripping forces 404, 414 (shown in FIGS. 4A-4D and 6A-6D) applied to the movable outer sleeve 110 (shown in FIG. 1) such that the gripping force 414 is sufficient to dynamically control, improve, and/or achieve a targeted level of a TLTC between the flexible inner sleeve heater assembly 108 (e.g., Material A) and the container 104 (e.g., Material B).

Figure 4A:
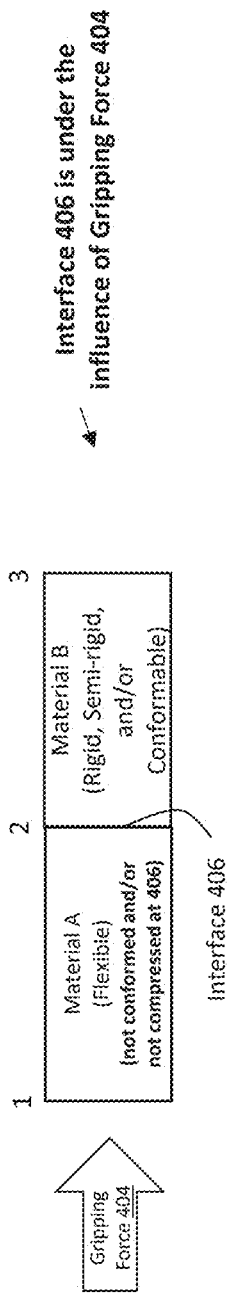
FIG. 4A depicts a block diagram showing a Material A in contact with a Material B in accordance with non-limiting embodiments of the invention.

Turning first to FIGS. 4A-4D, block diagrams are shown that illustrate a portion of a Material A (corresponds to the flexible inner sleeve heater assembly 108) in contact with a portion of a Material B (corresponds to a wall of the container 104). In FIG. 4A, in accordance with aspects of the invention, Material A can be a flexible material having varying levels of conformability and/or compressibility, and Material B can be a rigid and/or semi-rigid material. As used herein, the term "compressible" is used to define a material having the characteristic whereby its volume can change as a response to a pressure (or mean stress) change. As used herein, the term "conformable" is used to define a first material having the characteristic whereby its shape (and/or its surface topology) can conform to or track the topology of a second material when the first and second materials are pressed into contact with one another. As used herein, a compressible material is understood to be both flexible and conformable. However, a flexible material may or may not be compressible depending on the specific physical characteristics of the flexible material; and a flexible material may or may not be conformable depending on the specific physical characteristics of the flexible material. Similarly, as used herein, a "conformable" material is understood to be flexible. However, a conformable material may or may not be compressible depending on the specific physical characteristics of the conformable material. In some embodiments of the invention, Material B can be a rigid material, a semi-rigid material, and/or a material having varying levels of conformability. In some embodiments of the invention, Material A can be multi-layered. In some embodiments of the invention, Material B can be multi-layered (e.g., a wall of the container 104 plus a layer of label material).

In FIG. 4A, a gripping force 404 has been applied to flexible Material A at distance 1 to bring flexible Material A into contact with Material B at an interface 406 at distance 2. In embodiments of the invention, the gripping force 404 is dynamically controlled, which means that the controller 112 is configured to automatically and/or continuously adjust the value of the gripping force 404 based at least in part of various parameters and/or characteristics of the moveable gripper 106, the container 104, and/or the interface 406. Accordingly, the value of the gripping force 404 determined by the controller 112 for a first type of the container 104 can be different from the value of the gripping force 404 determined by the controller 112 for a second type of the container 104. In embodiments of the invention where flexible Material A includes conformable and/or compressible regions, the gripping force 404 is sufficient to bring flexible Material A into contact with Material B without substantially compressing and/or conforming flexible Material A and/or Material B at the interface 406. In embodiments of the invention, no adhesive is present at the interface 406, so only the gripping force 404 maintains Material A in contact with Material B. In aspects of the invention, position sensors included among the measurement sensors 116 can be used by the controller 112 to determine that the flexible inner sleeve 108 has made contact with the container 104 to form the interface 406; and the pressure sensors included among the measurement sensors 116 can be used by the controller 112 to determine the gripping force 404 that maintains the flexible inner sleeve 108 in contact with the container 104 to form the interface 406.

Figure 4B:
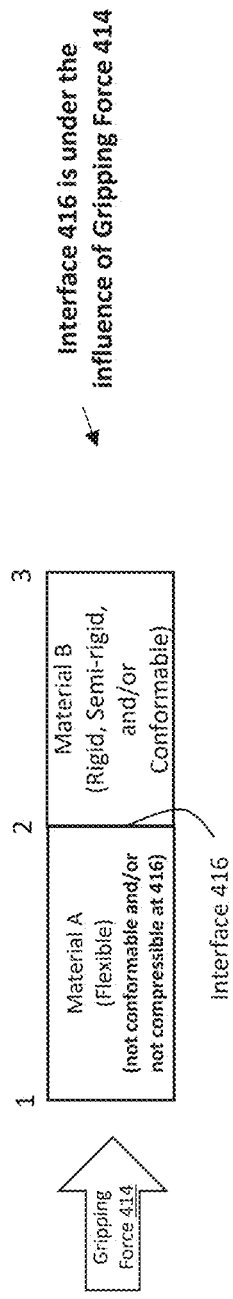
FIG. 4B depicts a block diagram showing a Material A in contact with a Material B in accordance with non-limiting embodiments of the invention.
Figure 4C:
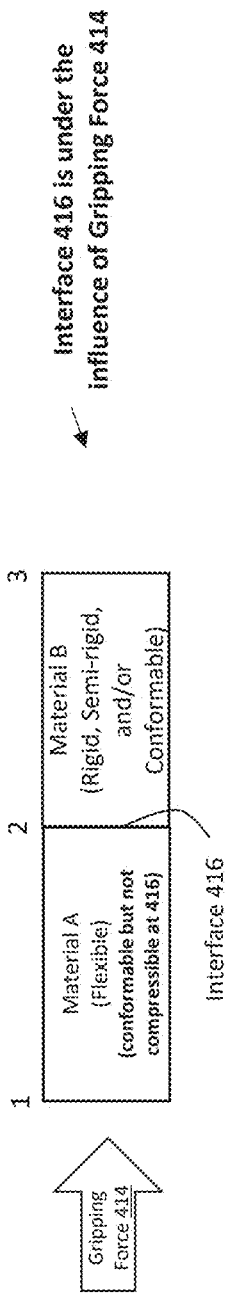
FIG. 4C depicts a block diagram showing a Material A in contact with a Material B in accordance with non-limiting embodiments of the invention.
Figure 4D:
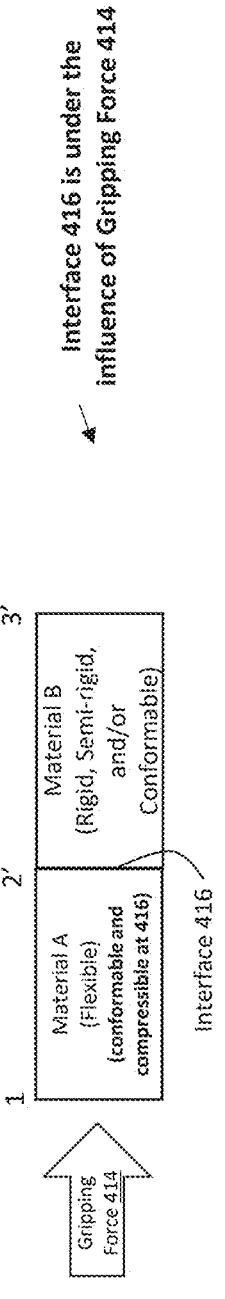
FIG. 4D depicts a block diagram showing a Material A in contact with a Material B in accordance with non-limiting embodiments of the invention.

In FIG. 4B, in accordance with aspects of the invention, a gripping force 414 has been applied to flexible Material A at distance 1 to press flexible Material A against Material B, thereby creating interface 416 at distance 2. In embodiments of the invention, the gripping force 414 is dynamically controlled, which means that the controller 112 is configured to automatically and/or continuously adjust the value of the gripping force 414 based at least in part of various parameters and/or characteristics of the moveable gripper 106, the container 104, and/or the interface 416. Accordingly, the value of the gripping force 414 determined by the controller 112 for a first type of the container 104 can be different from the value of the gripping force 414 determined by the controller 112 for a second type of the container 104. In FIG. 4B, in accordance with aspects of the invention, Material A is non-conformal and not compressed at the interface 416, and Material B is (or includes) rigid material, semi-rigid material, and/or material having varying levels of conformability. In embodiments of the invention, and depending on whether or not Material A and Material B shown in FIGS. 4B-4D are conformable and/or compressible, the gripping force 414 is sufficient to dynamically control, improve, and/or achieve a TLTC between Material A and Material B at the interface 416. In some embodiments of the invention, Material B is not conformable and its outer surface at the interface 416 does not have a topology. In embodiments of the invention where Material B is conformable and its outer surface at the interface 416 has a conformable topology, the gripping force 414 is sufficient to conform the conformable topology of the outer surface of Material B at the interface 416 to the outer surface of Material A at the interface 416.

In FIG. 4C, in accordance with aspects of the invention, Material A is conformable but not compressible at the interface 416, and Material B is (or includes) rigid material, semi-rigid material, and/or material having varying levels of conformability. In embodiments of the invention, the gripping force 414 is sufficient to dynamically control, improve, and/or achieve a TLTC between Material A and Material B at the interface 416. In embodiments of the invention where Material B is not conformable and its outer surface at the interface 416 has a topology, the gripping force 414 is sufficient to conform the conformable outer surface of Material A at the interface 416 to the topology of the outer surface of Material B at the interface 416. In embodiments of the invention where Material B is conformable and its outer surface at the interface 416 has a topology, the gripping force 414 is sufficient to conform the conformable outer surface of Material A at the interface 416 and the conformable topology of the outer surface of Material B at the interface 416 to one another.

In FIG. 4D, in accordance with aspects of the invention, Material A is conformable and compressible at the interface 416, and Material B is (or includes) rigid material, semi-rigid material, and/or material having varying levels of conformability. In accordance with aspects of the invention, a gripping force 414 has been applied to flexible Material A at distance 1 to compress flexible Material A against Material B at an interface 416 at distance 2. In embodiments of the invention where Material B is not conformable and its outer surface at the interface 416 has a non-conformable topology, the gripping force 414 is sufficient to conform the compressible and conformable outer surface of Material A at the interface 416 to the non-conformable topology of the outer surface of Material B at the interface 416. In embodiments of the invention where Material B is conformable and its outer surface at the interface 416 has a conformable topology, the gripping force 414 is sufficient to conform the conformable/compressible outer surface of Material A at the interface 416 and the conformable topology of the outer surface of Material B at the interface 416 to one another.

As previously noted herein, the terms "thermal contact" (TC) and derivatives thereof are used herein to describe contact at an interface between a first material and a second material that is sufficient to exchange heat between the first material and the second material. Additionally, the terms "targeted level of thermal contact" (TLTC) and derivatives thereof are used herein to describe a level of thermal contact at an interface between a first material and a second material that achieves a predetermined level of heat exchange at the interface. In accordance with aspects of the invention, the "targeted level" of thermal contact can include a "maximum level" (or maximized level) of thermal contact between a first material and a second material (e.g., the previously-described maximum (or maximized) level of thermal contact between the flexible inner sleeve and the container). In FIGS. 4B-4D and 5, in accordance with aspects of the invention, the predetermined level of heat exchange at the interface 416 can be achieved by achieving target values and/or ranges for TLTC proxy measurements that include but are not limited to a percentage of air-gaps (i.e., the previously-described AG %) at the interface 416; a temperature gradient at the interface 416; and/or and an interfacial thermal resistance (ITR) level at the interface 416.

FIG. 5 depicts a table 500 illustrating some of the relationships between the dynamically controlled gripping force 414 (shown in FIGS. 4B-4D) and various parameters at the interface 416 (shown in FIGS. 4B-4D) that can be dynamically controlled, improved, and/or achieved using the embodiments of the invention described and illustrated herein. More specifically, the table 500 depicts relationships between the gripping force 414 (first column going from left to right); the interface-parameter at the interface 416 to be dynamically controlled, improved, and/or achieved by the gripping force 414 (second column going from left to right); various proxy measurements and/or estimates (measurement/estimate) for assessing the level of the interface-parameter at the interface 416 (third column going from left to right); and various target values and/or target ranges for the interface-parameter proxy measurements/estimates (fourth column going from left to right). Example relationships are shown in rows 502, 504, 506, 508, 510, 512, 514 for multiple instances of the gripping force 414, namely GF1-A, GF1-B, GF1-C, GF2-A, GF2-B, GF3-A, and GF3-B, along with multiple instances of the interface-parameter, namely a TLTC at the interface 416. In some embodiments of the invention, based on the conformability and/or compressibility of Material A and/or Material B (shown in FIGS. 4A-4D), the TLTC can be maximized.

For row 502, the gripping force 414 is GF1-A; the interface-parameter is a targeted level of thermal contact (TLTC-1 shown in FIG. 6B) at the interface 416; the interface-parameter proxy measurement/estimate is the air-gap percentage (AG %) at the interface 416 that results from GF1-A; and the target values/ranges of the AG % at the interface 416 that can be achieved using aspects of the invention includes a AG % that ranges from about zero (0) percent to about ten (10) percent, or less than about five (5) percent. In accordance with aspects of the invention, the TLTC achieved using GF1-A can be considered "intimate thermal contact." As previously noted herein, the terms "intimate thermal contact" (ITC) and derivatives thereof are used herein to describe a level of thermal contact at an interface between a first material and a second material that achieves an air-gap percentage at the interface that ranges from about zero (0) percent to about ten (10) percent, or that achieves an air-gap percentage at the interface that is less than about five (5) percent. For row 504, the gripping force 414 is GF1-B; the interface-parameter is the TLTC at the interface 416; the interface-parameter proxy measurement/estimate is the AG % at the interface 416 that results from GF1-B (AG %-GF1-B); and the target values/ranges of AG %-GF1-B that can be achieved using aspects of the invention includes AG %-GF1-B being less than AG %-preGF1-B, wherein AG %-preGF1-B is the AG % at the interface 416 prior to the application of GF1-B. For row 506, the gripping force 414 is GF1-C; the interface-parameter is the TLTC at the interface 416; the interface-parameter proxy measurement/estimate is the AG % at the interface 416 that results from GF1-C (AG %-GF1-C); and the target values/ranges of AG %-GF1-C that can be achieved using aspects of the invention includes minimizing AG %-GF1-C and/or bringing AG %-GF1-C below a target AG %-preGF1-C, wherein AG %-preGF1-C is the AG % at the interface 416 prior to the application of GF1-C.

For row 508, the gripping force 414 is GF2; the interface-parameter is the TLTC at the interface 416; the interface-parameter proxy measurement/estimate is ΔT (change in temperature) at the interface 416 that results from GF2 (ΔT-GF2); and the target values/ranges of ΔT-GF2 that can be achieved using aspects of the invention include ΔT-GF2 being less than ΔT-preGF2, wherein ΔT-preGF2 is the ΔT at the interface 416 prior to the application of GF2. For row 510, the gripping force 414 is GF2; the interface-parameter is the TLTC at the interface 416; the interface-parameter proxy measurement/estimate is ΔT at the interface 416 that results from GF2 (ΔT-GF2); and the target values/ranges of ΔT-GF2 that can be achieved using aspects of the invention include minimizing ΔT-GF2 and/or bringing ΔT-GF2 below a target ΔT-GF2 threshold value.

For row 512, the gripping force 414 is GF3; the interface-parameter is the TLTC at the interface 416; the interface-parameter proxy measurement/estimate is the Material A parameters, the Material B parameters, and parameters of the interface parameters 416 that can be used to calculate/estimate interfacial thermal resistance (ITR) at the interface 416 under the influence of GF3 (ITR-GF3); and the target values/ranges of ITR-GF3 that can be achieved using aspects of the invention include ITR-GF3 being less than ITR-preGF3, wherein ITR-preGF3 is the ITR at the interface 416 prior to the application of GF3. For row 514, the gripping force 414 is GF3; the interface parameter is the TLTC at the interface 416; the interface parameter proxy measurement/estimate is the Material A parameters, the Material B parameters, and parameters of the interface 416 that can be used to calculate/estimate the ITR at the interface 416 under the influence of GF3 (ITR-GF3); and the target values/ranges of ITR-GF3 that can be achieved using aspects of the invention include minimizing ITR-GF3 and/or bringing ITR-GF3 below a target ITR-GF3 threshold.

Figure 6A:
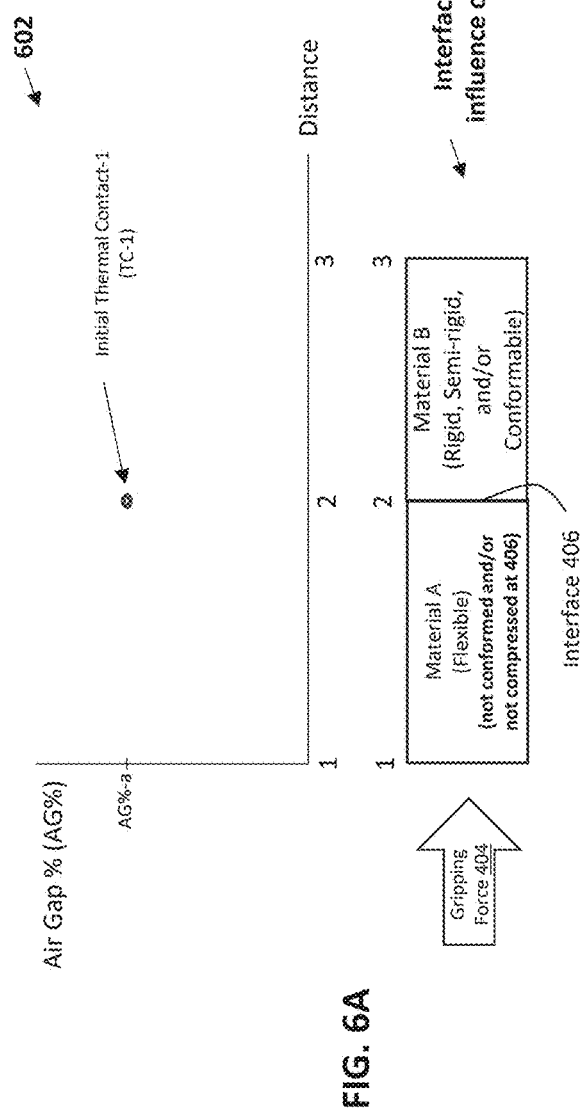
FIG. 6A depicts a graph and a corresponding block diagram showing a Material A in contact with a Material B in accordance with non-limiting embodiments of the invention.
Figure 6B:
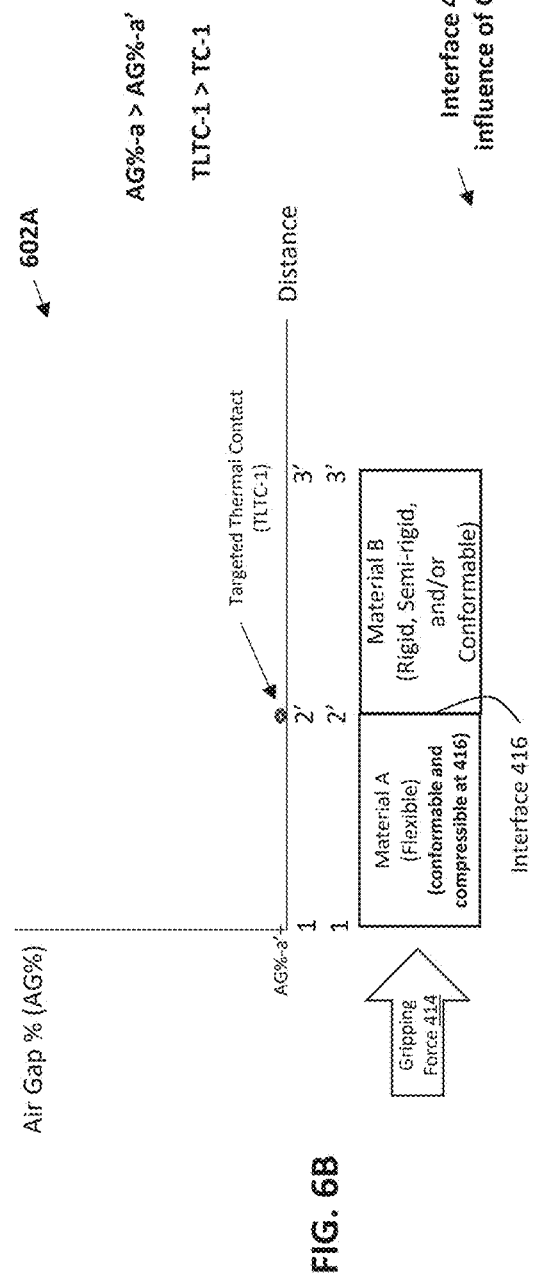
FIG. 6B depicts a graph and a corresponding block diagram showing compressed flexible Material A making sufficient thermal contact (i.e., dynamically increased thermal contact points and dynamically displaced air at the interface) with Material B to efficiently transfer and evenly distribute heat through the interface between Material A and Material B in accordance with non-limiting embodiments of the invention.
Figure 6C:
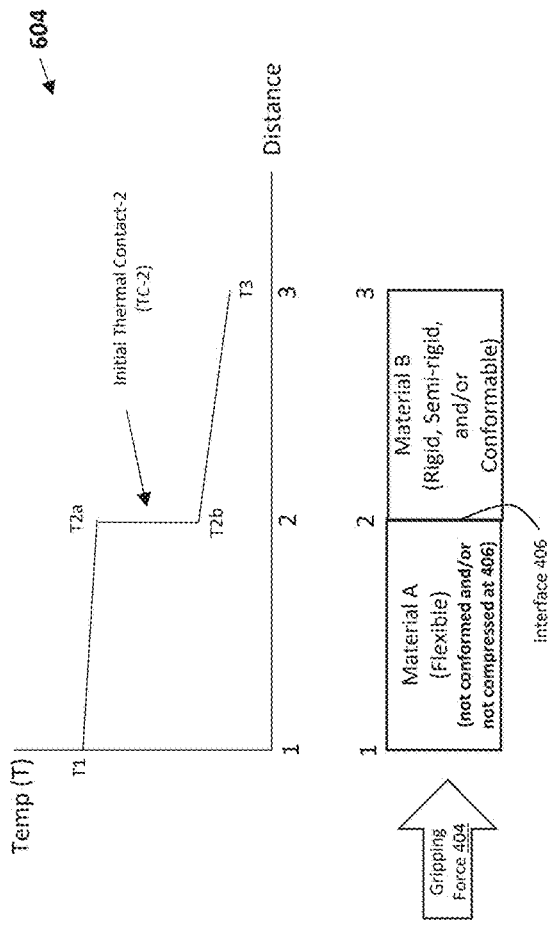
FIG. 6C depicts a graph and a corresponding block diagram showing a Material A in contact with a Material B in accordance with non-limiting embodiments of the invention.
Figure 6D:
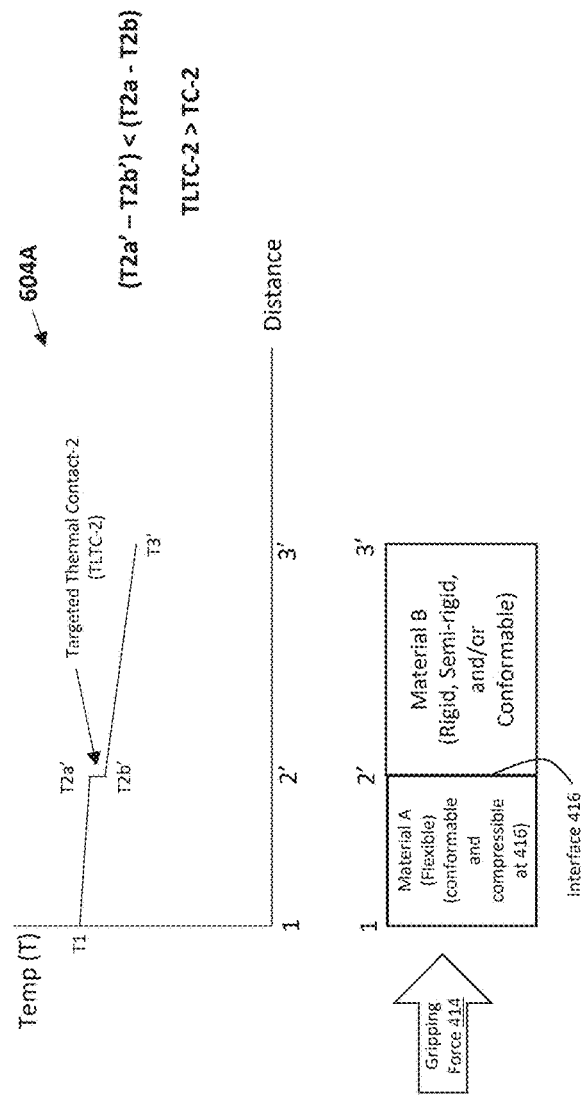
FIG. 6D depicts a graph and a corresponding block diagram showing compressed flexible Material A making sufficient thermal contact (i.e., dynamically increased thermal contact points and dynamically displaced air at the interface) with Material B to efficiently transfer and evenly distribute heat through the interface between Material A and Material B in accordance with non-limiting embodiments of the invention.
Figure 6E:
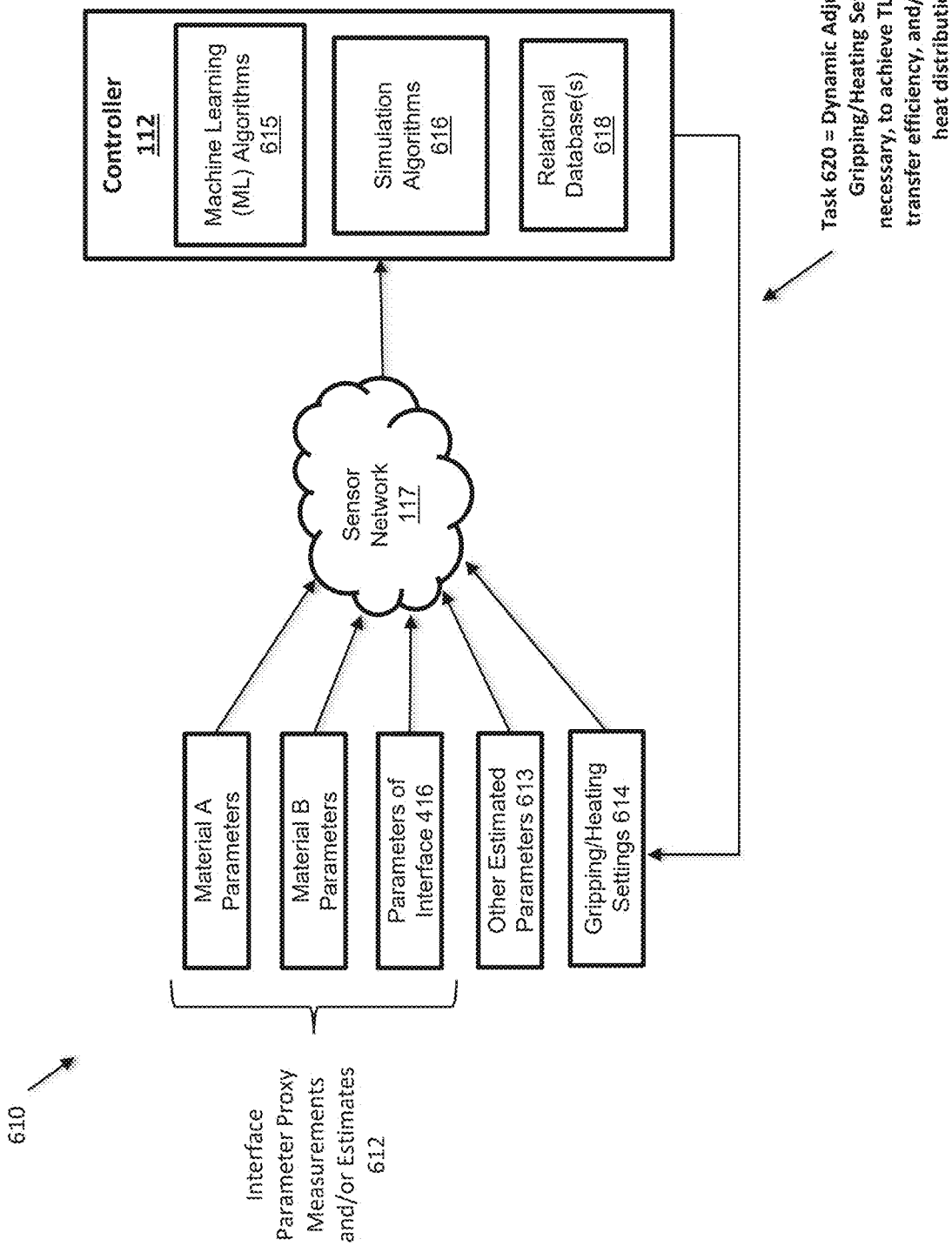
FIG. 6E depicts an example of how a controller and a sensor network can be used to determine adjustments to the gripping/heating settings, if necessary, to achieve a target interfacial thermal resistance level (i.e., dynamically increased thermal contact points between two materials; and dynamically displaced air at the interface between the two materials), heat transfer efficiency, and/or uniform heat distribution in accordance with non-limiting embodiments of the invention.

FIGS. 6A-6D depict graphs and block diagrams (corresponding to the block diagrams shown in FIGS. 4A and 4D) that further illustrate the relationships depicted in FIGS. 4A, 4D, and 5 in accordance with aspects of the invention. More specifically, FIGS. 6A-6D depict embodiments of the invention where the interface-parameter proxy measurement/estimate is the air-gap percentage (AG %) at the interface 416 (FIGS. 6A and 6B), as well as where the interface-parameter proxy measurement/estimate is a temperature change at the interface 416 (FIGS. 6C and 6D). The graphs and block diagrams in FIGS. 6A-6D focus on the pair of examples shown in FIGS. 4A and 4D. However, graphs and block diagrams similar to those shown in FIGS. 6A-6D can be developed for the pair of examples shown in FIGS. 4A and 4B, as well as the pair of examples shown in FIGS. 4A and 4C. Because FIGS. 6A-6D convey the essential concepts applicable to all of the example pairs shown in FIGS. 4A-4D (specifically, FIGS. 4A and 4B; FIGS. 4A and 4C; and FIGS. 4A and 4D), graphs and block diagrams that correspond to the pair of examples shown in FIGS. 4A and 4B, as well as the pair of examples shown in FIGS. 4A and 4C, have been omitted in the interest of brevity.

FIGS. 6A and 6B depict graphs and block diagrams that illustrate the relationships depicted at rows 502, 504, 506 of the table 500 (shown in FIG. 5). Turning first to FIG. 6A there is depicted a graph 602, along with a corresponding block diagram, which is the same block diagram shown in FIG. 4A. The block diagram in FIG. 6A shows a portion of a Material A in contact with a portion of a Material B. In accordance with aspects of the invention, Material A is a flexible material, and Material B is a rigid, semi-rigid, and/or conformable material. In accordance with aspects of the invention, Material A can be a flexible material having varying levels of conformability and/or compressibility, and Material B can be a rigid and/or semi-rigid material. In some embodiments of the invention, Material B can be a rigid material or a semi-rigid material having varying levels of conformability. A gripping force 404 has been applied to flexible Material A at distance 1 to bring flexible Material A into contact with Material B at an interface 406 at distance 2. In embodiments of the invention where flexible Material A is conformable and/or compressible at the interface 406, the gripping force 404 is sufficient to bring flexible Material A into contact with Material B without substantially compressing and/or conforming flexible Material A and/or Material B at the interface 406.

In accordance with aspects of the invention, flexible Material A includes heat generating elements (e.g., elements 208, 208' shown in FIGS. 8A-10C) configured to generate heat that propagates through flexible Material A, the Material A/Material B interface (can be 406 and/or 416), and Material B. In embodiments of the invention where Material B corresponds to the container 104, the heat that propagates through the container 104 and goes into the contents of the container 104 to heat the contents of the container 104. In embodiments of the invention, the controller 112 can be configured to activate or initiate the heat generating elements at selected power levels and time(s) during the application of the various values for the gripping forces 404, 414. For example, the controller 112 can be configured to initiate/activate the heat generating elements at selected power levels around the time (e.g., just before or just after) a determination that flexible Material A has contacted Material B under the gripping force 404 to form the interface 406. Adjustments to the gripping force that are applied subsequent to establishing the gripping force 406 are considered adjustments to the gripping force 414. Subsequent to establishing the gripping force 404, the controller 112 is configured to dynamically control the gripping force 414, which means that the controller 112 is configured to automatically and/or continuously adjust the value of the gripping force 414 based at least in part of various parameters and/or characteristics (measured, estimated, downloaded, input, and the like) of the moveable gripper 106, the container 104, the contents of the container 104, and/or the interface 416. For example, the controller 112 can be configured dynamically control the gripping force 414 toward the goal of minimizing the AG % at the interface 416. Accordingly, the controller 112 can determine the AG % at the interface 416 at Time1 (e.g., through sensor data and/or calculations); adjust the gripping force 414 at Time2; determine the AG % at the interface 416 at Time3; and compare the AG % at Time1 with the AG % at Time3. If the AG % at Time1 is not greater than the AG % at Time3, the controller 112 concludes that the gripping force 414 applied at Time2 did not reduce the AG %, and the controller 112 further concludes that the AG % has been minimized. On the other hand, if the AG % at Time1 is greater than the AG % at Time3, the controller 112 concludes that the gripping force 414 applied at Time2 reduced the AG %. The controller 112 continues the pattern of operations used at Time1, Time2, and Time3 until adjustments to the griping force 414 no longer result in reductions to the AG %, and the controller 112 thereby concludes that the AG % has been minimized. Additional similar examples can be generated for the other interface-parameter measurements/estimates depicted in the table 500 (shown in FIG. 5).

In another example, the controller 112 can be configured to delay initiating/activating the heat generating elements at selected power levels until after the controller 112 has selected and applied an initial value for the gripping force 414. In some aspects of the invention, the initial value of the gripping force 414 can be randomly selected. In some aspects of the invention, the initial value of the gripping force 414 can be based on an estimate of what the final value of the gripping force 414 should be in order to achieve the TLTC goal for the interface 416. As previously noted herein, subsequent to setting the gripping force 404 that brings flexible Material A into contact with Material B to form the interface 406, additional adjustments to the gripping force are considered adjustments to the gripping force 414. Subsequent to establishing the initial value of the gripping force 414, the controller 112 is configured to dynamically control the gripping force 414, which means that the controller 112 is configured to automatically and/or continuously adjust the value of the gripping force 414 based at least in part of various parameters and/or characteristics (measured, estimated, downloaded, input, and the like) of the moveable gripper 106, the container 104, the contents of the container 104, and/or the interface 416. For example, the controller 112 can be configured to dynamically control the gripping force 414 toward the goal of minimizing the AG % at the interface 416. Accordingly, the controller 112 can determine the AG % at the interface 416 at Time1 (e.g., through sensor data and/or calculations); adjust the gripping force 414 at Time2; determine the AG % at the interface 416 at Time3; and compare the AG % at Time1 with the AG % at Time3. If the AG % at Time1 is not greater than the AG % at Time3, the controller 112 concludes that the gripping force 414 applied at Time2 did not reduce the AG %, and the controller 112 further concludes that the AG % has been minimized. On the other hand, if the AG % at Time1 is greater than the AG % at Time3, the controller 112 concludes that the gripping force 414 applied at Time2 reduced the AG %. The controller 112 continues the pattern of operations used at Time1, Time2, and Time3 until adjustments to the griping force 414 no longer result in reductions to the AG %, and the controller 112 thereby concludes that the AG % has been minimized. Additional similar examples can be generated for the other interface-parameter measurements/estimates depicted in the table 500 (shown in FIG. 5).

In embodiments of the invention where the controller 112 activates or initiates the heat generating elements at selected power levels around the time (e.g., just before or just after) a determination that flexible Material A has contacted Material B under the gripping force 404 to form the interface 406, the heat generating elements of the flexible Material A impart heat to flexible Material A and raise a temperature of flexible Material A at distance 1. Due to the intrinsic thermal conductivity characteristics of flexible Material A, as the heat passes through flexible Material A there is some heat transfer, which results in the temperature of flexible Material A changing from an initial temperature level at distance 1 to a lower temperature level at distance 2. As the heat generated in flexible Material A crosses the interface 406 between flexible Material A and Material B at distance 2, the temperature at the interface drops again from the lower temperature level at distance 2 moving across the interface 416 at distance 2. This temperature drop across the interface 406 at distance 2 represents an initial level of thermal contact (TC-1) between Material A and Material B under the influence of gripping force 404, as well as an initial level of the interfacial thermal resistance (ITR-1) between flexible Material A and Material B under the influence of gripping force 404.

There are two modes of heat transfer through the interface 406 between flexible Material A and Material B at distance 2. The first heat transfer mode is through points of solid-to-solid contact between flexible Material A and Material B, and the second heat transfer mode is through the gas-filled (e.g., air-filled) gaps between flexible Material A and Material B. By selecting a flexible Material A having a relatively high thermal conductivity, the heat transfer at solid-to-solid contact between flexible Material A and Material B is relatively efficient. However, heat transfer at gas/air-filled gaps between flexible Material A and Material B is inherently inefficient because of the low thermal conductivity of gas/air in comparison to flexible Material A and Material B. Even in instances where two surfaces have been processed for smoothness, there will be post-processing surface roughness due to machining and other process limitations that results in a relatively large number of tiny gas/air-gaps between the surfaces when they are placed in contact with one another.

Referring still to FIG. 6A, the graph 602 is a plot of the air gap % (AG %) versus distance for Material A in contact with Material B under the influence of gripping force 404. As shown at distance 2, AG %-a represents a relatively high level of gas/air-gaps between flexible Material A and Material B and results in a relatively low initial level of thermal contact (TC-1) between flexible Material A and Material B at the interface 406 under the influence of gripping force 404. Additionally, in accordance with embodiments of the invention, Material B can have a topology (e.g., ridges, creases, and the like) based on aesthetic and/or functional requirements of Material B (e.g., where Material B is a wall of the container 104). The presence of a surface topology on Material B at distance 2 further increases gas/air-gaps between flexible Material A and Material B under the influence of gripping force 404, thereby further decreasing the level of TC-1 between flexible Material A and Material B at the interface 406 under the influence of gripping force 404.

FIG. 6B depicts a graph 602A, along with a corresponding block diagram showing compressed flexible Material A in contact with Material B at the interface 416 under the influence of gripping force 414 in accordance with aspects of the invention. The graph 602A is substantially the same as the graph 602 (shown in FIG. 6A) except graph 602A shows the AG % at an interface 416 that results from a gripping force 414 being applied to flexible Material A to compress flexible Material A against Material B, which results in the distance from distance 1 to distance 2' shown in FIG. 6B being less than the distance from distance 1 to distance 2 shown in FIG. 6A. The block diagram shown in FIG. 6B is the same block diagram shown in FIG. 4D. In accordance with aspects of the invention, the gripping force 414 and the flexibility of compressed flexible Material A are sufficient to push compressed flexible Material A at the Material A/Material B interface 416 into the previously-described gas/air-filled spaces that result from the roughness and/or topology on the contacting surfaces of Material A and/or Material B, thereby reducing and/or substantially eliminating gas/air-gaps at the Material A/Material B interface 416 (shown as AG %-a' in FIG. 6B). Accordingly, FIG. 6B depicts that AG %-a is greater than AG %-a'; and further depicts that the TLTC-1 that results from AG %-a' is greater than the TC-1 that results from AG %-a.

FIGS. 6C and 6D depict graphs and block diagrams (corresponding to the block diagrams shown in FIGS. 4A and 4D) that further illustrate the relationships depicted at rows 508, 510 of the table 500 (shown in FIG. 5). Turning first to FIG. 6C there is depicted a graph 604, along with a corresponding block diagram showing a portion of a Material A in contact with a portion of a Material B. The graph 604 is a plot of temperature versus distance for Material A in contact with Material B, and the block diagram shown in FIG. 6C is the same as the block diagram shown in FIG. 4A. In accordance with aspects of the invention, the block diagram in FIG. 6C shows Material A as a flexible material, and Material B as a rigid, semi-rigid, and/or conformable material. In accordance with aspects of the invention, Material A can be a flexible material having varying levels of conformability and/or compressibility, and Material B can be a rigid and/or semi-rigid material. In some embodiments of the invention, Material B can be a rigid material or a semi-rigid material having varying levels of conformability. A gripping force 404 has been applied to flexible Material A at distance 1 to bring flexible Material A into contact with Material B at an interface 406 at distance 2. In embodiments of the invention where flexible Material A is conformable and/or compressible, the gripping force 404 is sufficient to bring flexible Material A into contact with Material B without substantially compressing and/or conforming flexible Material A and/or Material B at the interface 406. In accordance with aspects of the invention, flexible Material A includes heat generating elements that impart heat to flexible Material A and raise a temperature of flexible Material A to T1 at distance 1. Due to the intrinsic thermal conductivity characteristics of flexible Material A, as the heat passes through flexible Material A there is some heat loss, which results in the temperature of flexible Material A changing from T1 at distance 1 to T2a at distance 2. As the heat generated in flexible Material A crosses the interface 406 between flexible Material A and Material B at distance 2, the temperature at the interface drops from T2a to T2b, and this drop is the interfacial thermal resistance (ITR-1) between flexible Material A and Material B.

As previously described herein, there are two modes of heat transfer through the interface 406 between flexible Material A and Material B at distance 2. The first heat transfer mode is through points of solid-to-solid contact between flexible Material A and Material B, and the second heat transfer mode is through the gas-filled (e.g., air-filled) gaps between flexible Material A and Material B. By selecting a flexible Material A having a relatively high thermal conductivity, the heat transfer at solid-to-solid contact between flexible Material A and Material B is relatively efficient. However, heat transfer at gas/air-filled gaps between flexible Material A and Material B is inherently inefficient because of the low thermal conductivity of gas/air in comparison to flexible Material A and Material B. Even in instances where two surface have been processed for smoothness, due to machining and other process limitations, there will be post-processing surface roughness that results in a relatively large number of tiny gas/air-gaps between the surfaces when they are placed in contact with one another. Accordingly, at distance 2, the presence of gas/air-gaps between flexible Material A and Material B results in the temperature drop from T2a to T2b, and this temperature drop reflects the level of initial thermal contact (TC-2) between flexible Material A and Material B. Additionally, in accordance with embodiments of the invention, Material B can have a topology (e.g., ridges, creases, and the like) based on aesthetic and/or functional requirements of Material B (e.g., where Material B is a wall of the container 104). The presence of a surface topology on Material B at distance 2 further increases gas/air-gaps between flexible Material A and Material B, thereby further increasing TC-1. As the heat at the Material A/Material B interface 406 moves through Material B, the temperature changes from T2b at distance 2 to T3 at distance 3, and the change from T2b to T3 is substantially due to intrinsic thermal conductivity characteristics of Material B.

FIG. 6D depicts a graph 604A, along with a corresponding block diagram showing compressed flexible Material A in a TLTC with Material B at the interface 416 in accordance with aspects of the invention. The graph 604A is a plot of temperature versus distance for compressed flexible Material A in contact with Material B. Material B in FIG. 6D is substantially the same as Material B in FIG. 6C. Compressed flexible Material A in FIG. 6D is substantially the same as flexible Material A in FIG. 6C, except, in accordance with aspects of the invention, a gripping force 414 has been applied to flexible Material A in FIG. 6D to compress flexible Material A against Material B, which results in the distance from distance 1 to distance 2' shown in FIG. 6D being less than the distance from distance 1 to distance 2 shown in FIG. 6C.

In accordance with aspects of the invention, the gripping force 414 and the flexibility of compressed flexible Material A at the interface 416 are sufficient to push compressed flexible Material A at the Material A/Material B interface 416 into the previously-described gas/air-filled spaces that result from the roughness and/or topology on the contacting surfaces of Material A and Material B, thereby reducing and/or substantially eliminating gas/air-gaps at the Material A/Material B interface 416. In accordance with aspects of the invention, as the heat generated in compressed flexible Material A crosses the interface 416 between compressed flexible Material A and Material B at distance 2', the temperature at the interface drops from T2$a$' to T2$b$', and this temperature drop represents the targeted thermal contact (TLTC-2) between compressed flexible Material A and Material B. In accordance with embodiments of the invention, the difference between T2$a$' and T2$b$' (which can be detected using the measurement sensors 116) is less than the difference between T2$a$ and T2$b$ (which can be detected using the measurement sensors 116), and TLTC-2 is greater than TC-2. In accordance with aspects of the invention, the gripping force 414 and the flexibility of compressed flexible Material A are sufficient to result in the difference between T2$a$' and T2$b$' being less than a predetermined threshold, which reflects that TLTC-2 is greater than a predetermined threshold. As the heat at the Material A/Material B interface moves through Material B, the temperature changes from T2$b$' at distance 2' to T3' at distance 3', and the change from T2$b$' to T3' is substantially due to intrinsic thermal conductivity characteristics of Material B.

FIG. 6E depicts a block diagram that further illustrates a supporting system 610, which is a subset of the system 100. The supporting system 610 can be used to control various aspects of the system 100 to dynamically control thermal contact at the interface 416. More specifically, the system 610 can be used to dynamically set and/or make adjustments to the gripping and/or heating (gripping/heating) settings 614 of the system 100 in order to achieve TLTC at the interface 416, as well as achieve substantially efficient transfer and even distribution of heat through the walls of the container 104 to the contents of the container 104. In accordance with aspects of the invention, the gripping/heating settings 614 can include one or more of the various system settings involved in the gripping and/or heating operations performed by the system 100. In some aspects of the invention, the gripping/heating settings 614 include the gripping forces 404, 414; the activation and/or deactivation pattern (i.e., heating pattern(s)) applied to the heating zones A, B (208A, 208B, 208' shown in FIGS. 8A-10C); the power applied to the heating zones A, B; whether the power applied to the heating zones A, B is continuous or pulsed; the duty cycle (duration, pule width, and pulse magnitude) of the pulsed power applied to the heating zones A, B; the initiation of the power applied to the heating zones A, B; and/or whether the system 100 agitates the moveable gripper 106 while the moveable gripper 106 is gripping and transferring heat through the container 104 to the contents of the container 104. In aspects of the invention, TLTC at the interface 416 can be determined based on the relationships depicted at rows 502-514 of the table 500 (shown in FIG. 5).

The supporting system 610 includes the controller 112 communicatively coupled to the sensor network 117. The sensor network 117 is configured to receive data from the system 100 (shown in FIG. 1) about interface-parameter proxy measurements/estimates 612; other estimated parameters 613; and values of the heating/gripping settings 614. The interface-parameter proxy measurements/estimates 612 include Material A parameters (where Material A corresponds to the flexible inner sleeve 108); Material B parameters (where Material B corresponds to the container 104); and parameters of the interface 416. The other estimated parameters 613 can include a variety of parameters that are not easily detected and/or cannot easily be accessed (e.g., through manual inputs 111 or additional data source(s) 115), an example of which includes estimating a temperature at various points along a centerline of the contents of the container 104 (where the container 104 corresponds to Material B), which provides feedback on how evenly or uniformly heat is being delivered to the contents of the container 104. The controller 112 is configured to include machine learning algorithms 615, simulation algorithms 616, and/or relational databases 618, which can be used individually or in any combination to perform task 620 based at least in part on the interface-parameter proxy measurements/estimates 612; the other estimated parameters 613; and/or the values/settings of the gripping/heating settings 614. In embodiments of the invention, the task 620 includes generating dynamic adjustments to the gripping/heating settings 614, if necessary, to achieve TLTC at the interface 416, as well as achieve substantially efficient transfer and even distribution of heat through the walls of the container 104 to the contents of the container 104. In some aspects of the invention, TLTC is represented by the interface-parameter proxy measurements/estimates shown in the table 500 (shown in FIG. 5), which can include predictions of the target interfacial thermal resistance (ITR) levels made by the controller 112 using the machine learning algorithms 615, the simulation algorithms 616, and/or the relational database 618.

In some embodiments of the invention, the controller 112 can be configured to perform task 620 by utilizing the machine learning algorithm 615 to generate and train a model of the gripper sub-assembly 102, the movable gripper 106, the container 104, and/or the contents of the container 104. More specifically, the model can be trained to classify and/or predict the nature of the interface between the flexible inner sleeve heater assembly 108 and the container 104 (e.g., as depicted in the tables 500, 700 shown in FIGS. 5 and 7A; and using the techniques used in FIGS. 6A-6E) in response to the gripping/heating settings 614 applied to the system 100.

In some embodiments of the invention, the controller 112 can be configured to perform the task 620 by utilizing the simulation algorithm(s) 616 to simulate the characteristics of the gripper sub-assembly 102, the movable gripper 106, and/or the container 104. More specifically, the simulation algorithm(s) 616 can be known simulation algorithms configured and arranged to simulate the nature of the interface between the flexible inner sleeve heater assembly 108 and outer walls of the container 104 (e.g., as depicted in the tables 500, 700 shown in FIGS. 5 and 7A; and using the techniques used in FIGS. 6A-6E) in response to the gripping/heating settings 614 applied to the system 100.

In some embodiments of the invention, the controller 112 can be configured to perform the task 620 by dynamically controlling and accessing a relational database 618 stored in a memory location of the controller 112. A suitable relational database 618 that can be used in connection with embodiments of the invention is any relational database configured to provide a means of storing related information (e.g., the interface-parameter proxy measurements/estimates 612, the other estimated settings 613, and/or the gripping/heating settings 614) in such a way that the information and the relationships between the information can be retrieved from it. The data in a relational database can be related according to common keys or concepts, and the ability to retrieve related data from a table is the basis for the term relational database. A relational database management system (RDBMS) of the controller 112 performs the tasks of determining the way data and other information are stored, maintained and retrieved from the relational database of the controller 112. For example, where the targeted ITR is a value denoted by X, the relational database 618 can be used to determine that, based on the current interface-parameter proxy measurements/estimates 612, the gripping force 414 to achieve the targeted ITR value of X should be a gripping force 414 of value Y. The controller 112 would then evaluate the current values of the gripping force 414 and output control signals that make whatever adjustments are necessary to the gripping force 414 to achieve and maintain a gripping force value of Y.

In some embodiments of the invention, the dynamic adjustments performed as part of the task 620 can be considered mitigation strategies that the controller 112 selects and initiates based on the current status of the interface 416. For example, where the other estimated parameters 613 indicate that an upper region of the contents of the container 104 is heating faster (or to a higher temperature) than a lower region of the contents of the container 104, the controller 112 can be configure to perform the dynamic adjustments of task 620 by selecting from a suite of mitigation operations configured to make the heat distribution between the upper and lower regions of the contents of the container 104 more uniform. For example, the controller 112 can be configured to use a model of the system 100, the interface 416, the container 104, and the contents of the container 104 to determine that the mitigation operation or combination of mitigation operations that are most likely the be effective at making the heat distribution between the upper and lower regions of the contents of the container 104 more uniform. In embodiments of the invention, the mitigation operations can include changing the activation and/or deactivation pattern (i.e., heating pattern(s)) applied to the heating zones of the thermal film heater 208, 208'; adjusting the power applied to the heating zones of the thermal film heater 208, 208'; determining whether the power applied to the heating zones is continuous or pulsed; adjusting the duty cycle (duration, pule width, and pulse magnitude) of the pulsed power applied to the heating zones; and determining whether the system 100 agitates the moveable gripper 106 while the moveable gripper 106 is gripping and transferring heat through the container 104 to the contents of the container 104.

FIG. 7A depicts a table 700 illustrating relationships between the gripping force 414 (shown in FIGS. 4B-4D); the nature of Material A at the interface 416 (shown in FIGS. 4B-4D); the nature of Material B at the interface 416; the nature of the topology (e.g., ridges, creases, and the like) of Material B at the interface 416 (shown in FIGS. 4B-4D); and the interface-parameters that can be dynamically controlled, improved, and/or achieved using the embodiments of the invention. In some embodiments of the invention, Material A can be compressible at the interface 416, and rows 702, 704, 706, 708 of the table 700 depict the interface-parameters that can be dynamically controlled, improved, and/or achieved based on various combinations of Material B at the interface 416 and the topology of Material B at the interface 416. As shown, where Material A is compressible at the interface 416, a gripping force 414 (GF4, GF5, GF6, GF7) can be applied that will dynamically control, improve, and/or achieve a TLTC (e.g., TLTC-1 shown in FIG. 6B) that can include ITC. In accordance with aspects of the invention, TLTC can be evaluated using any of the applicable interface-parameter proxy measurements/estimates shown in table 500 (shown in FIG. 5) and the applicable techniques shown in FIGS. 6A-6E.

In some embodiments of the invention, Material A can be conformable at the interface 416, and rows 710, 712, 714, 716 of the table 700 depict the interface-parameters that can be dynamically controlled, improved, and/or achieved based on various combinations of Material B at the interface 416 and the topology of Material B at the interface 416. As shown at rows 710, 712, 716, where Material A is conformable at the interface 416, and for the combinations of Material B at the interface 416 and the Material B topology at the interface 416, a gripping force 414 (GF8, GF9, GF11) can be applied that will dynamically control, improve, and/or achieve a TLTC at the interface 416 (e.g., TLTC-1 shown in FIG. 6B) that can include ITC. In accordance with aspects of the invention, TLTC can be evaluated using any of the interface-parameter proxy measurements/estimates shown in table 500 (shown in FIG. 5) and the applicable techniques shown in FIGS. 6A-6E. As shown at row 714, where Material A is conformable at the interface 416 and Material B at the interface 416 is a rigid material having a topology, a gripping force 414 (GF10) can be applied that will dynamically control, improve, and/or achieve a TLTC at the interface 416. In accordance with embodiments of the invention, TLTC at the interface 416 can include ITC where Material A is sufficiently flexible to fill in depressions at the interface 416 that result from the Material B topology. In accordance with aspects of the invention, TLTC at the interface 416 can be evaluated using any of the applicable interface-parameter proxy measurements/estimates shown in table 500 and the applicable techniques shown in FIGS. 6A-6E.

In some embodiments of the invention, Material A can be flexible but not conformable at the interface 416, and rows 718, 720, 722, 724 of the table 700 depict the interface-parameters that can be dynamically controlled, improved, and/or achieved based on various combinations of Material B at the interface 416 and the topology of Material B at the interface 416. As shown at rows 718, 720, 724, where Material A is flexible but not conformable at the interface 416, and for the combinations of Material B at the interface 416 and the Material B topology at the interface 416, a gripping force 414 (GF12, GF13, GF15) can be applied that will dynamically control, improve, and/or achieve a TLTC (e.g., TLTC-1 shown in FIG. 6B) that can include ITC. In accordance with aspects of the invention, TLTC can be evaluated using any of the interface-parameter proxy measurements/estimates shown in table 500 (shown in FIG. 5) and the applicable techniques shown in FIGS. 6A-6E. As shown at row 722, where Material A is flexible but not conformable at the interface 416 and Material B at the interface 416 is a rigid material having a topology, a gripping force 414 (GF14) can be applied that will dynamically control, improve, and/or achieve a TLTC at the interface 416 (e.g., TLTC-1 shown in FIG. 6B). However, TLTC at row 722 will not be sufficient to include ITC because Material A, albeit flexible, is not sufficiently flexible to fill in depressions at the interface 416 that result from the Material B topology. In accordance with aspects of the invention, TLTC at the interface 416 can be evaluated using any of the applicable interface-parameter proxy measurements/estimates shown in table 500 and the applicable techniques shown in FIGS. 6A-6E.

Figure 7D:
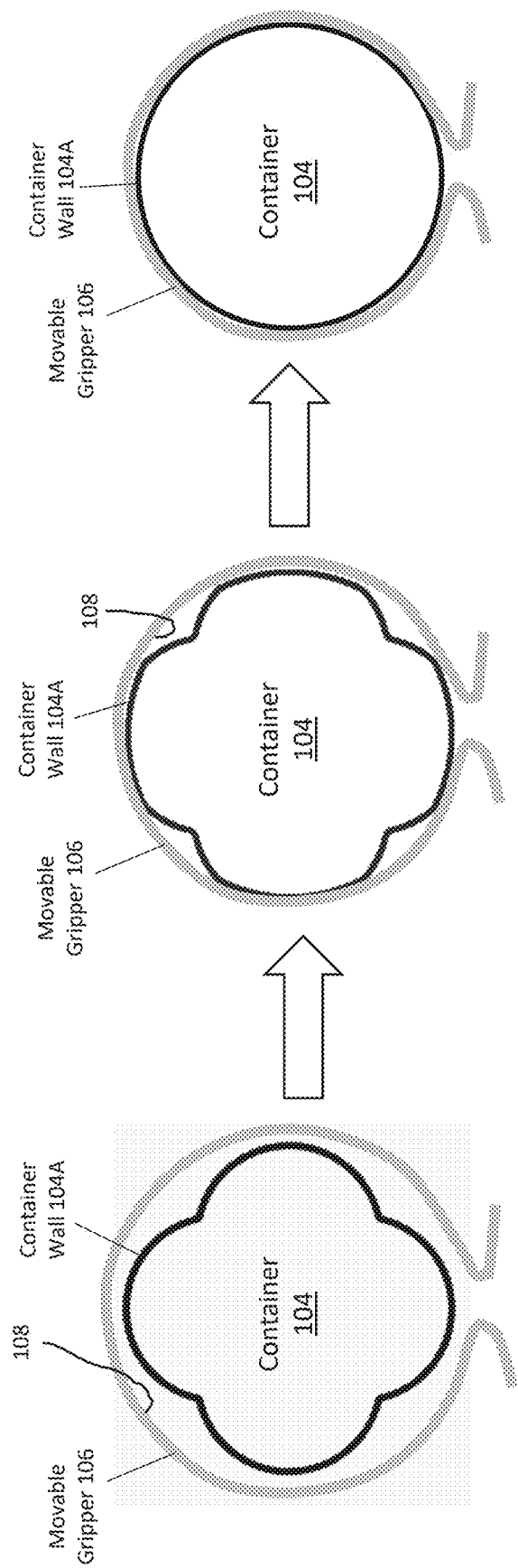
FIG. 7D depicts a sequence of block diagrams illustrating how a flexible inner sleeve contacts and conforms a container wall having a conformable, irregular surface topology in accordance with non-limiting embodiments of the invention.

FIGS. 7B, 7C, and 7D depict cross-sectional views of structures that further illustrate some of the relationships depicted in the table 700, where Material A corresponds to the flexible inner sleeve heater assembly 108, and where Material B corresponds to an outer wall of the container 104. FIGS. 7B and 7C depict an example of an interaction between the flexible inner sleeve heater assembly 108 and a wall 104A of the container 104 that illustrates the relationships depicted in rows 702, 704, 706, 708 of the table 700 (shown in FIG. 7A) in accordance with aspects of the invention. For ease of illustration and explanation, the flexible inner sleeve 108 and the container wall 104A are each substantially planar in FIGS. 7B and 7C. However, it is understood that, in practice, the flexible inner sleeve 108 and the container wall 104A can each be substantially non-planar. The flexible inner sleeve heater assembly 108 includes a region 108A having one or more layers, along with a compressible interface layer 108B. In some embodiments of the invention, the compressible interface layer 108B can be an elastomer material. In some embodiments of the invention, the compressible interface layer 108B can be a filled elastomer or composite material with thermally conductive particles for enhanced thermal conductivity. In some embodiments of the invention, the thermally conductive particles are configured such that compression of the interface layer 108B creates a percolated network of thermally conductive particles that improve the thermal conductivity of the filled elastomer or composite material of the compressible interface layer 108B while having a sufficient thickness that allows the compressible interface layer 108B to conform to whatever height (or depth) irregularities exist based on the presence of a non-conformable container wall topology 104B. In some embodiments of the invention, the compressible interface layer 108B can be a silicone elastomer material. In some embodiments of the invention, the compressible interface layer 108B can be a silicone elastomer material having the thermally conductive particles. The non-conformable container wall topology 104B (e.g., ridges, creases, depressions, and the like) can be provided based on aesthetic and/or functional requirements of the container wall 104A or can be roughness that results from manufacturing or processing of the outer surface of the container wall 104A.

FIG. 7B depicts the flexible inner sleeve heater assembly 108 having a thickness D1 under influence of the gripping force 404 that brings the flexible inner sleeve heater assembly 108 into contact with the container wall 104A but does not compress the inner flexible inner sleeve heater assembly 108. FIG. 7C depicts the flexible inner sleeve heater assembly 108 under the influence of the gripping force 414 that presses the compressible interface layer 108B against the container wall 104A. In accordance with embodiments of the invention, the compressible interface layer 108B has sufficient flexibility and thickness to enable the surface of the compressible interface layer 108B that interfaces with the non-conformable container wall topology 104B to, in response to the gripping force 414, substantially conform to the container wall topology 104B of the container wall 104A. Accordingly, in embodiments of the invention, a TLTC can be dynamically controlled, improved, and/or achieved between the flexible inner sleeve heater assembly 108 and the container 104 in accordance with the relationships depicted in the table 500 even where the outer surface of the container wall 104A includes a topology 104B. Under the influence of the gripping force 414, the thickness of the flexible inner sleeve heater assembly 108 is reduced to D2, which is less than D1.

FIG. 7D depicts a sequence of block diagrams showing top-down, cross-sectional views of how a moveable gripper 106 having a flexible inner sleeve 108 contacts and conforms a container wall 104A of a container 104 in accordance with non-limiting embodiments of the invention, where the container wall 104A includes a conformable, irregular surface topology. The example depicted in FIG. 7D is an example of the relationships defined at row 724 of the table 700 (shown in FIG. 7A). The leftmost image depicts the container 104 within the adjustable opening 126 defined by the moveable gripper 106 but prior to the application of the gripping force 414. The center image depicts the container 104 and the moveable gripper 106 during application of the gripping force 414, wherein the flexible inner sleeve 108 of the moveable gripper 106 has contacted the container wall 104B and started the process of conforming the conformable topology of the container wall 104B to the shape of the moveable gripper 106. The rightmost image depicts the container 104 and the moveable gripper 106 where the gripping force 414 has urged the moveable gripper 106 to conform the conformable topology of the container wall 104B to the shape of the moveable gripper 106, thereby substantially reducing the air gaps and substantially improving the thermal transfer.

Figure 8A:
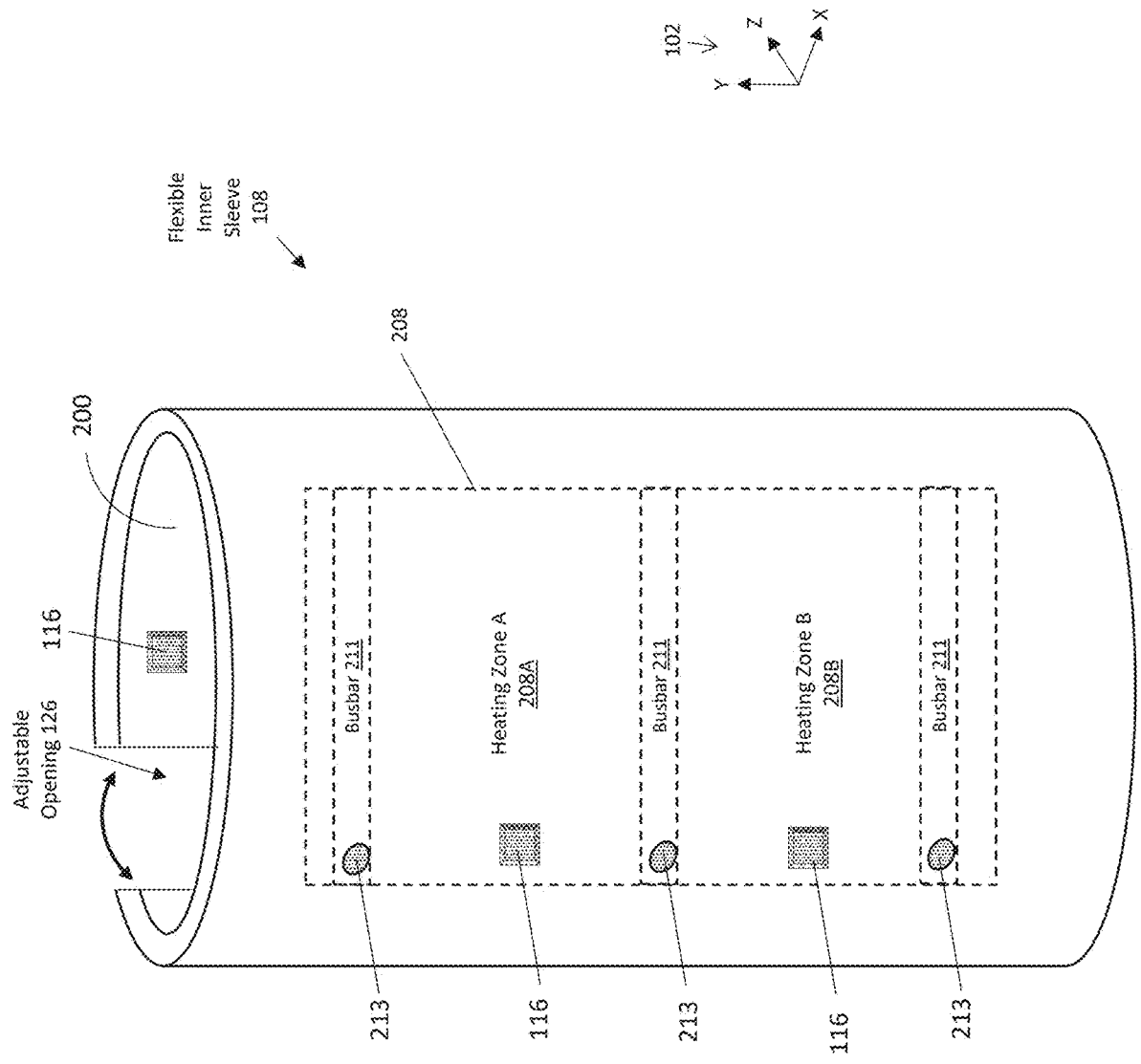
FIG. 8A depicts a perspective view of a flexible inner sleeve heater assembly included in the moveable gripper shown in FIGS. 1-3 rolled into a cylindrical shape according to non-limiting embodiments of the invention.
Figure 8B:
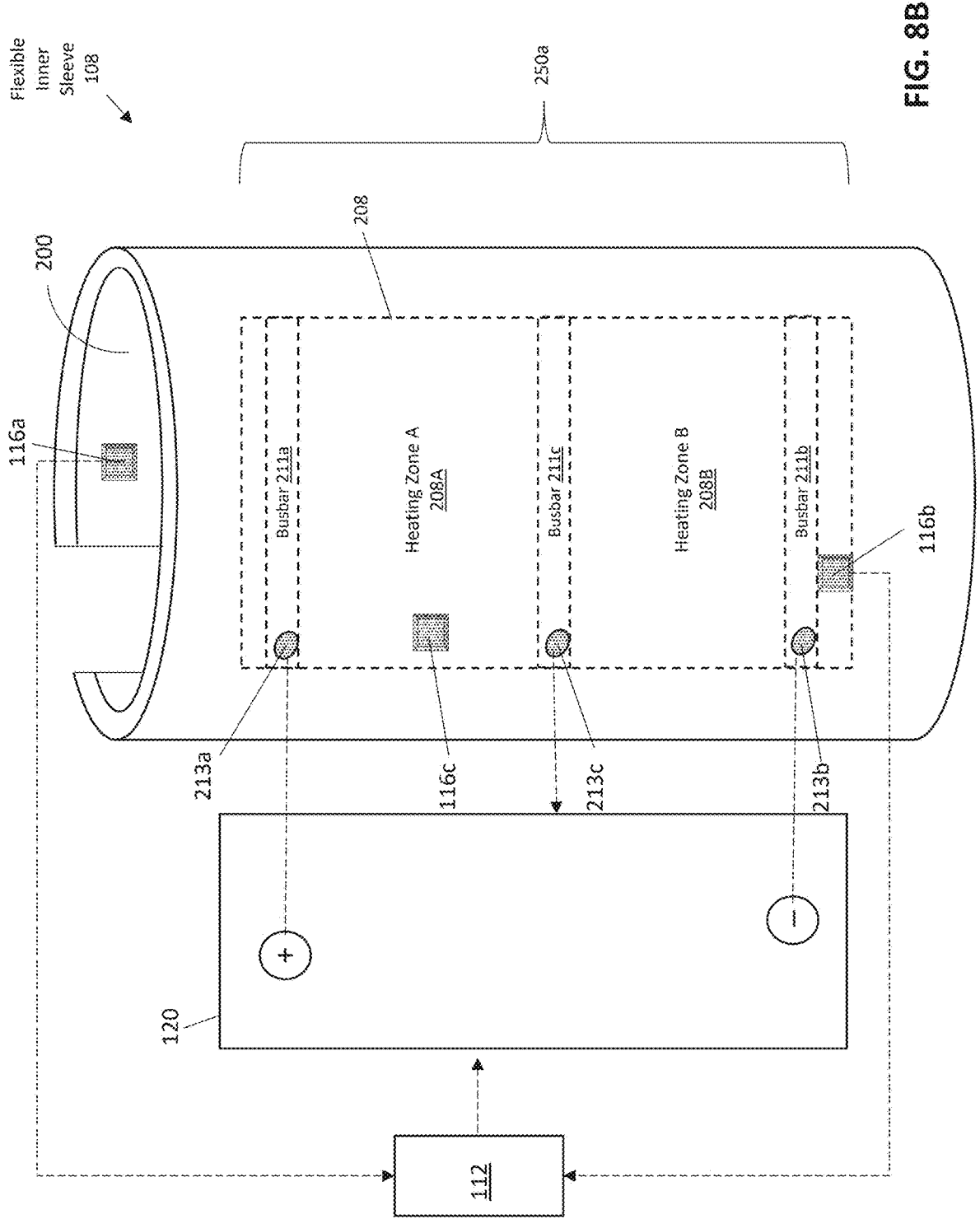
FIG. 8B depicts a first selectable heating zone of a flexible inner sleeve heater assembly according to non-limiting embodiments of the invention.
Figure 8C:
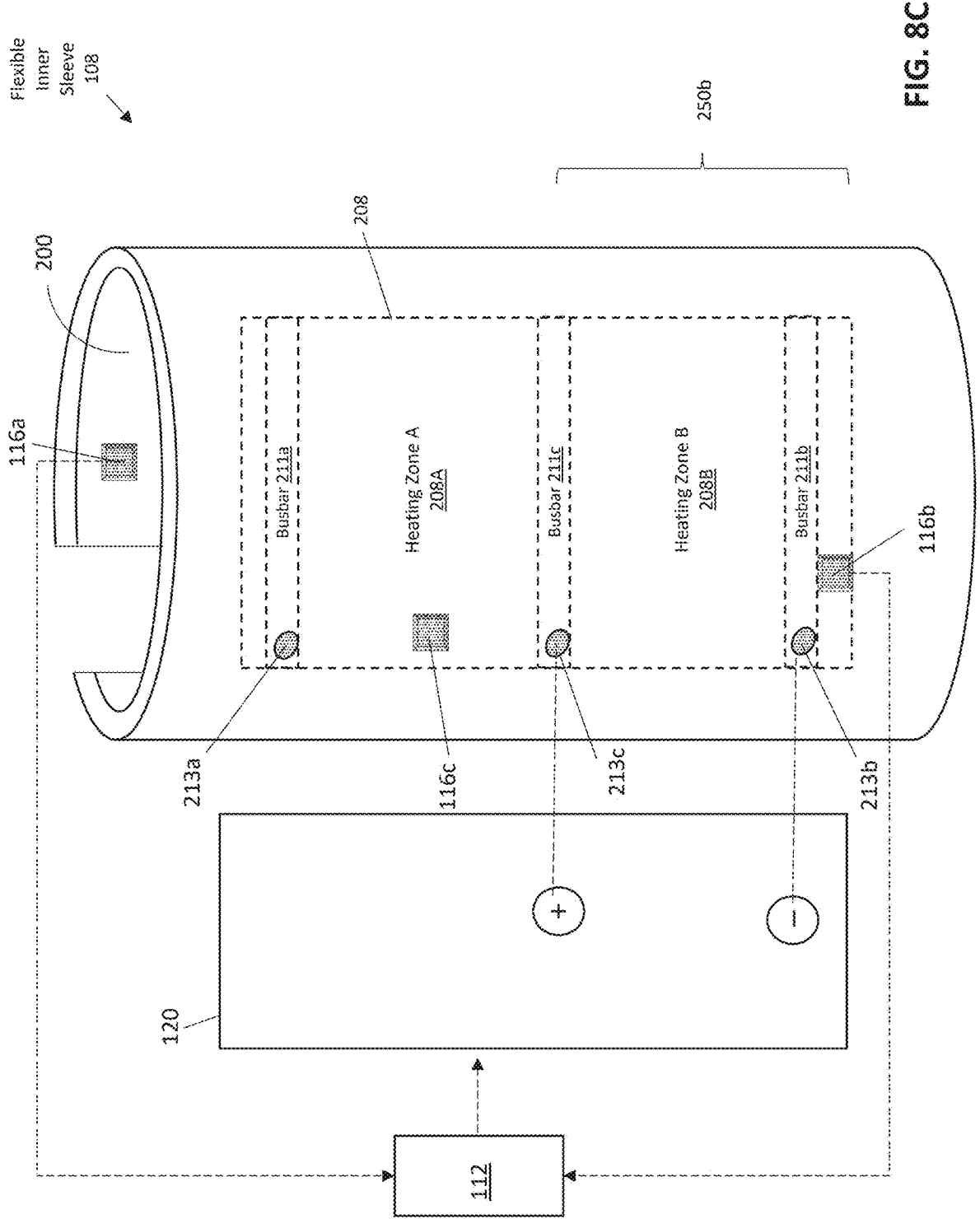
FIG. 8C depicts a second selectable heating zone of a flexible inner sleeve heater assembly according to non-limiting embodiments of the invention.
Figure 8D:
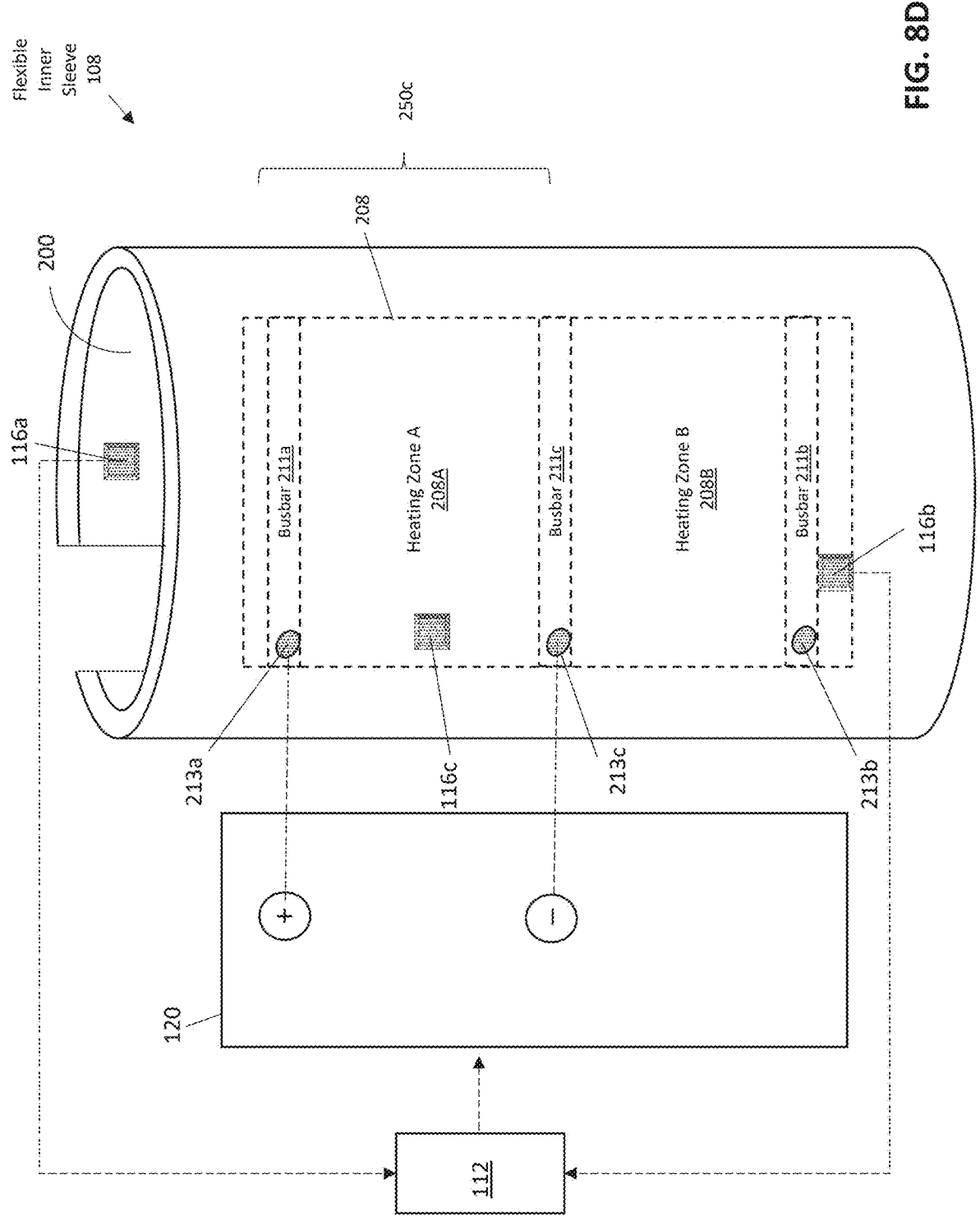
FIG. 8D depicts a third selectable heating zone of a flexible inner sleeve heater assembly according to non-limiting embodiments of the invention.

FIGS. 8A, 8B, 8C, and 8D, depict additional details of how the flexible inner sleeve heater assembly 108 can be implemented according to embodiments of the invention. More specifically, FIG. 8A depicts the flexible inner sleeve heater assembly 108 in a substantially cylindrical shape. In embodiments of the invention, the flexible inner sleeve heater assembly 108 is held in the substantially cylindrical shape shown in FIG. 8A when the flexible inner sleeve heater assembly 108 is coupled to the moveable outer sleeve heater assembly 110 (best shown in FIGS. 2 and 3). Various component parts of the flexible inner sleeve 108 are shown diagrammatically in FIG. 8A as dotted line structures. FIGS. 8B, 8C, 8D depict the flexible inner sleeve heater assembly 108 operating according to different selectable heating zones, which are also referred to herein as selectable heating patterns. Although three heating zones 250a (shown in FIG. 8B), 250b (shown in FIG. 8C), 250c (shown in FIG. 8D) are depicted, it should be appreciated that any number of heating zones can be provided.

As best shown in FIG. 8A, in aspects of the invention, the flexible inner sleeve heater assembly 108 includes a thermal film heater 208 configured to generate heat in response to receiving an applied voltage. In one or more non-limiting embodiments of the invention, the thermal film heater 208 and the busbars 211 are included in a stacked arrangement of individual flexible layers, sheets and/or thin films, examples of which are shown in FIGS. 9A-9D and 10A-10C and described in greater detail subsequently herein. In embodiments of the invention, the busbars 211 pass current to the thermal film heater 208, which generates heat in response to the received current. In embodiments of the invention, the busbars 211 are formed by depositing a layer of conductive material then selectively etching the layer of conductive material to define the busbars 211. The thermal film heater layer 208 serves as the thin film heater and can include various thermal generating materials including, but not limited to, a carbon-filled polyimide (e.g., element 208 shown in FIGS. 9A-9D). In some embodiments of the invention, the busbars 211 can be eliminated and the thermal film heater layer 208 can be a resistive metal and/or an etched resistive metal foil (e.g., element 208' shown in FIGS. 10A-10C). The thickness of the thermal film heater layer 208 can range, for example, from about 12.5 microns (μm) to 75 μm. In some embodiments of the invention, a thermally conductive layer 200 (shown in FIGS. 9A-9D and 10A) is positioned between the thermal film heater 208 and the container 104 (shown in FIGS. 1-3) and serves to assist with uniformly transferring the heat generated by the thermal film heater layer 208 to the container 104 disposed in the adjustable opening 126 so as to assist with uniformly distributing heat to the contents of the container 104.

The individual heating zones A and B can be selectively activated and deactivated independently from one another, which provides the capability to uniformly heat containers of different sizes, shapes, and/or materials received by the inner sleeve heater assembly 108. In addition, a first temperature of a first activated heating zone can be controlled independently from a second temperature of a second activated heating zone. Accordingly, temperatures at different locations of the inner sleeve heater assembly 108 can be independently adjusted to improve the precision of the heat applied to the container. For instance, a lower-portion heating zone can be utilized to heat shorter containers so as to concentrate the heat accordingly. In another example, a lower portion of the moveable gripper 106 can be heated at a first temperature while the upper portion of the moveable gripper 106 can be heated at a different second temperature to properly heat containers having a different material at the container bottom compared to the container top. In another example, the measurement sensors 116 can detect that heat is being delivered unevenly to the container 104, and the heat delivered to each heating zones (i.e., the heating zone pattern) can be controlled (e.g., by the controller 112) in a manner configured to compensate for and correct the uneven heat distribution. In embodiments of the invention, the uneven heat distribution can be detected by using the measurement sensors 116 to determine that the difference between a temperature at a first predetermined location on the container 104 and a temperature at a second predetermined location on the container 104 exceeds a threshold. In embodiments of the invention, the uneven heat distribution can be detected by using the measurement sensors 116 to determine that the difference between a temperature at a first end of the container 104 and a temperature at a second and opposite end of the container 104 exceeds a threshold. In embodiments of the invention, the uneven heat distribution can be detected by using the measurement sensors 116 and the controller 112 to estimate temperature differences between the locations on the container 104 and center-points of the contents of the container 104.

Electrical terminals 213 are attached to the busbars 211, and electric wires (not shown) can be coupled to the electrical terminals 213 to deliver power to the busbars 211. Multiple types of measurement sensors 116 are positioned in various locations on the flexible inner sleeve heater assembly 108 to provide inputs to various control processes executed by the controller 112 (shown in FIGS. 1, and 6E). As previously noted herein, the measurement sensors 116 can include, but are not limited to, a pressure sensor, a container temperature sensor, an ambient/environment temperature sensor, a vibration sensor, an accelerometer, gyroscope, a thermistor, and the like. The measurement sensors 116 can be individually coupled to various locations of the flexible inner sleeve heater assembly 108. In some embodiments of the invention, the measurement sensors 116 can be printed (e.g., using additive manufacturing techniques) on one or more of the individual flexible layers, sheets and/or thin films that form the flexible inner sleeve heater assembly 108. For example, rather than coupling a single individual measurement sensor 116 at a particular location on the flexible inner sleeve heater assembly 108, an array of measurement sensors 116 can be printed on one or more of the individual flexible layers (e.g., a first electrically insulative layer that forms the electrical insulator region 204 shown in FIG. 9B).

The flexible layers that make up the flexible inner sleeve heater assembly 108 are sufficiently flexible to be folded or rolled about a vertically extending center Y-axis (shown at reference axes 102). Accordingly, the flexible inner sleeve heater assembly 108 when attached to the moveable outer sleeve heater assembly 110 is sufficiently flexible to track the movement of the moveable outer sleeve heater assembly 110 while also tracking the cylindrical shape defined by the moveable outer sleeve heater assembly 110. Thus, the moveable outer sleeve heater assembly 110 and the flexible inner sleeve heater assembly 108 define the adjustable opening 126. The adjustable opening 126 allows for a container (e.g., container 104) having a variety of sizes, shapes, and exterior surface topologies to be disposed therein.

FIG. 8B depicts the selectable heating zone 250a of the flexible inner sleeve heater assembly 108 according to embodiments of the invention. The heating zone 250a effectively includes the entire flexible inner sleeve heater assembly 108 spanning from a first busbar 211a of the flexible inner sleeve heater assembly 108 to a second busbar 211b. The heating zone 250a can be selected and activated by applying a first voltage potential (e.g., a positive voltage) to the first busbar 211a via a first terminal 213a and a second voltage potential (e.g., a negative voltage or ground potential) to the second busbar 211b via a second terminal 213b. In this manner, a voltage potential is applied across the entire thermal film heater 208 of the flexible inner sleeve heater assembly 108, which in turn induces current flow through the entire thermal film heater layer 208. Electrical lead wires can then be attached (e.g., via soldering or electrical terminals 213a, 213b, 213c) to the busbars 211 to deliver power to the busbars 211, which deliver their power to thermal film heater layer 208. In this manner, the thermal film heater layer 208 can generate heat in response to a voltage being applied to one or more of the defined busbars 211.

FIG. 8C depicts the selectable heating zone 250b of the flexible inner sleeve heater assembly 108 according to an embodiments of the invention. The heating zone 250b includes a lower portion of the flexible inner sleeve heater assembly 108 (e.g., heater zone B shown in FIGS. 8B and 8C) spanning from a third busbar 211c to the second busbar 211b, while excluding an upper portion of the flexible inner sleeve heater assembly 108 (e.g., heater zone A shown in FIGS. 8B and 8C) spanning from the third busbar 211c to the first busbar 211a (shown in phantom). The heating zone 250b can be selected and activated by applying a first voltage (e.g., a positive voltage) to the third busbar 211c via a third terminal 213c and a second voltage (e.g., a negative voltage or ground potential) to the second busbar 211b via the second terminal 213b. In this manner, a voltage potential is applied across only a portion of the thermal film heater layer 208 of the inner sleeve heater assembly 108. As a result, current flows through the thermal film heater layer 208 from the third busbar 211c to the second busbar 211b, rather than through the entire thermal film heater layer 208.

FIG. 8D depicts the selectable heating zone 250c of the flexible inner sleeve heater assembly 108 according to embodiments of the invention. The heating zone 250b includes the upper portion of the flexible inner sleeve heater assembly 108 (e.g., heater zone A shown in FIGS. 8B and 8C) spanning from the first busbar 211a to the third busbar 211c, while excluding the lower portion of the flexible inner sleeve heater assembly 108 (e.g., heater zone B shown in FIGS. 8B and 8C) spanning from the third busbar 211c to the second busbar 211b (shown in phantom). The third heating zone 250c can be selected and activated by applying a first voltage (e.g., a positive voltage) to the first busbar 211a via the first terminal 213a and a second voltage (e.g., a negative voltage or ground potential) to the third busbar 211c via the third terminal 213c. Again, the voltage potential is applied across only a portion of the thermal film heater layer 208 of the inner sleeve heater assembly 108. In this scenario, however, the current flows through the thermal film heater layer 208 from the first busbar 211a to the third busbar 211c.

Referring still to FIGS. 8B, 8C, 8D, the controller 112 can be in signal communication with the power supply 120, along with measurement sensors 116a and 116b coupled to the flexible inner sleeve heater assembly 108. The controller 112 can control the power supply 120 to control the voltages the power supply 120 applies to the busbars 211a, 211b, 211c to select and activate a targeted one of the heating zones 250a, 250b, 250c. In embodiments of the invention, the controller 112 can also monitor the measured data (e.g., temperatures) output from the measurement sensors 116a, 116b, 116c located at respective heating zones 250a, 250b 250c. The measurement sensors 116a, 116b, 116c are specific instances of the measurement sensors 116 (e.g., the measurement sensors 116 shown in FIG. 8A). In this manner, the controller 112 can automatically activate and deactivate selected heating zones and/or actively adjust the temperatures of each heating zone 250a, 250b, 250c independently from one another based on the measured temperature data output from the measurement sensors 116a, 116b, 116c located at their respected heating zone 250a, 250b, 250c. In embodiments of the invention, the controller 112 can detect one or more hot spots forming while heating an inserted container 104 and can automatically deactivate one or more of the heating zones 250a, 250b, 250c to avoid damaging the thermal film heater layer 208.

Figure 9A:
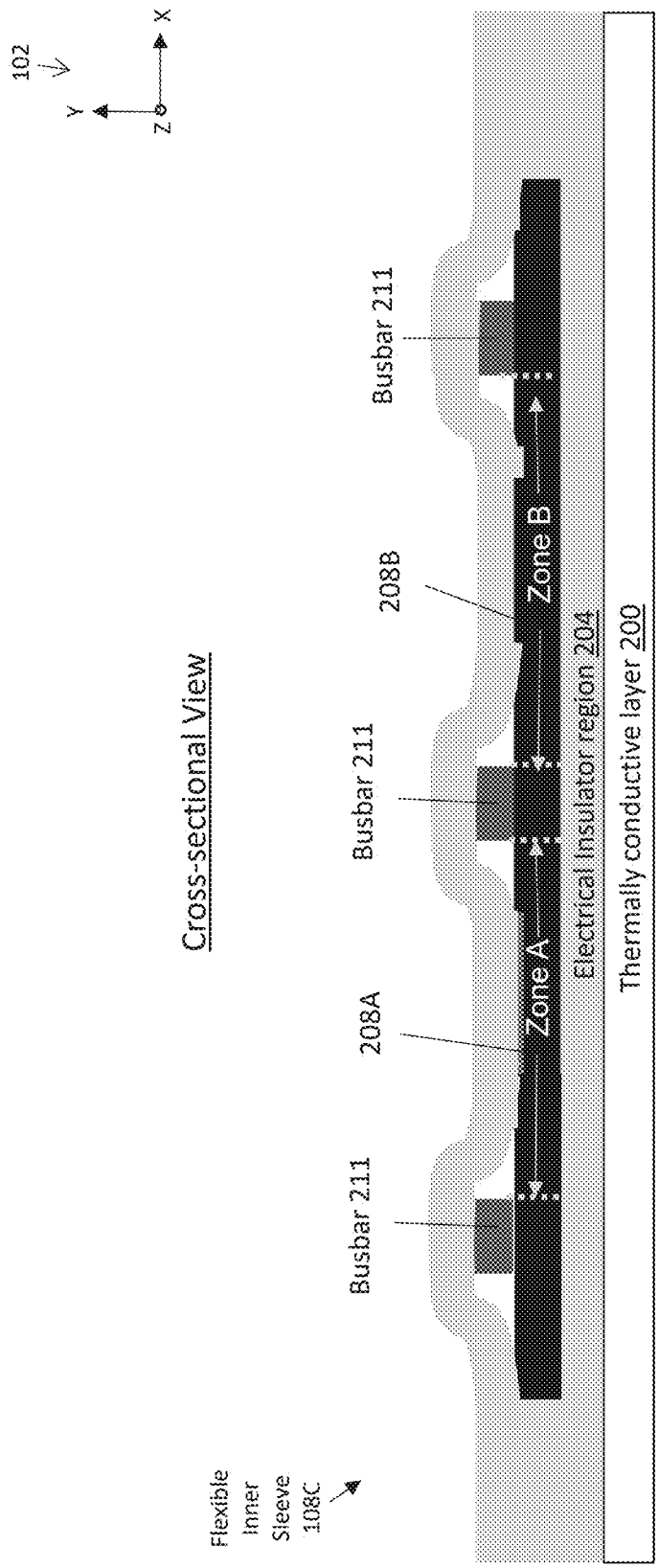
FIG. 9A depicts a cross-sectional view of an inner sleeve heater assembly according to non-limiting embodiments of the invention.
Figure 9B:
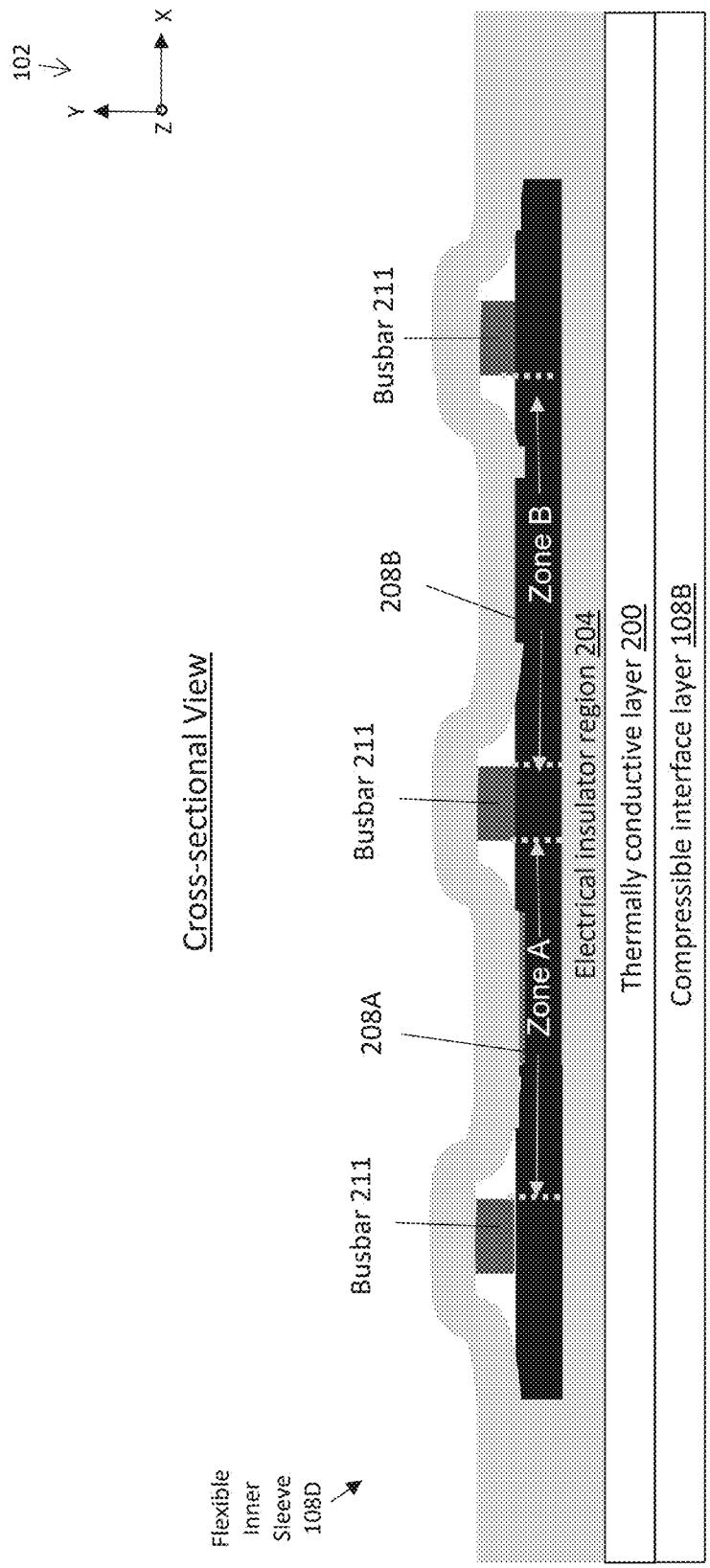
FIG. 9B depicts a cross-sectional view of the inner sleeve heater assembly according to non-limiting embodiments of the invention.
Figure 9C:
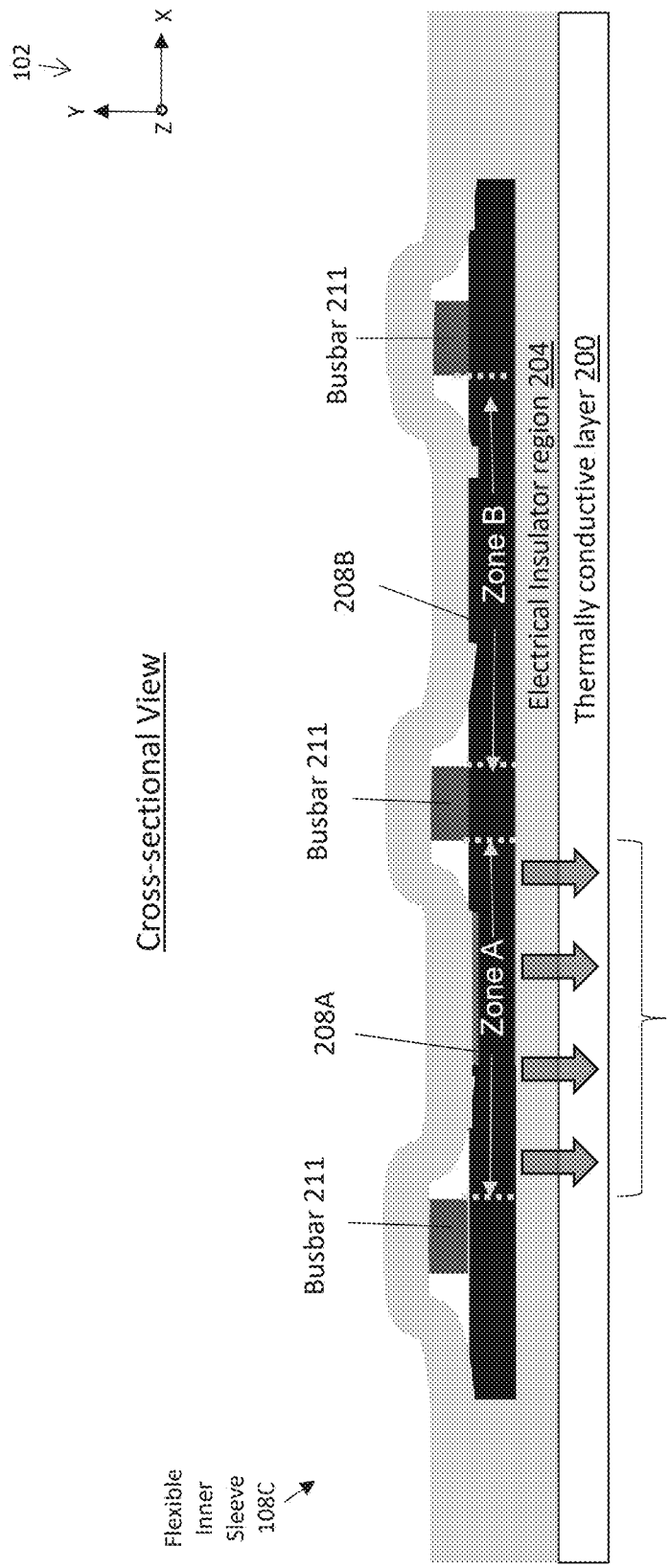
FIG. 9C depicts a cross-sectional view of the inner sleeve heater assembly according to non-limiting embodiments of the invention.

FIGS. 9A-9D depict a cross-sectional views of example multi-layered implementations of the flexible inner sleeve heater assembly 108, wherein FIGS. 9A and 9B depict an implementation of the flexible inner sleeve 108 as a multi-layered flexible inner sleeve heater assembly 108C, and wherein FIGS. 9B and 9C depict an implementation of the flexible inner sleeve 108 as a multi-layered flexible inner sleeve heater assembly 108D. For ease of illustration, the flexible inner sleeves 108C, 108D are depicted as substantially planar. However, it is understood that, in practice, the flexible inner sleeves 108C, 108D can be substantially non-planar. The individual flexible layers of the flexible inner sleeve heater assembly 108C shown in FIG. 9A include a thermally conductive layer 200, an electrical insulator region 204, a thermal film heater layer Zone A 208A, a thermal film heater layer Zone B 208B, and an electrically conductive layer formed as multiple spaced apart busbars 211, configure and arranged as shown. Some or all of the layers shown in FIG. 9A can be secured in place using any suitable adhesive or bonding material (not shown separately). In embodiments of the invention, the bonding material can include, for example, various adhesive materials including, but not limited to, polyimide adhesive, epoxy adhesive, pressure sensitive adhesives, acrylic adhesive, and/or fluoropolymer adhesive, using in any combination. The thickness of each individual region of bonding material can range, for example, from about 12.5 microns (μm) to about 125 μm The thermally conductive layer 200 can include, for example, various thermally conductive metal materials including, but not limited to, aluminum, copper, gold, or silver. The thickness of the thermally conductive layer 200 can range, for example, from about 0.76 mm (0.030 inches) to about 1 mm (about 0.035 inches).

The electrical insulator region 204 can include various electrically insulative materials including, but not limited to, a polyimide film, a polyester (PET) film, a fluoropolymer film, and a silicone elastomer. The thickness of the electrical insulator region 204 can range, for example, from about 25 microns (μm) to 50 μm. The electrical insulator region 204 protects against the electrical shorting of the thermal film heater layer 208 and the busbars 211 to the thermally conductive layer 200 and to the surrounding environment. The electrical insulator region 204 serves as an electrical protective layer to protect the thermal film heater layer 208 from electrically shorting against any metal in the thermally conductive layer 200 or to the moveable outer sleeve heater assembly 110 or other components that can touch the heater film 208 through the cutouts of the moveable outer sleeve heater assembly 110. In some embodiments of the invention, the electrical insulator region 204 can be omitted if the bonding materials that join the various layers shown in FIG. 9A provide sufficient electrical insulation.

The multiple spaced apart busbars 211, can include various electrically conductive materials including, but not limited to, copper (Cu), gold (Au), silver (Ag), tin (Sn), and aluminum (Al). The thickness of the busbars 211 along the vertical Y-axis can range, for example, from about 12.5 microns (μm) to about 75 μm. In embodiments of the invention where the thermal film heater layer 208 is implemented as a layer of carbon-filled polyimide, the conductive layer from which the busbars 211 are formed can be permanently bonded with the thermal film heater layer 208 to form a permanent bond.

In FIG. 9B, the multi-layered flexible inner sleeve heater assembly 108D is substantially the same as the flexible inner sleeve heater assembly 108C except the flexible inner sleeve heater assembly 108D includes a compressible interface layer 108B having substantially the same features and functionality as the compressible interface layer 108B shown in FIGS. 7B and 7C. In some embodiments of the invention, the compressible interface layer 108B can be an elastomer material. In some embodiments of the invention, the compressible interface layer 108B can be a filled elastomer or composite material with thermally conductive particles for enhanced thermal conductivity. In some embodiments of the invention, the thermally conductive particles are configured such that compression of the interface layer 108B creates a percolated network of thermally conductive particles that improve the thermal conductivity of the filled elastomer or composite material of the compressible interface layer 108B while having a sufficient thickness that allows the compressible interface layer 108B to conform to whatever height (or depth) irregularities exist based on the presence of a non-conformable container wall topology 104B. In some embodiments of the invention, the compressible interface layer 108B can be a silicone elastomer material. In some embodiments of the invention, the compressible interface layer 108B can be a silicone elastomer material having the thermally conductive particles. Similar to the compressible interface layer 108B shown in FIGS. 7B and 7C, the compressible interface layer 108B in FIG. 9B, under the influence of the gripping force 414, is pressed against the container wall 104A and an adjacent container 104. In accordance with embodiments of the invention, the compressible interface layer 108B has sufficient flexibility and thickness to enable the surface of the compressible interface layer 108B that interfaces with a non-conformable container wall topology (e.g., 104B shown in FIGS. 7B and 7C) to, in response to the gripping force 414, substantially conform to the container wall topology.

Figure 9D:
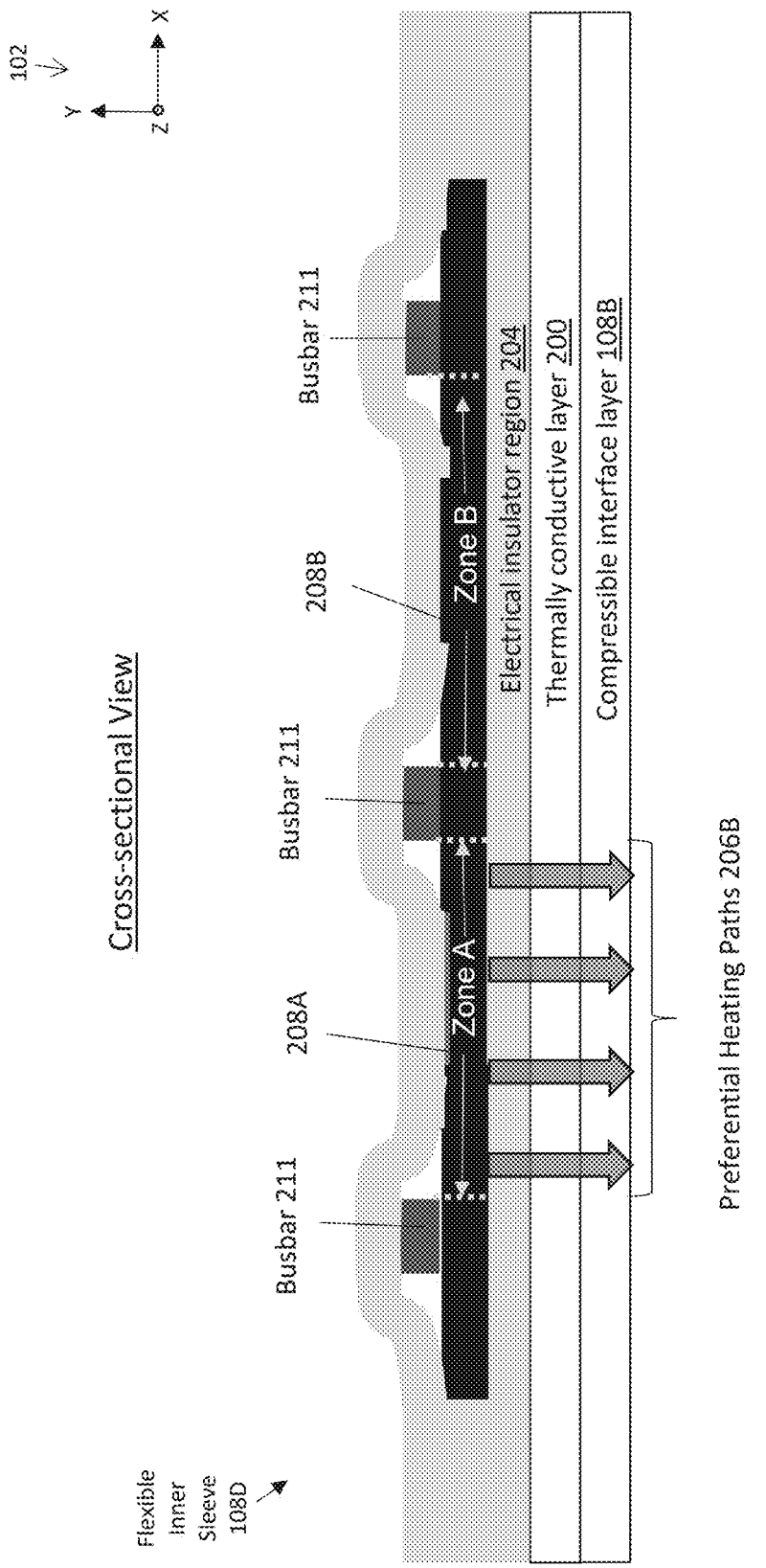
FIG. 9D depicts a cross-sectional view of the inner sleeve heater assembly according to non-limiting embodiments of the invention.

Accordingly, in embodiments of the invention, a TLTC can be dynamically controlled, improved, and/or achieved between the flexible inner sleeve heater assembly 108D and the container 104 in accordance with the relationships depicted in the table 500 even where the outer surface of the container wall 104A includes a topology FIGS. 9C and 9D depict examples of how heat is transmitted from the thermal film heating zone A 208A through the electrical insulator region 204, the thermally conductive layer 200, and, optionally, the compressible interface layer 108B in accordance with aspects of the invention. A similar heat transmission path can be generated for heating zone B 208B alone and/or for heating zones A & B 208A, 208B taken in combination. Referring collectively to FIGS. 9A and 9B, heat is generated by the thermal film heating zone A 208A when an electric potential is applied across heating zone A 208A through the busbar 211 due to the joule heating phenomenon. As shown in FIGS. 9C and 9D, heating zone A 208A has been activated while heating zone B 208B is not activated. Heat generated in heating zone A 208A will propagate upward (e.g., along the y-axis in the positive direction), downward (e.g., along the y-axis in the negative direction) and laterally (e.g., along the x-axis and the z-axis in positive and negative directions) but will propagate preferentially or selectively along the path of least resistance (i.e., the shortest or "thinnest" path), which is shown in FIGS. 9C and 9D as preferential heating paths 206B (e.g., along the y-axis in the negative direction). The terms "preferential," "preferentially," "selective," "selectively," and equivalents thereof, such as, for example, "preferentially propagate heat along a targeted path," means that the heat propagates along the targeted path at a faster rate than the heat propagates along the available non-targeted paths. Accordingly, the thicknesses of the various layers/regions 204, 200, 108B of the flexible inner sleeve 108C, 108D are selected such that the preferential path 206B is from the thermal film heater 208 to the container 104, and are further selected such that a targeted (or maximized) percentage of the heat emanating from the thermal film heater 208 is along the preferential path 206B. More specifically, the portion of region 204 that is below the thermal film heater 208 and any intervening bonding materials are very thin, typically measured in microns of thickness, whereas the lateral distances (along the x-axis) are measured in centimeters. Additionally, the thickness of the portion of the region 204 that is above the thermal film heater 208 and the thickness of the busbars 211 are larger than the thickness of the portion of region 204 that is below the thermal film heater 208 and any intervening bonding materials. Accordingly, the preferential heating path 206B (i.e., the path of least thermal resistance) becomes the most direct path between the heating zone A 208A and the thermally conductive layer 200, and/or between the heating zone A 208A and the compressible interface layer 108B, both of which are also the shortest distance for heat to travel from the heating zone A 208A to container 104 that is in contact with the thermally conductive layer 200 and/or the compressible interface layer 108B.

Figure 10B:
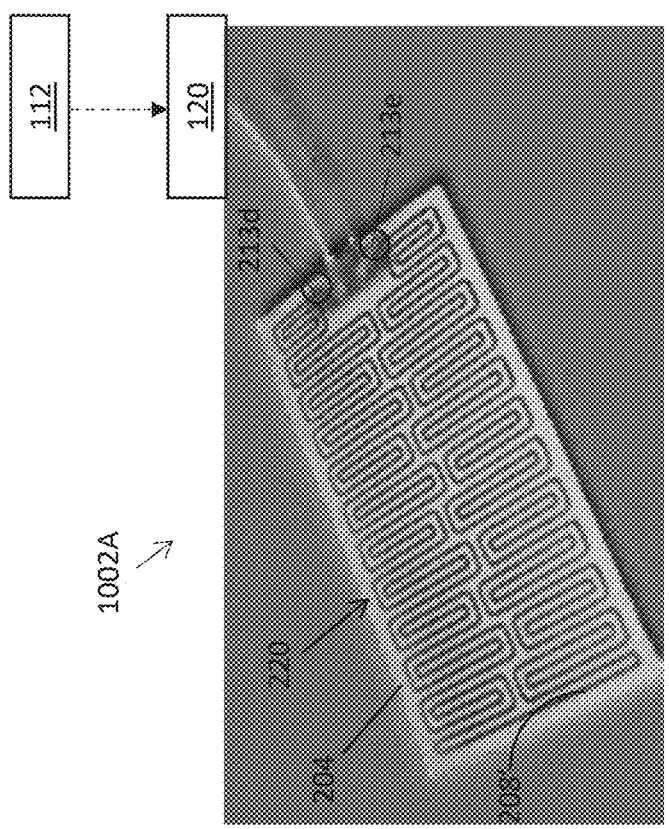
FIG. 10B depicts a top-down, perspective view of a portion of a flexible inner sleeve heater assembly having a resistive metal foil layer etched to define a serpentine pattern according to non-limiting embodiments of the invention.
Figure 10A:
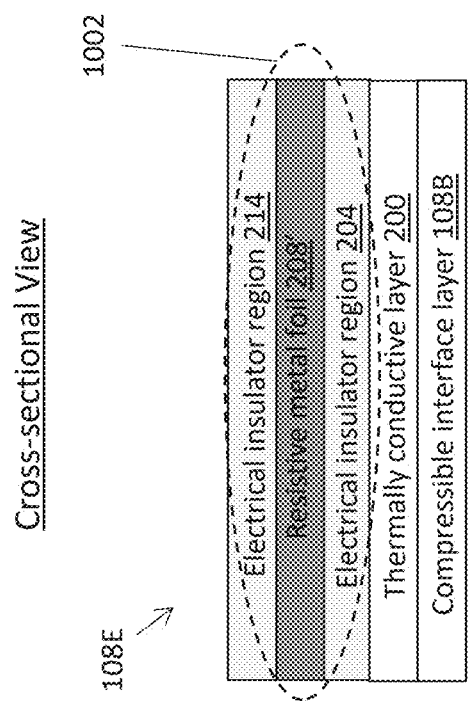
FIG. 10A depicts a cross-sectional view of a flexible inner sleeve heater assembly according to non-limiting embodiments of the invention.

FIG. 10A depicts an example cross-sectional view of the flexible inner sleeve heater assembly 108 implemented as a flexible inner sleeve heater assembly 108E, wherein the thermal film heater layer 208 is implemented as an etched resistive metal foil 208'. The resistive metal foil 208' is bonded (e.g., using the aforementioned types of bonding materials) above and below to a first electrically insulative layer 204 and a second electrically insulative layer 214. In embodiments of the invention, the resistive metal foil 208' can be formed from various resistive metal materials including, but not limited to, cupronickel (CuNi) and various types of oxidation-corrosion-resistant materials. Cupronickel is an alloy of copper that contains nickel and strengthening elements, such as iron and manganese.

FIG. 10B depicts a region 1002A coupled to the power supply 120 and the controller 112. The region 1002A is an exploded and tilted view of a region 1002 of the flexible inner sleeve heater layer 108E shown in FIG. 10A. The region 1002A depicts that, in embodiments of the invention, the resistive metal foil 208' can be etched to define a narrow strip of resistive metal foil in a serpentine pattern 220 that traverses from a first terminal 213d to a second terminal 213e. In embodiments of the invention, the terms "serpentine pattern" and equivalents thereof refer to a pattern that is sinuous and curves in alternate directions. A first voltage polarity (e.g., a positive voltage) can be applied to the first terminal 213d and while a second voltage polarity (e.g., a negative voltage or ground) can be applied to the second terminal 213e. The voltage applied across the resistive metal foil 208' in the serpentine pattern 220 generates a current flow through the resistive metal foil 208', which in turn induces heat that is efficiently and preferentially (e.g., using the same preferential heating paths 206B shown in FIGS. 9C and 9D) passed through the remaining layers (204, 200, and optionally 108B) of the flexible inner sleeve heater assembly 108E to deliver heat to the container 104 (shown in FIGS. 1-3) that is being maintained by the gripping force 414 at a TLTC with the flexible inner sleeve heater assembly 108E.

Figure 10C:
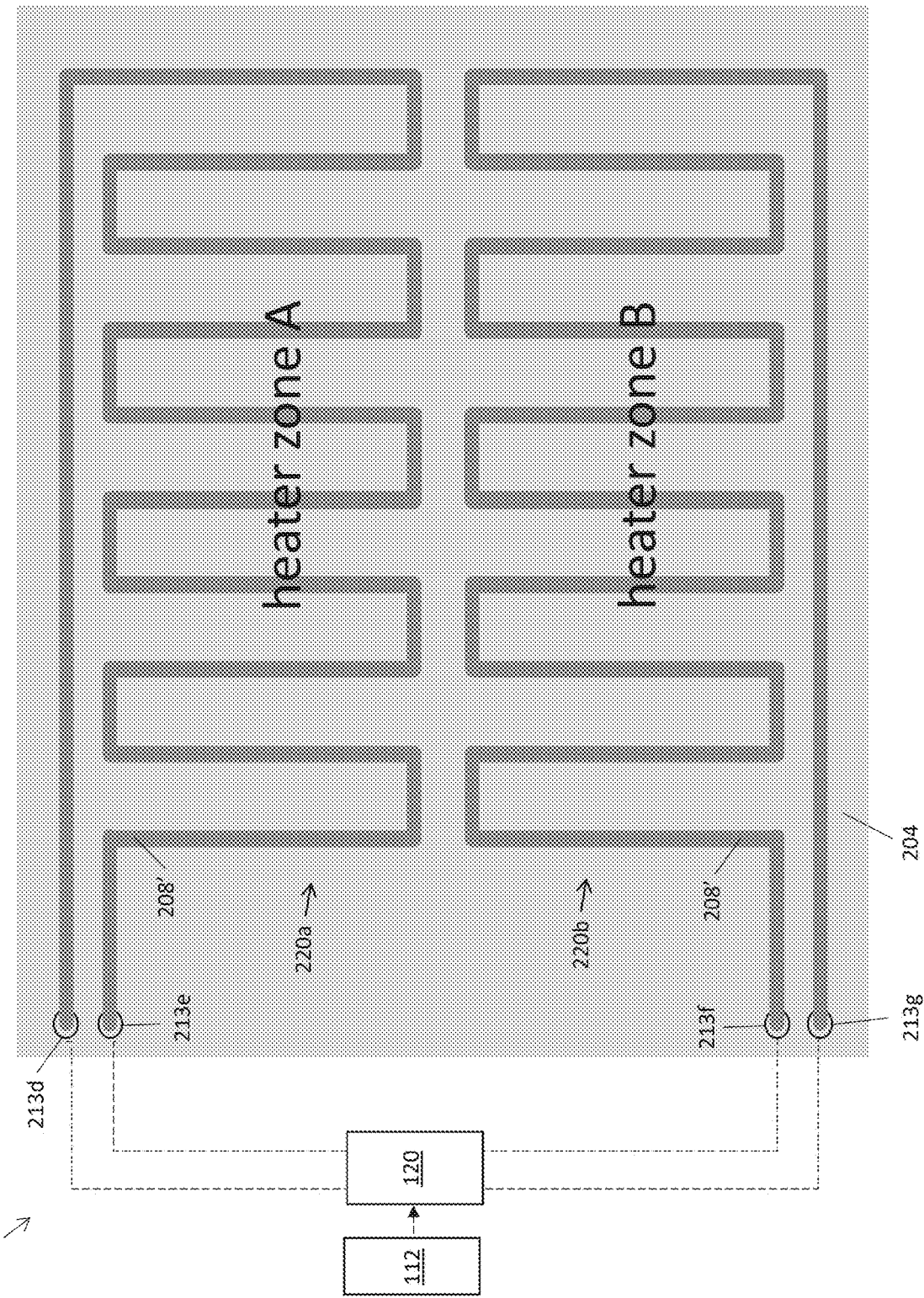
FIG. 10C depicts a top-down view of a portion of a flexible inner sleeve heater assembly having a resistive metal foil layer etched to define multiple serpentine patterns according to non-limiting embodiments of the invention.

FIG. 10C depicts a region 1002B coupled to the power supply 120 and the controller 112. The region 1002B is an exploded top-down view of the region 1002 of the flexible inner sleeve heater layer 108E shown in FIG. 10A. The region 1002B depicts that, in embodiments of the invention, the resistive metal foil 208' can be etched to define multiple serpentine patterns 220a, 220b. Although two serpentine patterns 220a, 220b are shown in FIG. 10C, any number of serpentine patterns 220 can be provided. In accordance with embodiments of the invention, the serpentine pattern 220a traverses from the first terminal 213d to the second terminal 213e; and the serpentine pattern 220b traverses from a third terminal 213f to a fourth terminal 213g. In embodiments of the invention, the resistive metal foil 208' is etched to define the multiple individual serpentine patterns 220a, 220b. The serpentine patterns 220a, 220b when 213d and 213f are electrically connected define a first heater zone corresponding to the heater zone 250a shown in FIG. 8B. The serpentine pattern 220a defines a second heater zone corresponding to heater zone 250c shown in FIG. 8D. The serpentine pattern 220b defines a third heater zone corresponding to heater zone 250b shown in FIG. 8C. In embodiments of the invention, current can be induced to flow through a given serpentine pattern 220a, 220b by using the controller 112 to dynamically control the power supply 120 to selectively apply voltages to the serpentine patterns 220a, 220b independent from one another. In this manner, multiple heating zones can be effected as described herein.

In embodiments of the invention, the first heating zone 220a, 220b can be effected by applying a voltage across both of the serpentine patterns 220a and 220b (terminals 213e and 213f can be electrically coupled to create one larger heater). The first heating zone 220a, 220b, therefore, can effectively generate heat from substantially the entire flexible inner sleeve heater assembly 108E. The second heating zone 220a can be effected by applying a voltage across the serpentine pattern 220a, while disconnecting voltage from the serpentine pattern 220b. Accordingly, heat is effectively generated from a first portion of the flexible inner sleeve heater assembly 108E including the activated serpentine pattern 220a. The third heating zone 220b can be effected by applying a voltage across the serpentine pattern 220b, while disconnecting voltage from the serpentine pattern 220a. Accordingly, heat is effectively generated from a second portion of the flexible inner sleeve heater assembly 108E including the activated second serpentine pattern 220b. Although not illustrated in FIGS. 10A-10C, measurement sensors 116 can also be implemented allowing the controller 112 to monitor the flexible inner sleeve heater assembly 108E (e.g., using the subsystem 610 shown in FIG. 6E to perform the task 620). Accordingly, the controller 112 can actively and dynamically control the individual serpentine patterns 220, 220a, 220b and the heating zones as described in detail herein to dynamically control how heat is transferred from the flexible inner sleeve 108E to the container 104 in accordance with the various aspects of the invention described herein.

Figure 11A:
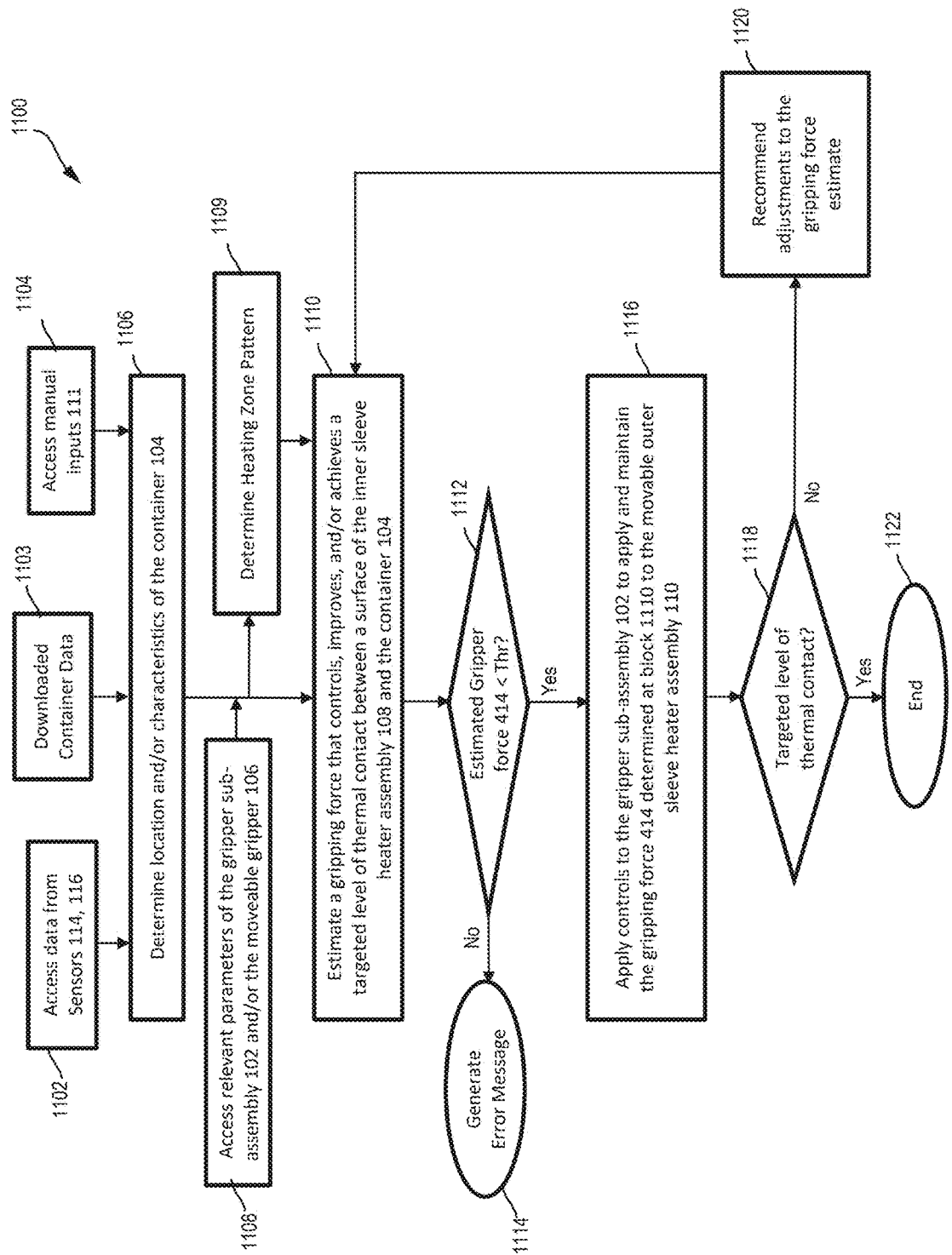
FIG. 11A depicts a flow diagram illustrating a method in accordance with embodiments of the invention.

FIG. 11A depicts a flow diagram illustrating a computer-implemented method 1100 in accordance with aspects of the invention. In accordance with aspects of the invention, multiple iterations of the method 1100 can be implemented by the controller 112 to control the gripper sub-assembly 102 to apply a dynamically controlled gripping force 414 to the moveable outer sleeve heater assembly 110. In embodiments of the invention, the gripper sub-assembly 102 is configured to apply the gripping force 414 (shown in FIGS. 4B, 4C, 4D, 6B, 6D, 6E) using a mechanical energy source mechanism of the gripper sub-assembly 102. In accordance with some embodiments of the invention, the mechanical energy source mechanism includes the mechanical energy source(s) 128 physically coupled to coupling elements. In aspects of the invention, the coupling elements are configured to convert mechanical energy (or force) generated by the mechanical energy source(s) 128 to the gripping force 414 and apply the gripping force 414 to the moveable outer sleeve heater assembly 110. In some embodiments of the invention, a wide variety of coupling mechanisms can be used to convert the mechanical energy generated by the mechanical energy source(s) 128 to the gripping force 414. In some embodiments of the invention, the coupling elements are implemented as the gripper actuator 121, the clamping assembly 123, and the moveable arms 122, configured and arranged as shown in FIG. 1. Accordingly, in some embodiments of the invention, the controller 112 can implement the method 1100 by dynamically controlling the mechanical energy source(s) 128, the gripper actuator 121, the clamping assembly 123, and the moveable arms 122 in a manner that generates the gripping force 414 and uses the moveable arms 122 to apply the gripping force to the moveable outer sleeve heater assembly 110. In some embodiments of the invention as illustrated by the method 1100, the controller 112 dynamically controls the gripping force 414 such that the gripping force 414 is sufficient to dynamically control, improve, and/or achieve TLTC (in the manners depicted in the table 500 shown in FIG. 5) between the flexible inner sleeve heater assembly 108 of the moveable outer sleeve heater assembly 110 and the container 104. In some embodiments of the invention as illustrated by the method 1130 (shown in FIG. 11B), the controller 112 dynamically controls the gripping force 414 such that the gripping force 414 is sufficient to dynamically control, improve, and/or achieve TLTC (in the manners depicted in the table 500) between the flexible inner sleeve heater assembly 108 of the moveable outer sleeve heater assembly 110 and the container 104; hold the container while the gripper sub-assembly 102 agitates the container 104; and not damage the container 104. In some embodiments of the invention as illustrated by the method 1160 (shown in FIG. 11C), the controller 112 dynamically controls the gripping force 414 such that the gripping force 414 is sufficient to dynamically control, improve, and/or achieve TLTC (in the manners depicted in the table 500) between the flexible inner sleeve heater assembly 108 of the moveable outer sleeve heater assembly 110 and the container 104 without damaging the container 104.

As shown in FIG. 11A, the method 1100 begins by using the controller 112 to execute the operations at blocks 1102, 1103, 1104. At block 1102, the controller 112 is used to access data from the sensors 114, 116. At block 1103, the controller 112 is used to download container data, wherein the container data includes characteristics of a wide variety of known containers, including but not limited to the source(s) of known containers, the material of known containers, the shape/size/dimensions of known containers, the surface topologies of known containers, the contents stored in the known containers, and/or the recommended temperature for safely consuming the contents of the container. At block 1104, the controller 112 is used to access the manual inputs 111. The sensors 114, 116 can include the previously described image sensors 114 and measurement sensors 116. The manual inputs 111 can include the previously described details about a variety of characteristics of the container 104 that have been entered into the controller 112 by a user, or that have been selected by a user from a menu of option presented to the user by the controller 112. In some embodiments of the invention, the sensors 114, 116 are optional and details about the container 104 are determined completely from the downloaded container data and/or the manual inputs 111. In some embodiments of the invention, the downloaded container data is optional and details about the container 104 are determined completely from the sensors 114, 116 and the manual inputs 111. In some embodiments of the invention, the manual inputs 111 are optional and the details about the container 104 are determined completely from the downloaded container data and/or the sensors 114, 116. In some embodiments of the invention, the sensors 114, 116, the downloaded container data, and the manual inputs 111 are used to provide data about the details of the container 104.

At block 1106, the controller 112 uses outputs from blocks 1102, 1103, and/or 1104 to determine the location and characteristics of the container 104. In embodiments of the invention, the location of the container 104 is the location of the container within the adjustable opening 126. In embodiments of the invention, the characteristics of the container include but are not limited to the source of the container 104, the material of the container 104, the shape/size/dimensions of the container 104, and/or the contents stored in the container 104. For example, the controller 112 can receive container image data from the image sensors 114 and process the container image data to determine that the container 104 is a substantially cylindrical can of brewed coffee having a 16 ounce volume, a 7 inch height dimension, a 4 inch circumference dimension, and a 16 ounce weight.

At block 1108, the controller 112 optionally accesses parameters of the gripper sub-assembly 102 and/or the moveable gripper 106 that are relevant to estimating a gripping force applied to the moveable arms 122, including, for example, the overall thickness of the flexible inner sleeve heater assembly 108, the various individual thicknesses of the individual layers of the flexible inner sleeve heater assembly 108, the various materials that form the various layers of the flexible inner sleeve heater assembly 108, the flexibility of each of the various layers of the flexible inner sleeve heater assembly 108, the flexibility of the semi-rigid material of the moveable outer sleeve heater assembly 110, and the like. In accordance with aspects of the invention, the output of block 1108 is optionally provided to block 1109 and/or block 1110.

At block 1109, the controller 112 optionally uses the container location and/or characteristics determined at block 1106, along with, optionally, parameters of the gripper sub-assembly 102 determined at block 1108, to determine a heating zone pattern for the flexible inner sleeve heater element 108. According to one or more non-limiting embodiments of the invention, the flexible inner sleeve heater element 108 can be segmented into an array having any number of individually addressable heating zones (e.g., zone A and zone B of the thermal film heater 208 shown in FIG. 9A or zone A and zone B of the thermal film heater 208 shown in FIG. 10C). In accordance with aspects of the invention, each heating zone of the flexible inner sleeve heater element 108 is individually addressable in that each heating zone can be thermally activated independently of the other heating zones in the heating zone array, thereby creating a heating zone pattern formed from the thermally activated heating zones of the heating zone array. In aspects of the invention where the flexible inner sleeve heating element 108 is configured to include an array of individually addressable heating zones, the controller 112 can be programmed to selectively activate and deactivate the addressable heating zones to selectively target heat generation operations to those portions of the flexible inner sleeve heater assembly 108 that are determined by the controller 112 to be in contact with the container 104. In embodiments of the invention, the determination by the controller 112 what portions of the container 104 are in contact with the container 104 can made in any suitable manner. For example, in some embodiments of the invention, the controller 112 can determine the portions of the flexible inner sleeve heater assembly 108 that are (or will be) in contact with the container 104 by receiving from block 1106 the location and characteristics of the container 104 that have been determined at block 1106 through an analysis of various types of data about the container 104 generated by operations at blocks 1102, 1103, 1104.

As an example of how block 1109 can be implemented, where a height dimension of the flexible inner sleeve heater assembly 108 is configured to accommodate a container having a height dimension of about 10 inches, and where the container 104 in the adjustable opening 126 (shown in FIGS. 1 and 8A) has a height dimension of about 5 inches, the controller 112 is configured to generate and implement a heating zone pattern, wherein the heating zone pattern activates only the heating zones of the flexible inner sleeve heater assembly 108 that deliver heat to the portions of the flexible inner sleeve heater assembly 108 that are (or will be) in contact with the container 104 when the container 104 is within the adjustable opening 126 and the controller 112 has dynamically controlled the mechanical energy source mechanism to bring the flexible inner sleeve heater assembly 108 into contact with the container 104. As another example of how block 1109 can be implemented, where a bottom portion of the container 104 has a circumference of about 6 inches, and a top portion of the container 104 tapers to a circumference of about 3 inches, when the container 104 is within the adjustable opening 126, the flexible inner sleeve heater assembly 108 when moved will contact the bottom portion of the container 104 but not the top portion of the container 104. In this example, the controller 112 is configured to generate and implement a heating zone pattern, wherein the heating zone pattern activates only the heating zones of the flexible inner sleeve heater assembly 108 that deliver heat to the bottom portion of the flexible inner sleeve heater assembly 108 that is (or will be) in contact with the container 104 when the container 104 is within the adjustable opening 126 and the controller 112 has dynamically controlled the mechanical energy source mechanism to bring the flexible inner sleeve heater assembly 108 into contact with the container 104.

At block 1110, the controller 112 uses outputs from blocks 1106, 1108, and/or 1109 to generate an estimate of a gripping force 414 required to dynamically control, improve, and/or achieve a TLTC between a surface of the inner sleeve heater assembly 108 and exterior walls of the container 104. In embodiments of the invention, block 1110 can utilize the various interface-parameter proxy measurements/estimates shown in FIGS. 5, 7A as a proxy or substitute for the TLTC at the interface between the flexible inner sleeve heater assembly 108 and the outer walls of the container 104. Accordingly, it is understood that the estimates of thermal contact depicted in the flow diagrams depicted in FIGS. 11A, 11B can be implemented in accordance with the interface-parameter proxy measurement relationships and target values/ranges shown in the table 500 (shown in FIG. 5) and/or the table 700 (shown in FIG. 7A) using the techniques depicted in FIGS. 6A-6E.

In some embodiments of the invention, the controller 112 can be configured to implement the determinations at blocks 1106, 1109, as well as the estimate determined at block 1110 using a variety of computer-implemented analysis methods, including but not limited to machine learning algorithms, simulation algorithms, relational databases, and the like (examples of which are shown in FIG. 6E). Using the operations at block 1110 as an example, the controller 112 can be configured to implement block 1110 by utilizing a machine learning algorithm (e.g., classifier 1210 shown in FIG. 12) configured to generate and train a model of the gripper sub-assembly 102, the movable gripper 106, and/or the container 104. More specifically, the model can be trained to classify the nature of the interface between the flexible inner sleeve heater assembly 108 and the container 104 (e.g., as depicted in the tables 500, 700 shown in FIGS. 5 and 7A; and using the techniques used in FIGS. 6A-6E) in response to gripping forces 414 applied to the moveable outer sleeve heater assembly 110.

In some embodiments of the invention, the determining and/or estimating operations of the method 1100 (e.g., blocks 1106, 1109, 1110) can be performed by utilizing a known simulation algorithm to simulate the characteristics of the gripper sub-assembly 102, the movable gripper 106, and/or the container 104. More specifically, the simulation algorithm can be used to simulate the nature of the interface between the flexible inner sleeve heater assembly 108 and outer walls of the container 104 (e.g., as depicted in the tables 500, 700 shown in FIGS. 5 and 7A; and using the techniques used in FIGS. 6A-6E) in response to gripping forces 414 applied to the moveable outer sleeve heater assembly 110.

In embodiments of the invention that perform the determining and/or estimating operations of the method 1100 (e.g., blocks 1106, 1109, 1110) by controlling and accessing a relational database stored in a memory location of the controller 112, a suitable relational database that can be used in connection with embodiments of the invention is any relational database configured to provide a means of storing related information in such a way that information and the relationships between information can be retrieved from it. Data in a relational database can be related according to common keys or concepts, and the ability to retrieve related data from a table is the basis for the term relational database. A relational database management system (RDBMS) of the controller 112 performs the tasks of determining the way data and other information are stored, maintained and retrieved from the relational database of the controller 112. In accordance with aspects of the invention, the examples of how machine learning algorithms, simulation algorithms, and/or relational databases can be used to implement block 1110 apply equally to blocks 1106, 1109.

Decision block 1112 receives from block 1110 the estimated gripping force 414 that will dynamically control, improve, and/or achieve a TLTC between a surface of the inner sleeve heater assembly 108 and the container 104. Decision block 1112 determines whether or not the estimated gripping force 414 generated at block 1110 is above or below a threshold for maintaining the physical integrity of the container 104. The gripping force threshold used in decision block 1112 is dynamic in that it is determined for the particular size, shape, weight, surface topology, and material of the container 104 as determined using the data generated at blocks 1102, 1103, and/or 1104. Similar to block 1110, the dynamic gripping force threshold used in decision block 1112 can be generated using a simulation algorithm and/or a machine learning algorithm (or model) configured and arranged to estimate the dynamic gripping force threshold that enables gripping the container 104 without compromising the physical integrity of the container 104. Examples of compromising the physical integrity of the container 104 includes denting, puncturing, cracking or crushing the container 104. If the answer to the inquiry at decision block 1112 is no, the method 1100 moves to block 1114 and generates an error message that communicates (e.g., to a user) that TLTC cannot be controlled, improved, and/or achieved between the flexible inner sleeve heater assembly 108 and the container 104 without compromising the physical integrity of the container. If the answer to the inquiry at decision block 1112 is yes, the method 1100 passes the estimated gripping force 414 determined at block 1110 to block 1116. At block 1116, the controller 112 determines and applies the necessary controls to the gripper sub-assembly 102 (e.g., settings and controls for the mechanical energy source(s) 128) that will apply the gripping force 414 determined at block 1110 to the movable outer sleeve heater assembly 110.

In decision block 1118, the controller 112 uses sensor data from the various sensors (e.g., grip presser sensors among the sensors 116) of the gripper sub-assembly 102 and the movable gripper 106 to evaluate whether or not the gripping force 414 determined at block 1110 has controlled, improved, and/or achieved TLTC at the interface between the flexible inner sleeve heater assembly 108 and the container 104. In some embodiments of the invention, the evaluation determined at decision block 1118 can be performed using the relationships reflected in the table 500, along with the techniques shown in FIGS. 6A-6F.

If the answer to the inquiry at decision block 1118 is yes, the method 1100 moves to block 1122 and ends. If the answer to the inquiry at decision block 1118 is no, the method 1100 moves to block 1120; analyzes the determinations made at decision block 1118; makes recommendations for adjustments to the determinations made at block 1110 in a last (or in prior) iterations of the method 1100; and returns to block 1110 for a next partial iteration of the method 1100 that takes into account the change recommendations developed at block 1120. In some embodiments of the invention, the recommendations made at block 1120 leverage the simulation and/or machine learning algorithms utilized to make the determinations at block 1110 in the last (or in prior) iterations of the method 1100. In some embodiments of the invention, the operations at block 1120 can include using the measurement sensors 116 (including grip pressure sensors) to capture the current actual gripping force and compare it to the currently computed estimated gripping force determined at block 1110. If there is a difference between the estimated gripping force and the current actual gripping force, that difference can be incorporate in the recommendation generated at block 1120. For example, block 1120 can determine that the actual current gripping force is 10% less than the estimated gripping force, and the recommendation generated at block 1120 can include increasing the estimated gripping force by 10%.

Figure 11B:
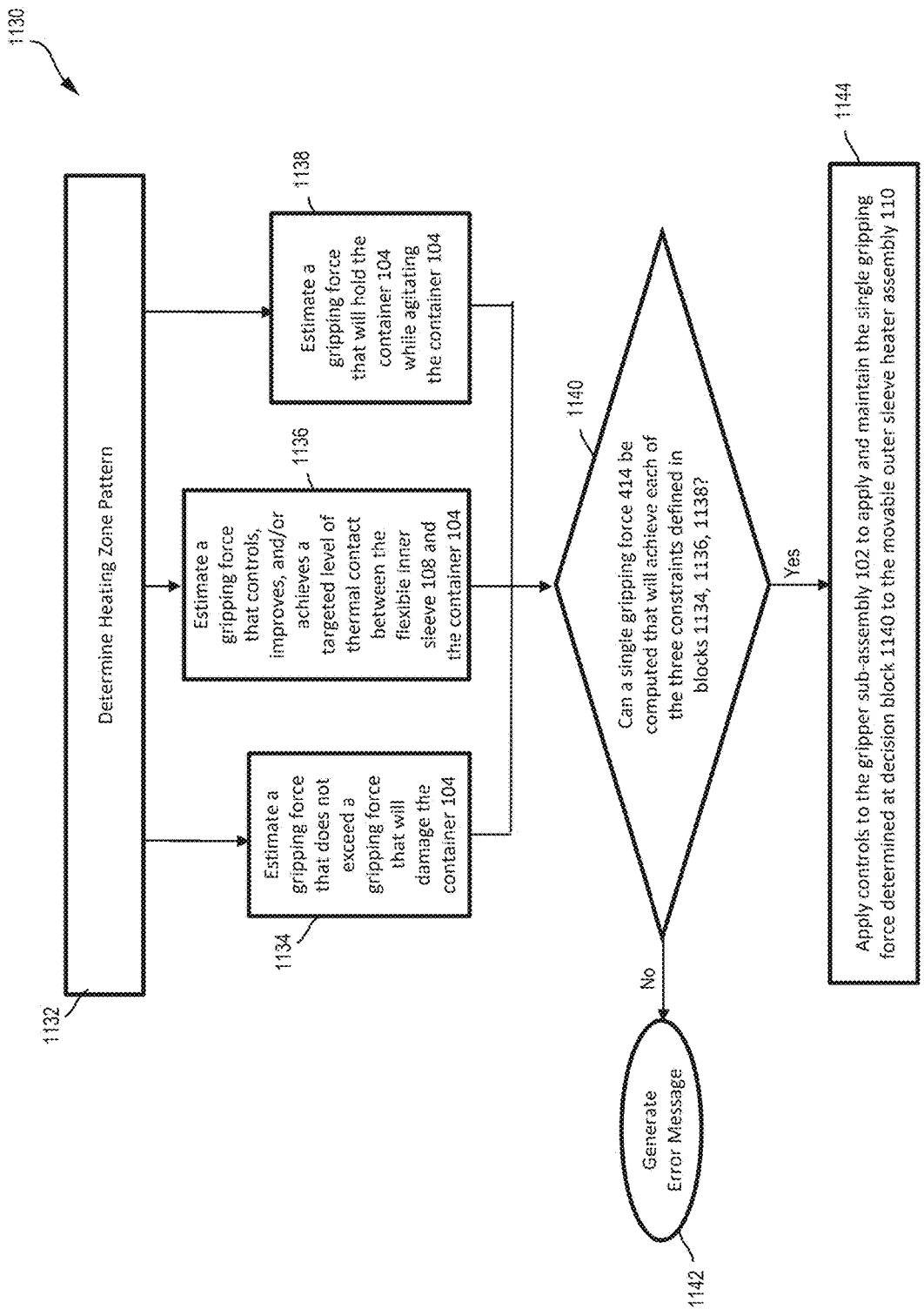
FIG. 11B depicts a flow diagram illustrating a method in accordance with embodiments of the invention.

FIG. 11B depicts a flow diagram illustrating a computer-implemented method 1130 in accordance with aspects of the invention. In accordance with aspects of the invention, multiple iterations of the method 1130 can be implemented, whereby the controller 112 dynamically controls the gripping force 414 such that the gripping force 414 is sufficient to satisfy one (1), two (2), or all three (3) of a set of constraints, namely dynamically control, improve, and/or achieve TLTC (in the manners depicted in the table 500) between the flexible inner sleeve heater assembly 108 and the container 104 (block 1136); hold the container while the gripper sub-assembly 102 agitates the container 104 (block 1138); and/or not damage the container 104 (block 1134). In some embodiments of the invention, the method 1130 can modify and/or supplement the method 1100 shown in FIG. 11A. More specifically, in some embodiments of the invention, the method 1100 can be modified by replacing blocks 1112, 1114, and 1116 of the method 1100 with blocks 1140, 1142, 1144 of the method 1130. In addition, block 1110 of the method 1100 is substantially the same as the constraint defined at block 1136, while blocks 1134 and 1138 of the method 1130 provide additional constraints that are input to decision block 1140. In addition, in some embodiments of the invention, block 1132 can be implemented in substantially the same manner with substantially the same inputs as block 1109 of the method 1100. In some embodiments of the invention, the method 1130 is integrated within the method 1100. In some embodiments of the invention, the method 1130 is implemented as a stand-alone method. In the interest of brevity, the subsequent descriptions of the method 1130 are in the context of how the method 1130 functions as a stand-alone method. However, it will be understood by those skilled in the relevant arts that all of the features and functionality described in connection with the method 1130 apply equally to embodiments of the invention where the method 1130 is integrated into the method 1100.

In embodiments of the invention, the controller 112 implements the method 1130 by dynamically controlling how the mechanical energy source mechanism 128, 132 of the gripper sub-assembly 102 applies a gripping force 414 to the movable outer sleeve heater assembly 110. In embodiments of the invention, the mechanical energy source mechanism is configured to include the mechanical energy source(s) 128, the gripper actuator 121, the clamping assembly 123, and the moveable arms 122, configured and arranged as shown in FIGS. 2 and 3. In accordance with some aspects of the invention, the controller 112 dynamically controls the gripping force 414 applied to the moveable outer sleeve heater assembly 110 such that the gripping force 414 is sufficient to satisfy three constraints defined at blocks 1134, 1136, 1138 of the method 1130.

At block 1134, the controller 112 generates an estimate of a gripping force that is insufficient to damage the container 104. In some embodiments of the invention, block 1134 is configured to generate an estimate of a maximum gripping force that will not damage the container 104. The gripping force estimated at block 1134 is dynamic in that it is determined for the particular size, shape, weight, surface topology, and/or material of the container 104. In embodiments of the invention, data from which the size, shape, weight, surface topology, and/or material of the container 104 can be determined is provided to block 1134 using, for example, the operations depicted at blocks 1102, 1103, and/or 1104 of the method 1100 shown in FIG. 11A. At block 1134, the controller 112 determines the location and/or characteristics of the container 104, including but not limited to the location of the container 104 within the adjustable opening 126; the source of the container 104; the material of the container 104; the shape/size/dimensions of the container 104; the topologies of exterior surfaces of the container 104; and/or the contents stored in the container 104. In some aspects of the invention, at block 1134 the controller 112 can make its determination about the location and/or characteristics of the container 104 in substantially the same manner as block 1106 of the method 1100 shown in FIG. 11A. In some aspects of the invention, at block 1134 the controller 112 can make its determination about the location and/or characteristics of the container 104 by optionally taking into account various parameters of the gripper sub-assembly 102 that are relevant to estimating gripper form in general. In some embodiments of the invention, block 1134 can receive outputs from operations that corresponds to the operations performed at block 1108 of the method 1100 shown in FIG. 11A. As previously noted herein, the operations at block 1108 include accessing parameters of the gripper sub-assembly 102 that include the overall thickness of the flexible inner sleeve heater assembly 108, the thicknesses of the various layers of the flexible inner sleeve heater assembly 108, the various materials that form the various layers of the flexible inner sleeve heater assembly 108, the flexibility of each of the various layers of the flexible inner sleeve heater assembly 108, the flexibility of the semi-rigid material of the moveable outer sleeve heater assembly 110, and the like.

In some embodiments of the invention, the controller 112 can be configured to perform the estimate defined at block 1134 by utilizing a known simulation algorithm to simulate the characteristics of the container 104 and how the container 104 would respond to various gripping forces applied to the container 104 by the gripper sub-assembly 102. More specifically, the known simulation algorithm can be configured to simulate whether or not a particular gripping force will compromise the physical integrity of the container 104. Examples of how the physical integrity of the container 104 can be compromised includes denting, puncturing, cracking or crushing the container 104.

In some embodiments of the invention, the controller 112 can be configured to perform the estimate defined at block 1134 by utilizing known machine learning algorithms to create and train one or more models that represent the characteristics of the container 104 and how the container 104 would respond to various gripping forces applied to the container 104 by the gripper sub-assembly 102. More specifically, the machine learning models can be configured to classify whether or not a particular gripping force will compromise the physical integrity of the container 104. Examples of compromising the physical integrity of the container 104 includes denting, puncturing, cracking or crushing the container 104.

In some embodiments of the invention, the controller 112 can be configured to perform the estimate defined at block 1134 by dynamically controlling and accessing a relational database stored in a memory location of the controller 112, wherein the relational database is configured to store characteristics of a variety of containers, a variety of gripping forces, and the impact that the variety of gripping forces has on the integrity of the containers. Once the controller 112 determines the characteristics of the container-under-investigation, the controller 112 can access the relational database to determine the gripping forces and integrity impacts associated with the container-under-investigation. For example, if the controller 112 determines that the container-under-investigation is a cylindrically shaped 12 ounce aluminum can of chicken noodle soup having a certain can height and can diameter, the relational database can be used to in effect look up a maximum gripping force that can be applied to a corresponding known 12 ounce can of chicken noodle soup without compromising the integrity of the known 12 ounce can. A suitable relational database that can be used in connection with embodiments of the invention is any relational database configured to provide a means of storing related information in such a way that information and the relationships between information can be retrieved from it. Data in a relational database can be related according to common keys or concepts, and the ability to retrieve related data from a table is the basis for the term relational database. A relational database management system (RDBMS) of the controller 112 performs the tasks of determining the way data and other information are stored, maintained and retrieved from the relational database of the controller 112.

At block 1136, the controller 112 generates an estimate of a gripping force that dynamically controls, improves, and/or achieves TLTC (using the relationships shown in the table 500 shown in FIG. 5) between the flexible inner sleeve 108 and the container 104. As previously noted herein, block 1136 can be implemented in substantially the same manner as block 1110 of the method 1100 (shown in FIG. 11A), and can utilize outputs from substantially the same operations as performed at blocks 1102, 1103, 1104, 1106, 1108 of the method 1100. Similar to block 1110, block 1136 can be implemented using computer analysis techniques (e.g., simulation algorithms, machine learning algorithms, relational databases, and the like) that do not require specialized computer functionality.

At block 1138, the controller 112 generates an estimate of a gripping force that is insufficient to hold the container 104 while the gripper sub-assembly 102 is agitating the container 104. In some embodiments of the invention, block 1136 is configured to generate an estimate of a minimum gripping force that will hold the container while the gripper sub-assembly 102 is agitating the container 104. The gripping force estimated at block 1138 is dynamic in that it is determined for the particular size, shape, weight, surface topology, and/or material of the container 104. In embodiments of the invention, data from which the size, shape, weight, surface topology, and/or material of the container 104 can be determined is provided to block 1138 using, for example, the operations depicted at blocks 1102, 1103, and/or 1104 of the method 1100 shown in FIG. 11A. At block 1138, the controller 112 determines characteristics of the container 104, including but not limited to the source of the container 104; the material of the container 104; the shape/size/dimensions of the container 104; the topologies of exterior surfaces of the container 104; and/or the contents stored in the container 104. In some aspects of the invention, at block 1138 the controller 112 can make its determination by optionally taking into account various parameters of the gripper sub-assembly 102 that are relevant to estimating gripper form in general. In some embodiments of the invention, block 1138 can receive outputs from operations that corresponds to the operations performed at block 1108 of the method 1100 shown in FIG. 11A. As previously noted herein, the operations at block 1108 include accessing parameters of the gripper sub-assembly 102 that include the overall thickness of the flexible inner sleeve heater assembly 108, the individual thicknesses of the various individual layers of the flexible inner sleeve heater assembly 108, the various materials that form the various layers of the flexible inner sleeve heater assembly 108, the flexibility of each of the various layers of the flexible inner sleeve heater assembly 108, the flexibility of the semi-rigid material of the moveable outer sleeve heater assembly 110, and the like.

In some embodiments of the invention, the controller 112 can be configured to perform the estimate defined at block 1138 by utilizing a known simulation algorithm to simulate the characteristics of the container 104 and how the container 104 would respond to various gripping forces applied to the container 104 by the gripper sub-assembly 102 while the gripper sub-assembly 102 is agitating the container 104. More specifically, the known simulation algorithm can be configured to simulate whether or not a particular gripping force will hold the container 104 while the gripper sub-assembly 102 is agitating the container 104. In some embodiments of the invention, the known simulation algorithm can be configured to determine a minimum gripping force that will hold the container 104 while the gripper sub-assembly 102 is agitating the container 104.

In some embodiments of the invention, the controller 112 can be configured to perform the estimate defined at block 1138 by utilizing known machine learning algorithms to create and train one or more models that represent the characteristics of the container 104 and how the container 104 would respond to various gripping forces applied to the container 104 by the gripper sub-assembly 102 while the gripper sub-assembly 102 is agitating the container 104. More specifically, the machine learning models can be configured to classify whether or not a particular gripping force will hold the container 104 while the gripper sub-assembly 102 is agitating the container 104. In some embodiments of the invention, the machine learning models can be configured to determine a minimum gripping force that will hold the container 104 while the gripper sub-assembly 102 is agitating the container 104.

In some embodiments of the invention, the controller 112 can be configured to perform the estimate defined at block 1138 by dynamically controlling and accessing a relational database stored in a memory location of the controller 112, wherein the relational database is configured to store characteristics of a variety of containers, a variety of gripping forces, and the ability of the variety of gripping forces to hold the container 104 while the gripper sub-assembly 102 is agitating the container 104. Once the controller 112 determines the characteristics of the container-under-investigation, the controller 112 can access the relational database to determine the gripping forces and container holding ability associated with the container-under-investigation. For example, if the controller 112 determines that the container-under-investigation is a cylindrically shaped 12 ounce aluminum can of chicken noodle soup having a certain can weight, can height, and can diameter, the relational database can be used to in effect look up a minimum gripping force that can be applied to a corresponding known 12 ounce can of chicken noodle soup in order to hold the corresponding known 12 ounce can of chicken noodle soup while the gripper sub-assembly 102 is agitating the corresponding known 12 ounce can of chicken noodle soup. As previously noted herein, a suitable relational database that can be used in connection with embodiments of the invention is any relational database configured to provide a means of storing related information in such a way that information and the relationships between information can be retrieved from it.

Decision block 1140 receives from blocks 1134, 1136, 1138 the estimated gripping forces that satisfy each of the constraints defined at blocks 1134, 1136, 1138. Decision block 1140 determines whether or not there is a single gripping force 414 that satisfies all of the constraints defined at blocks 1134, 1136, 1138. If the answer to the inquiry at decision block 1140 is no, the method 1130 moves to block 1142 and generates an error message that communicates (e.g., to a user) that all three of the constraints defined at blocks 1134, 1136, 1138 cannot be satisfied. If the answer to the inquiry at decision block 1140 is yes, the method 1130 passes the single gripping force determined at decision block 1140 to block 1144. At block 1144, the controller 112 applies the necessary controls to the gripper sub-assembly 102 (e.g., settings and controls for the mechanical energy source(s) 128) that will apply the single gripping force 414 determined at decision block 1140 to the movable outer sleeve heater assembly 110.

In embodiments of the invention, all of the operations performed in the method 1130 can be executed using known computer analysis techniques (e.g., simulation algorithms, machine learning algorithms, relational databases, and the like) that do not require specialized computer functionality. In embodiments of the invention, the method 1130 can be implemented to include any combination of the operations depicted at blocks 1132-1144.

Figure 11C:
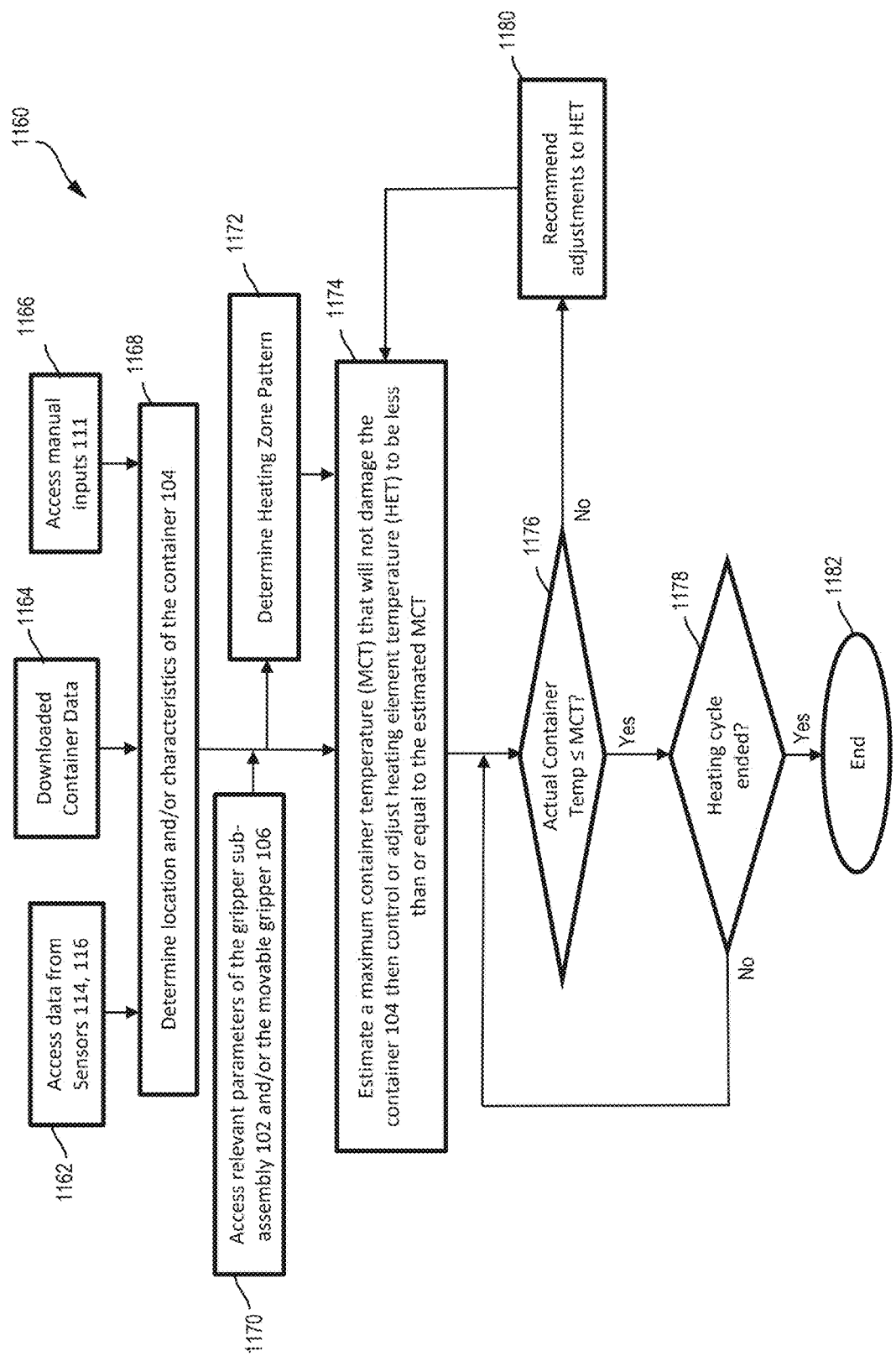
FIG. 11C depicts a flow diagram illustrating a method in accordance with embodiments of the invention.

FIG. 11C depicts a flow diagram illustrating a computer-implemented method 1160 in accordance with aspects of the invention. In accordance with aspects of the invention, multiple iterations of the method 1160 can be implemented by the controller 112 to dynamically control the gripper sub-assembly 102 to apply a level of heat to the container 104 that is below a temperature that will damage the container 104. In embodiments of the invention, portions of the method 1160 are implemented in substantially the same way as portions of the method 1100 shown in FIG. 11A. More specifically, blocks 1162, 1164, 1166, 1168, 1170, 1172 of the method 1160 can be implemented in substantially the same way as blocks 1102, 1103, 1104, 1106, 1108, 1109 of the method 1100 shown in FIG. 11A.

At block 1174, the controller 112 uses outputs from blocks 1168, 1172, and/or 1170 to generate an estimate of a maximum container temperature (MCT) that will not damage the container 104, and to control or adjust the temperature(s) output by the flexible inner sleeve heater assembly 108 (e.g., heating element temperature (HET)) to be less than or equal to the estimated MCT. In embodiments of the invention, block 1174 can estimate MCT using substantially the same computer control features and functions used in block 1110 of the method 1100 (shown in FIG. 11A) to estimate the gripping force required to achieve and maintain TLTC between a surface of the inner sleeve heater assembly 108 and the container 104. In embodiments of the invention, block 1174 can dynamically control or adjust HET to be less than or equal to the estimated MCT using substantially the same computer control features and functions used in block 1116 of the method 1100 (shown in FIG. 11A) apply controls to the gripper sub-assembly 102 to apply and maintain the gripping force determined at block 1110 to the movable outer sleeve heater assembly 110.

Decision block 1176 receives from block 1174 the estimated MCT that will not damage the container 104. Decision block 1176 determines whether or not the actual temperature(s) of the container 104 are above or below the estimated MCT generated at block 1174. The estimated MCT threshold used in decision block 1176 is dynamic in that it is determined for the particular size, shape, weight, surface topology, and material of the container 104 as determined using the data generated at blocks 1162, 1164, and/or 1166. The dynamic MCT threshold used in decision block 1176 can be generated using a simulation algorithm and/or a machine learning algorithm (or model) configured and arranged to estimate the MCT threshold that will not compromise the physical integrity of the container 104. Examples of compromising the physical integrity of the container 104 include exceeding Tmax for some or all of the container 104. If the answer to the inquiry at decision block 1176 is yes, the method 1160 moves to decision block 1178 and determines whether the heating cycle being applied to the container 104 by the gripper sub-assembly 102 has ended. If the answer to the inquiry at decision block 1178 is yes, the method 1160 move to block 1182 and ends. If the answer to the inquiry at decision block 1178 is no, the method 1160 returns to the input to decision block 1176. If the answer to the inquiry at decision block 1176 is no, the method 1160 moves to block 1180; analyzes the determinations made at decision block 1174; makes recommendations for adjustments to the determinations made at block 1174 in a last (or in prior) iterations of the method 1160; and returns to block 1174 for a next partial iteration of the method 1160 that takes into account the change recommendations developed at block 1180. In some embodiments of the invention, the recommendations made at block 1180 leverage the computer analysis techniques used by the controller 112 to make the determinations at block 1174 in the last (or in prior) iterations of the method 1160. In some embodiments of the invention, the operations at block 1180 can include using the measurement sensors 116 to capture the current actual temperature being applied to the container 104 and compare it to the currently computed HET determined at block 1174. If there is a difference between the currently computed HET and the currently sensed actual temperature at the container 104, that difference can be incorporate in the recommendation generated at block 1180. For example, block 1180 can determine that the currently sensed actual temperature at the container 104 is 10% less than the currently computed HET, and the recommendation generated at block 1180 can include increasing the currently computed HET by 10%. Similar to the methods 1100, 1130 shown in FIGS. 11A and 11B, the controller 112 can implement the method 1160 using machine learning algorithms, simulation algorithms, relational databases, and the like in substantially the same ways previously described herein.

Additional details of machine learning techniques that can be used to implement portions of the controller 112 will now be provided. The various types of computer control functionality (e.g., estimates, determinations, decisions, recommendations, and the like of the controller 112) described herein can be implemented using machine learning and/or natural language processing techniques. In general, machine learning techniques are run on so-called "neural networks," which can be implemented as programmable computers configured to run a set of machine learning algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include detecting people/faces in images, recognizing facial expressions (e.g., angry, joyful, etc.) in an image, identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which it groups according to those characteristics in common and which differentiate them from other groups of objects. These groups are known as "clusters."

An example of machine learning techniques that can be used to implement aspects of the invention will be described with reference to FIGS. 12 and 13. Machine learning models configured and arranged according to embodiments of the invention will be described with reference to FIG. 12. Detailed descriptions of an example computing system and network architecture capable of implementing one or more of the embodiments of the invention described herein will be provided with reference to FIG. 14.

Figure 12:
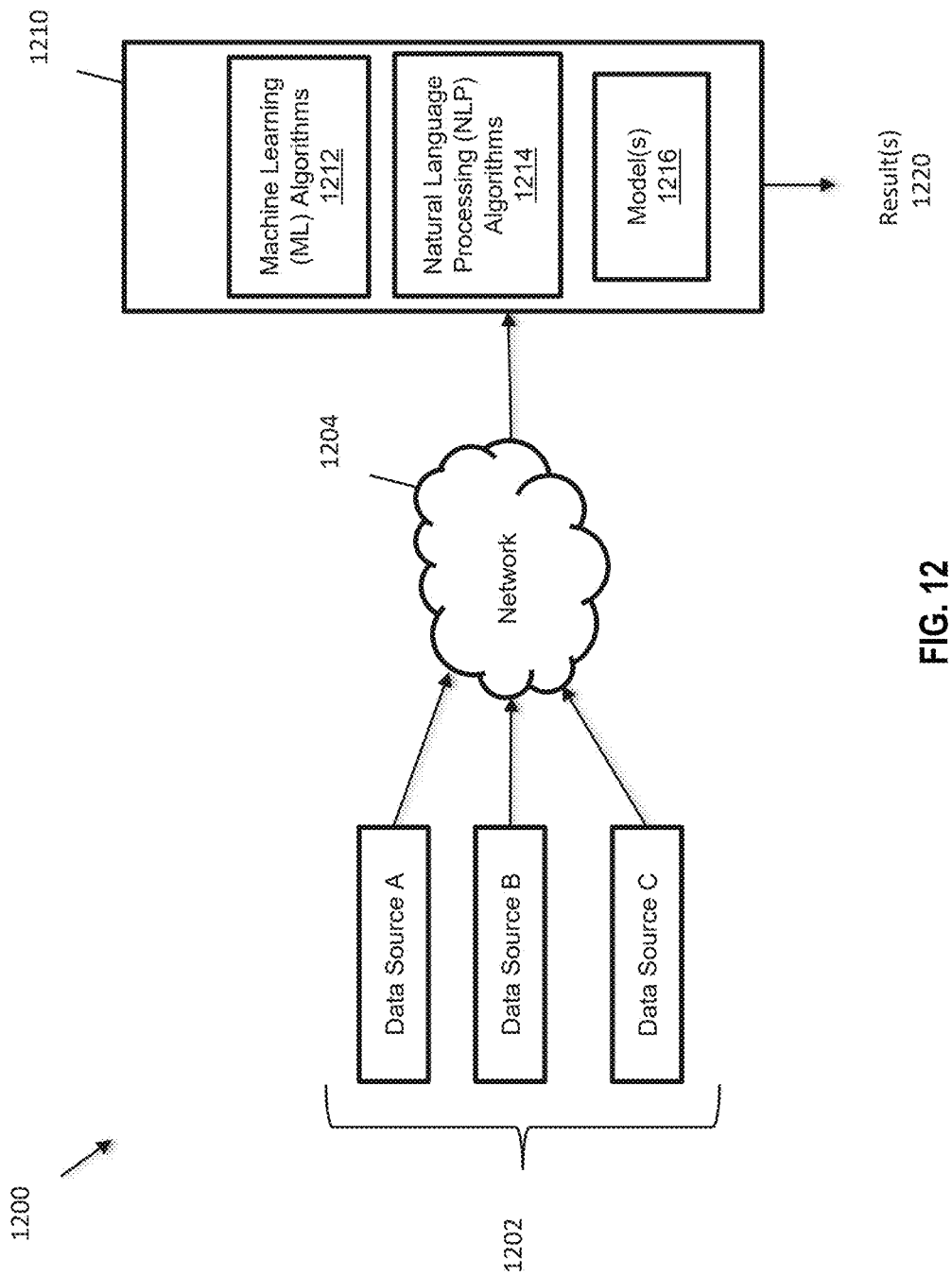
FIG. 12 depicts a machine learning system that can be utilized to implement aspects of the invention.

FIG. 12 depicts a block diagram showing a classifier system 1200 capable of implementing various aspects of the invention described herein. More specifically, the functionality of the system 1200 is used in embodiments of the invention to generate various models and sub-models that can be used to implement computer functionality in embodiments of the invention. The system 1200 includes multiple data sources 1202 in communication through a network 1204 with a classifier 1210. In some aspects of the invention, the data sources 1202 can bypass the network 1204 and feed directly into the classifier 1210. The data sources 1202 provide data/information inputs that will be evaluated by the classifier 1210 in accordance with embodiments of the invention. The data sources 1202 also provide data/information inputs that can be used by the classifier 1210 to train and/or update model(s) 1216 created by the classifier 1210. The data sources 1202 can be implemented as a wide variety of data sources, including but not limited to, sensors configured to gather real time data, data repositories (including training data repositories), and outputs from other classifiers. The network 1204 can be any type of communications network, including but not limited to local networks, wide area networks, private networks, the Internet, and the like.

Figure 14:
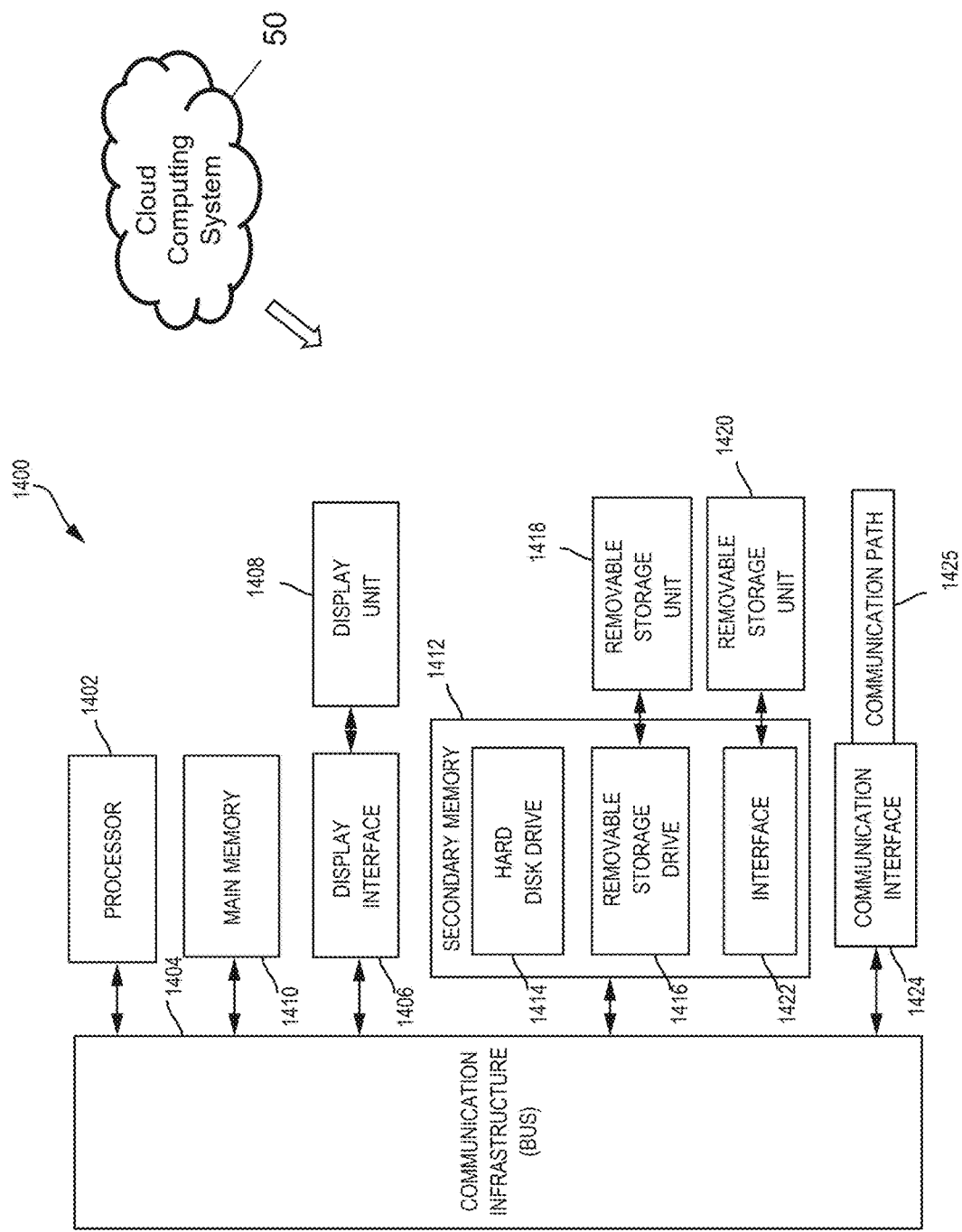
FIG. 14 depicts details of an exemplary computing system capable of implementing various aspects of the invention.

The classifier 1210 can be implemented as algorithms executed by a programmable computer such as a processing system 1400 (shown in FIG. 14). As shown in FIG. 12, the classifier 1210 includes a suite of machine learning (ML) algorithms 1212; natural language processing (NLP) algorithms 1214; and model(s) 1216 that are relationship (or prediction) algorithms generated (or learned) by the ML algorithms 1212. The algorithms 1212, 1214, 1216 of the classifier 1210 are depicted separately for ease of illustration and explanation. In embodiments of the invention, the functions performed by the various algorithms 1212, 1214, 1216 of the classifier 1210 can be distributed differently than shown. For example, where the classifier 1210 is configured to perform an overall task having sub-tasks, the suite of ML algorithms 1212 can be segmented such a portion of the ML algorithms 1212 executes each sub-task and a portion of the ML algorithms 1212 executes the overall task. Additionally, in some embodiments of the invention, the NLP algorithms 1214 can be integrated within the ML algorithms 1212.

The NLP algorithms 1214 include speech recognition functionality that allows the classifier 1210, and more specifically the ML algorithms 1212, to receive natural language data (text and audio) and apply elements of language processing, information retrieval, and machine learning to derive meaning from the natural language inputs and potentially take action based on the derived meaning. The NLP algorithms 1214 used in accordance with aspects of the invention can also include speech synthesis functionality that allows the classifier 1210 to translate the result(s) 1220 into natural language (text and audio) to communicate aspects of the result(s) 1220 as natural language communications.

The NLP and ML algorithms 1214, 1212 receive and evaluate input data (i.e., training data and data-under-analysis) from the data sources 1202. The ML algorithms 1212 includes functionality that is necessary to interpret and utilize the input data's format. For example, where the data sources 1202 include image data, the ML algorithms 1212 can include visual recognition software configured to interpret image data. The ML algorithms 1212 apply machine learning techniques to received training data (e.g., data received from one or more of the data sources 1202) in order to, over time, create/train/update one or more models 1216 that model the overall task and the sub-tasks that the classifier 1210 is designed to complete.

Figure 13:
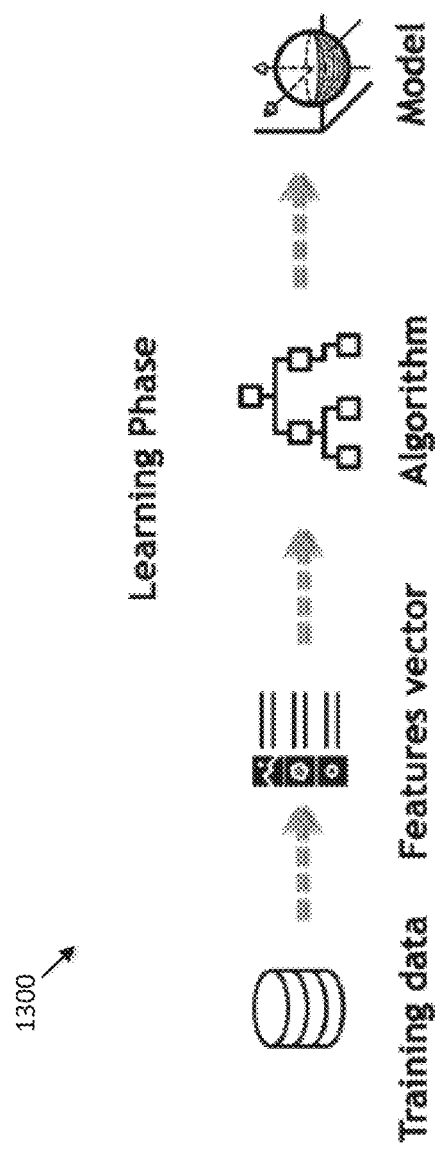
FIG. 13 depicts a learning phase that can be implemented by the machine learning system shown in FIG. 12.

Referring now to FIGS. 12 and 13 collectively, FIG. 13 depicts an example of a learning phase 1300 performed by the ML algorithms 1212 to generate the above-described models 1216. In the learning phase 1300, the classifier 1210 extracts features from the training data and coverts the features to vector representations that can be recognized and analyzed by the ML algorithms 1212. The features vectors are analyzed by the ML algorithm 1212 to "classify" the training data against the target model (or the model's task) and uncover relationships between and among the classified training data. Examples of suitable implementations of the ML algorithms 1212 include but are not limited to neural networks, support vector machines (SVMs), logistic regression, decision trees, hidden Markov Models (HMMs), etc. The learning or training performed by the ML algorithms 1212 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 1210 and the ML algorithms 1212. Unsupervised learning can utilize additional learning/training methods including, for example, clustering, anomaly detection, neural networks, deep learning, and the like.

When the models 1216 are sufficiently trained by the ML algorithms 1212, the data sources 1202 that generate "real world" data are accessed, and the "real world" data is applied to the models 1216 to generate usable versions of the results 1220. In some embodiments of the invention, the results 1220 can be fed back to the classifier 1210 and used by the ML algorithms 1212 as additional training data for updating and/or refining the models 1216.

In aspects of the invention, the ML algorithms 1212 and the models 1216 can be configured to apply confidence levels (CLs) to various ones of their results/determinations (including the results 1220) in order to improve the overall accuracy of the particular result/determination. When the ML algorithms 1212 and/or the models 1216 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 1210 can be configured to apply confidence levels (CLs) to the results 1220. When the classifier 1210 determines that a CL in the results 1220 is below a predetermined threshold (TH) (i.e., CL<TH), the results 1220 can be classified as sufficiently low to justify a classification of "no confidence" in the results 1220. If CL>TH, the results 1220 can be classified as sufficiently high to justify a determination that the results 1220 are valid. Many different predetermined TH levels can be provided such that the results 1220 with CL>TH can be ranked from the highest CL>TH to the lowest CL>TH.

The functions performed by the classifier 1210, and more specifically by the ML algorithm 1212, can be organized as a weighted directed graph, wherein the nodes are artificial neurons (e.g. modeled after neurons of the human brain), and wherein weighted directed edges connect the nodes. The directed graph of the classifier 1210 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 1210 can perform unsupervised deep-learning for executing the assigned task(s) of the classifier 1210.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 1210 processes data records (e.g., outputs from the data sources 1202) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 1210 and used to modify the weighted directed graph's weighted connections the second time around, and this feedback process continues for many iterations. In the training phase of a weighted directed graph of the classifier 1210, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 14 depicts a high level block diagram of the computer system 1400, which can be used to implement one or more computer processing operations in accordance with aspects of the present invention. Although one exemplary computer system 1400 is shown, computer system 1400 includes a communication path 1425, which connects computer system 1400 to additional systems (not depicted) and can include one or more wide area networks (WANs) and/or local area networks (LANs) such as the Internet, intranet(s), and/or wireless communication network(s). Computer system 1400 and the additional systems are in communication via communication path 1425, e.g., to communicate data between them. In some embodiments of the invention, the additional systems can be implemented as one or more cloud computing systems 50. The cloud computing system 50 can supplement, support or replace some or all of the functionality (in any combination) of the computer system 1400, including any and all computing systems described in this detailed description that can be implemented using the computer system 1400. Additionally, some or all of the functionality of the various computing systems described in this detailed description can be implemented as a node of the cloud computing system 50.

Computer system 1400 includes one or more processors, such as processor 1402. Processor 1402 is connected to a communication infrastructure 1404 (e.g., a communications bus, cross-over bar, or network). Computer system 1400 can include a display interface 1406 that forwards graphics, text, and other data from communication infrastructure 1404 (or from a frame buffer not shown) for display on a display unit 1408. Computer system 1400 also includes a main memory 1410, preferably random access memory (RAM), and can also include a secondary memory 1412. Secondary memory 1412 can include, for example, a hard disk drive 1414 and/or a removable storage drive 1416, representing, for example, a floppy disk drive, a magnetic tape drive, or an optical disk drive. Removable storage drive 1416 reads from and/or writes to a removable storage unit 1418 in a manner well known to those having ordinary skill in the art. Removable storage unit 1418 represents, for example, a floppy disk, a compact disc, a magnetic tape, or an optical disk, flash drive, solid state memory, etc. which is read by and written to by removable storage drive 1416. As will be appreciated, removable storage unit 1418 includes a computer readable medium having stored therein computer software and/or data.

In alternative embodiments of the invention, secondary memory 1412 can include other similar means for allowing computer programs or other instructions to be loaded into the computer system. Such means can include, for example, a removable storage unit 1420 and an interface 1422. Examples of such means can include a program package and package interface (such as that found in video game devices), a removable memory chip (such as an EPROM, or PROM) and associated socket, and other removable storage units 1420 and interfaces 1422 which allow software and data to be transferred from the removable storage unit 1420 to computer system 1400.

Computer system 1400 can also include a communications interface 1424. Communications interface 1424 allows software and data to be transferred between the computer system and external devices. Examples of communications interface 1424 can include a modem, a network interface (such as an Ethernet card), a communications port, or a PCM-CIA slot and card, etcetera. Software and data transferred via communications interface 1424 are in the form of signals which can be, for example, electronic, electromagnetic, optical, or other signals capable of being received by communications interface 1424. These signals are provided to communications interface 1424 via communication path (i.e., channel) 1425. Communication path 1425 carries signals and can be implemented using wire or cable, fiber optics, a phone line, a cellular phone link, an RF link, and/or other communications channels.

In the present description, the terms "computer program medium," "computer usable medium," "computer program product," and "computer readable medium" are used to generally refer to media such as memory. Computer programs (also called computer control logic) are stored in memory. Such computer programs, when run, enable the computer system to perform the features of the present invention as discussed herein. In particular, the computer programs, when run, enable the controller to perform the features and operations described herein. Accordingly, such computer programs can controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, comprise the module and achieve the stated purpose for the module.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments of the invention only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment of the invention was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:
1. An apparatus comprising:
a moveable gripper element comprising a flexible inner sleeve;
a mechanical energy source mechanism communicatively coupled to the moveable gripper element;
a sensor network communicatively coupled to the moveable gripper element; and
a controller communicatively coupled to the mechanical energy source mechanism and the sensor network;
wherein the flexible inner sleeve defines an adjustable opening;

wherein the controller controls the mechanical energy source mechanism to transfer to the moveable gripper element a gripping force configured to move the moveable gripper element, reduce a size of the adjustable opening, and bring the flexible inner sleeve into an initial level of thermal contact with a container positioned within the adjustable opening;

wherein the controller is configured to perform heat exchange control operations to achieve a predetermined level of heat exchange at an interface between the flexible inner sleeve and the container;

wherein the heat exchange control operations comprise:
subsequent to establishing the initial level of thermal contact, controlling the mechanical energy source mechanism to, responsive to one or more interface parameters, make adjustments to the gripping force that bring the flexible inner sleeve into a targeted level of thermal contact with the container; and
controlling a heater assembly to, responsive to one or more of the interface parameters, make adjustments to heating settings applied to the heater assembly to distribute heat to portions of the flexible inner sleeve that are in thermal contact with the container; and wherein the adjustments to the gripping force:
increase thermal contact points at the interface between the flexible inner sleeve and the container; and
displace air from the interface between the flexible inner sleeve and the container.

2. The apparatus of claim 1, wherein:
the heat exchange control operations further comprise, responsive to temperature gradient information, controlling the moveable gripper element to perform agitation operations that agitate the moveable gripper in multiple directions while the moveable gripper grips and delivers heat to contents of the container; and
the temperature gradient information comprises a difference between a temperature at a first position on the container and a temperature at a second position on the container.

3. The apparatus of claim 1, wherein:
an interface-parameter proxy measurement or estimate (measurement/estimate) represents the interface parameters; and
the interface-parameter proxy measurement/estimate comprises an air-gap percentage at the interface between the flexible inner sleeve and the container.

4. The apparatus of claim 1, wherein:
an interface-parameter proxy measurement or estimate (measurement/estimate) represents the interface parameters;
the interface-parameter proxy measurement/estimate comprises a prediction of an interfacial thermal resistance at the interface between the flexible inner sleeve and the container; and
the controller comprises a machine learning algorithm trained to generate the prediction of the interfacial thermal resistance at the interface between the flexible inner sleeve and the container.

5. The apparatus of claim 1, wherein:
an interface-parameter proxy measurement or estimate (measurement/estimate) represents the interface parameters; and
the interface-parameter proxy measurement/estimate comprises a difference between:
a temperature of the flexible inner sleeve at a location of the interface between the flexible inner sleeve and the container; and
a temperature of the container at the location at the interface between the flexible inner sleeve and the container.

6. The apparatus of claim 1, wherein:
an interface-parameter proxy measurement or estimate (measurement/estimate) represents the interface parameters; and
the interface-parameter proxy measurement/estimate comprises an estimate of the difference between:
an estimate of a first temperature at a first location of the contents of the container; and
an estimate of a second temperature at a second location of the contents of the container.

7. The apparatus of claim 1, wherein:
the flexible inner sleeve comprises the heater assembly;
the heater assembly comprises a thermal heating element configured to generate the heat;
the thermal heating element is configured to include heating zones;
the controller is configured to, based at least in part on container data, individually activate or deactivate each of the heating zones to generate a pattern of the heat; and
the container data is selected from the group consisting of:
a material of the container;
a size of the container;
a shape of the container;
a surface topology of the container; and
a position of the container within the adjustable opening.

8. The apparatus of claim 1, wherein:
the flexible inner sleeve comprises the heater assembly;
the heater assembly comprises a thermal heating element configured to generate the heat;
the adjustments to the heating settings are such that the heat that reaches the container has a substantially uniform distribution along a height dimension of the container; and
the substantially uniform distribution of the heat comprises a temperature differential between a first end of the container and a second opposite end of the container being within a predetermined temperature range.

9. The apparatus of claim 1, wherein the adjustments to the gripping force are insufficient to enable the gripping force to damage the container.

10. The apparatus of claim 1, wherein:
the flexible inner sleeve comprises the heater assembly;
the heater assembly comprises a thermal heating element configured to generate the heat;
the heating settings control aspects of how the thermal heating element generates the heat; and
the adjustments to the heating settings are such that the heat that reaches the container is insufficient to damage the container.

11. A method of making an apparatus, the method comprising:
providing a moveable gripper element comprising a flexible inner sleeve that defines an adjustable opening;
providing a mechanical energy source mechanism;
communicatively coupling the mechanical energy source mechanism to the moveable gripper element;
configuring the mechanical energy source mechanism to, responsive to a controller, transfer to the moveable gripper element a gripping force configured to move the moveable gripper element, reduce a size of the adjustable opening, and bring the flexible inner sleeve into an initial level of thermal contact with a container positioned within the adjustable opening; and further configuring the mechanical energy source mechanism is configured to, responsive to the controller, perform heat exchange control operations to achieve a predetermined level of heat exchange at an interface between the flexible inner sleeve and the container;

wherein the heat exchange control operations comprise:
subsequent to establishing the initial level of thermal contact, and responsive to one or more interface parameters, making adjustments to the gripping force that bring the flexible inner sleeve into a targeted level of thermal contact with the container; and using a heater assembly to, responsive to one or more of the interface parameters, make adjustments to heat settings applied to the heater assembly to distribute heat to portions of the flexible inner sleeve that are in thermal contact with the container; and wherein the adjustments to the gripping force:
increase thermal contact points at the interface between the flexible inner sleeve and the container; and
displace air from the interface between the flexible inner sleeve and the container.

12. The method of claim 11, wherein:
the heat exchange control operations further comprise, responsive to temperature gradient information, controlling the moveable gripper element to perform agitation operations that agitate the moveable gripper in multiple directions while the moveable gripper grips and delivers heat to contents of the container; and
the temperature gradient information comprises a difference between a temperature at a first position on the container and a temperature at a second position on the container.

13. The method of claim 1, wherein:
an interface-parameter proxy measurement or estimate (measurement/estimate) represents the interface parameters; and
the interface-parameter proxy measurement/estimate comprises an air-gap percentage at the interface between the flexible inner sleeve and the container.

14. The method of claim 11, wherein:
an interface-parameter proxy measurement or estimate (measurement/estimate) represents the interface parameters;
the interface-parameter proxy measurement/estimate comprises a prediction of an interfacial thermal resistance at the interface between the flexible inner sleeve and the container; and
the controller comprises a machine learning algorithm is used to generate the prediction of the interfacial thermal resistance at the interface between the flexible inner sleeve and the container.

15. The method of claim 11, wherein:
an interface-parameter proxy measurement or estimate (measurement/estimate) represents the interface parameters; and
the interface-parameter proxy measurement/estimate comprises a difference between:
a temperature of the flexible inner sleeve at a location of the interface between the flexible inner sleeve and the container; and
a temperature of the container at the location at the interface between the flexible inner sleeve and the container.

16. The method of claim 11, wherein:
an interface-parameter proxy measurement or estimate (measurement/estimate) represents the interface parameters; and
the interface-parameter proxy measurement/estimate comprises an estimate of the difference between:
an estimate of a first temperature at a first location of the contents of the container; and
an estimate of a second temperature at a second location of the contents of the container.

17. The method of claim 11, wherein:
the flexible inner sleeve comprises the heater assembly;
the heater assembly comprises a thermal heating element configured to generate heat;
the thermal heating element is configured to include heating zones;
the adjustments to the heating settings comprise, based at least in part on container data, individually activate or deactivate each of the heating zones to generate a pattern of the heat; and
the container data is selected from the group consisting of:
a material of the container;
a size of the container;
a shape of the container;
a surface topology of the container; and
a position of the container within the adjustable opening.

18. The method of claim 11, wherein:
the flexible inner sleeve comprises the heater assembly;
the heater assembly comprises a thermal heating element configured to generate the heat;
the heating settings are configured to control aspects of how the thermal heating element generates the heat;
the adjustments to the heating settings are such that the heat that reaches the container has a substantially uniform distribution along a height dimension of the container; and
the substantially uniform distribution of the heat comprises a temperature differential between a first end of the container and a second opposite end of the container being within a predetermined temperature range.

19. The method of claim 11, wherein the adjustments to the gripping force are insufficient to enable the gripping force to damage the container.

20. The method of claim 11, wherein:
the flexible inner sleeve comprises the heater assembly;
the heater assembly comprise a thermal heating element configured to generate heat;
the heating settings are configured to control aspects of how the thermal heating element generates the heat; and
the adjustments to the heating settings are such that the heat that reaches the container is insufficient to damage the container.

* * * * *